(12) United States Patent
Ginsberg-Klemmt et al.

(10) Patent No.: US 12,231,083 B2
(45) Date of Patent: Feb. 18, 2025

(54) LOW-COST, SOLAR-POWERED NANOGRID

(71) Applicants: Antonia Ginsberg-Klemmt, Sarasota, FL (US); Achim Ginsberg-Klemmt, Sarasota, FL (US); Eric Bryant Cummings, Livermore, CA (US)

(72) Inventors: Antonia Ginsberg-Klemmt, Sarasota, FL (US); Achim Ginsberg-Klemmt, Sarasota, FL (US); Eric Bryant Cummings, Livermore, CA (US)

( * ) Notice: Subject to any disclaimer, the term of this patent is extended or adjusted under 35 U.S.C. 154(b) by 74 days.

(21) Appl. No.: 18/348,989

(22) Filed: Jul. 7, 2023

(65) Prior Publication Data
US 2023/0370017 A1 Nov. 16, 2023

Related U.S. Application Data

(63) Continuation-in-part of application No. 17/981,065, filed on Nov. 4, 2022, now Pat. No. 12,040,737, (Continued)

(51) Int. Cl.
| | |
|---|---|
| *H02S 40/32* | (2014.01) |
| *B60L 53/18* | (2019.01) |
| *B60L 53/30* | (2019.01) |
| *B60L 53/51* | (2019.01) |
| *H02J 7/00* | (2006.01) |
| *H02J 7/35* | (2006.01) |
| *H02S 20/23* | (2014.01) |
| *H02S 40/38* | (2014.01) |

(52) U.S. Cl.
CPC .............. *H02S 40/32* (2014.12); *B60L 53/18* (2019.02); *B60L 53/30* (2019.02); *B60L 53/51* (2019.02); *H02J 7/0042* (2013.01); *H02J 7/35* (2013.01); *H02S 20/23* (2014.12); *H02S 40/38* (2014.12)

(58) Field of Classification Search
CPC ....... H01L 31/00–078; Y02E 10/50–60; H02S 20/00–26; H02S 40/30–38
See application file for complete search history.

(56) References Cited

U.S. PATENT DOCUMENTS

| | | |
|---|---|---|
| 5,895,981 A | 4/1999 | Flegel |
| 11,515,708 B2 | 11/2022 | Cummings |
| | (Continued) | |

FOREIGN PATENT DOCUMENTS

| | | | | |
|---|---|---|---|---|
| AT | 514642 A1 | * | 2/2015 | ............. E04H 6/025 |
| CN | 108075372 A | | 5/2018 | |
| WO | WO-2017030516 A1 | * | 2/2017 | |

OTHER PUBLICATIONS

AT-514642-A1 English (Year: 2015).*

*Primary Examiner* — Bach T Dinh
(74) *Attorney, Agent, or Firm* — Donald R. Boys; Central Coast Patent Agengy LLC

(57) ABSTRACT

An electrical supply system has a carport appliance with a framework supporting a plurality of PV panels and a system controller having a PV inverter coupled to the PV panels of the carport appliance. The PV inverter is adapted to provide current to charge electrically powered vehicles, and has a regulated bus coupled to electrical apparatus providing surge capacity for the supply system. In one instance the system controller has an AC output to input of a distribution apparatus for a residence or a business.

14 Claims, 50 Drawing Sheets

Related U.S. Application Data which is a continuation-in-part of application No. 17/326,687, filed on May 21, 2021, now Pat. No. 11,515,833.

(60) Provisional application No. 63/359,722, filed on Jul. 8, 2022.

(56) References Cited

U.S. PATENT DOCUMENTS

| | | |
|---|---|---|
| 2021/0376613 A1 | 12/2021 | Cummings |
| 2023/0053934 A1 | 2/2023 | Ginsberg-Klemmt |

* cited by examiner

LOW-COST, SOLAR-POWERED NANOGRID

CROSS-REFERENCE TO RELATED APPLICATIONS

The instant application is a continuation in part of and claims priority to co-pending application Ser. No. 17/981,065, filed Nov. 4, 2022, which is a continuation in part of Ser. No. 17/326,687 filed May 21, 2021, and also claims priority to provisional patent application 63/359,722 filed Jul. 8, 2022. All disclosure of the parent cases is incorporated at least by reference.

BACKGROUND OF THE INVENTION

1. Field of the Invention

The present invention is in the technical field of production and distribution of electricity and pertains more particularly to a nano-grid powered by an array of photovoltaic (PV) panels, which may in some instances be termed solar panels.

2. Description of Related Art

Distributed energy generation is key to a resilient energy supply, but distributed resources like solar power do not have any intrinsic surge capability like that provided by the angular momentum of a generator. Without some form of dispatchable energy storage, power surges, e.g., those produced when charging capacitors or starting or stopping a large motor, cause voltage fluctuations that can disrupt or damage other connected equipment. Moreover, most solar inverters can only supply power to a stable, well-regulated grid. As soon as the grid goes down, a solar array and conventional inverter turn off. This radically limits the effectiveness of solar power as an emergency or fail-safe power source.

Battery storage systems can provide surge capacity. If a grid node such as a residence is electrically disconnected from the power grid, e.g., via a master service disconnect switch or breaker, a battery storage system can regulate a voltage waveform that allows a conventional grid-tied solar inverter to feed power into the isolated node. At present, the cost of a battery storage system and its attendant power electronics may be excessive because electronics and magnetics may need to be sized for peak power, which may occur only for a second or two periodically through the day.

What is needed is a low-cost microgrid system controller enabling a solar panel system to efficiently and reliably power a nano-grid.

BRIEF SUMMARY OF THE INVENTION

In one embodiment of the invention an electrical supply system is provided, comprising a carport appliance, comprising a rectangular framework having a length L, a width W, and a height H, comprising four corner posts of d"×d" square metal tubing with cross beams at the upper ends of the posts forming a rectangular top, a rectangular base plate of width W, length L and thickness T equal or less than 1" lying flat on a support surface with the corner posts of the rectangular framework joined securely to the baseplate at corners of the baseplate, a plurality of PV panels mounted to the top of the rectangular framework in a horizontal aspect in a pattern covering substantially all area of the top of the framework, a plurality of PV panels hinged along a long edge of each PV panel to a top edge of a first side of the framework, and a plurality of PV panels hinged along a long edge of each PV panel to a top edge of a second side of the framework, one PV panel of a length equal to width W of the rectangular framework, hinged along the length of the PV panel to a top edge of a first end of the framework, and one PV panel of a length equal to width W of the rectangular framework, hinged along the length of the PV panel to a top edge of a second end of the framework, support apparatus hinged to posts on each side of the framework, adapted in a raised position to support the plurality of PV panels hinged on each side of the framework with the PV panels rotated upward to a horizontal aspect, support apparatus hinged to posts on each end of the framework, adapted in a raised position to support the one PV panel hinged on each end of the framework with the PV panels rotated upward to a horizontal aspect, and circuitry and wiring connecting the PV panels to a cable ending in a connector compatible with a PV inverter, and a system controller, comprising a framework enclosing elements of the system controller, the framework mounted on a wheeled base, a PV inverter connected to the cable from the PV panels as input to the system controller, a regulated bus, apparatus coupled to the regulated bus adapted to provide surge protection, and circuitry and conductors adapted to connect an AC output of the system controller to an electrical grid.

In one embodiment the apparatus providing surge protection comprises a brushless DC motor-based flywheel generator coupled to the regulated bus. Also, in one embodiment the apparatus providing surge protection comprises a surge power source/sink comprising a supercapacitor bank or a starter battery. In one embodiment the supercapacitor bank is 50 kiloJoule or higher.

In one embodiment the system controller further comprises a battery and charge controller switchably coupled to the regulated bus, a variable-frequency drive (VFD) inverter coupled to the battery and charge controller, a resistive load switchably coupled to the regulated bus, and a plurality of actuatable switches, comprising a first actuatable switch configured to selectively couple a photovoltaic (PV) inverter to the regulated bus or to an external electrical panel, a second actuatable switch configured to selectively couple the regulated bus to the external electrical panel, a third actuatable switch configured to selectively couple the regulated bus to the battery and charge controller, a fourth actuatable switch configured to selectively couple the VFD inverter to the regulated bus or to the generator, a fifth actuatable switch configured to selectively couple the generator to the external electrical panel, and a sixth actuatable switch configured to selectively couple the resistive load to the regulated bus.

In one embodiment the rectangular base plate has corner regions of d'×d" matching the bottom of each post, with lengthwise and widthwise spans of a span width equal to or less than d" forming edges of the baseplate. Also, in one embodiment the carport appliance has a minimum clearance of six feet to the rectangular top, the ends have a minimum width of six feet between posts and the sides have a minimum length between posts equal to or greater than six feet, such that vehicles may be driven over spans of the baseplate and through the length or the width of the carport or may be parked under the carport. Also, in one embodiment the carport appliance further four removable wheel assemblies joined one to each corner post at a lowermost portion of each post such that installing all four wheel assemblies raises the carport appliance a distance D, and enables the carport to be rolled on the wheels of the wheel assemblies. In one embodiment the carport appliance further comprises an anchor plate fastened from span to span across each corner of the baseplate inside the post at each corner with a pattern of holes accommodating anchor bolts.

In one embodiment the carport appliance further comprises anchors compatible with the anchor bolts, the anchors installed in the support surface in a pattern matching the pattern of the holes in all four anchor plates installed on the framework, enabling the carport appliance to be rolled over the pattern of anchors in the support surface, the wheel assemblies to be removed setting the carport down on the support surface, and the anchor bolts to be inserted through the holes in the anchor plates and engaged to the anchors, firmly anchoring the carport appliance to the support surface. Also in one embodiment, in the carport appliance, the PV panels are bifacial panels in which both sides of the panels are active.

In one embodiment of the electrical supply system the PV inverter is a combination inverter/charger having cables and connectors for charging electric vehicles. Also, in one embodiment the electrical grid connected to the AC output of the system controller is wiring of a residence or a business, and the AC output is input to a junction breaker box distributing power in the residence of business.

DETAILED DESCRIPTION OF THE INVENTION

Distributed energy generation is key to a resilient energy supply, but distributed resources like solar power do not have any intrinsic surge capability like that provided by the angular momentum of a generator. Without some form of dispatchable energy storage, power surges, e.g., those produced when charging capacitors or starting or stopping a large motor, cause voltage fluctuations that can disrupt or damage other connected equipment. Moreover, most solar inverters can only supply power to a stable, well-regulated grid. As soon as the grid goes down, a solar array and conventional inverter turn off. This radically limits the effectiveness of solar power as an emergency or fail-safe power source.

Figure 1A:
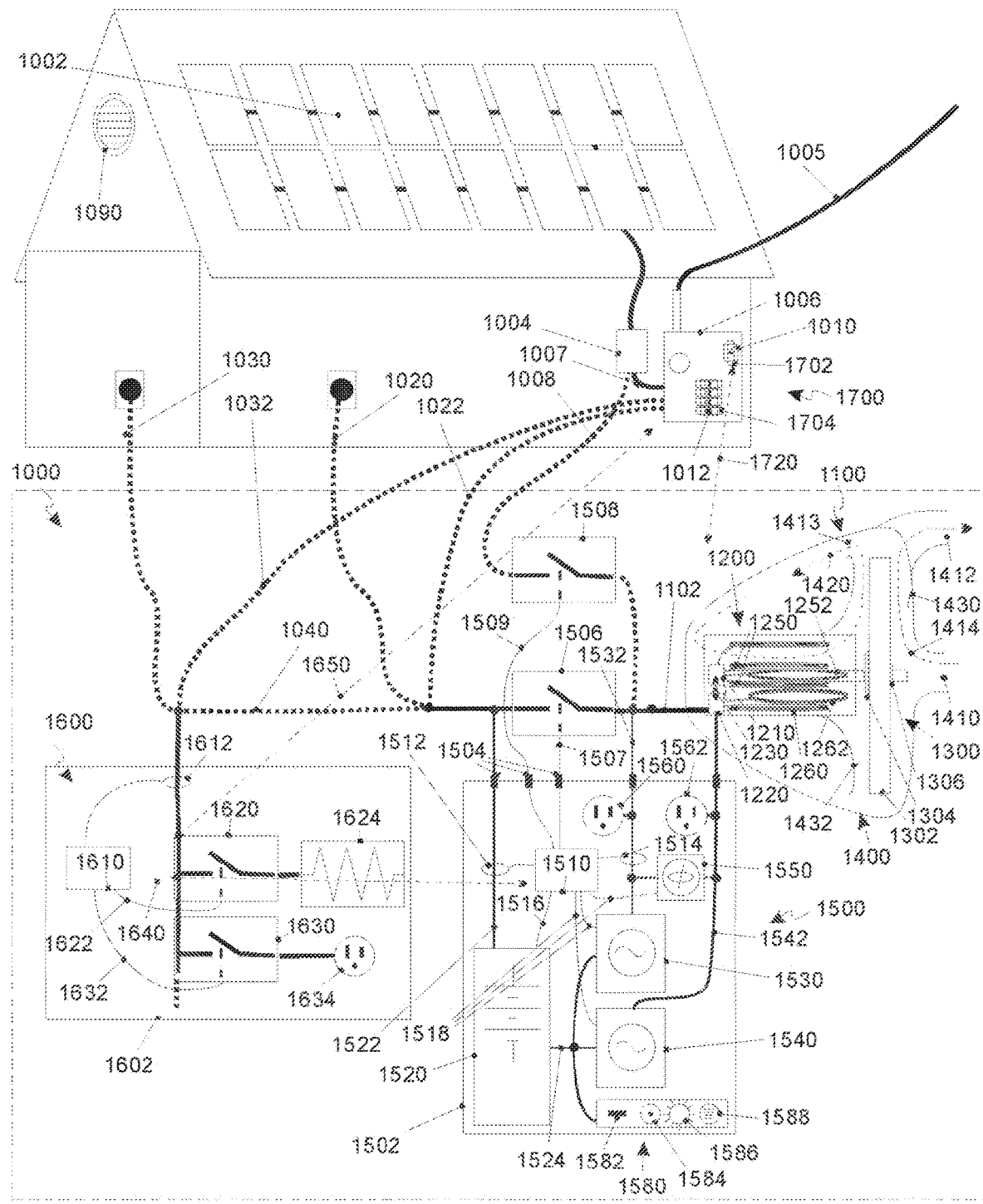
FIG. 1A shows a schematic diagram of a microgrid system controller according to an embodiment.

FIG. 1A is an overview diagram of a microgrid system controller 1000 according to an embodiment. In this embodiment, a household microgrid is created using a photovoltaic array 1002 and string inverter 1004. Alternatively, an array of microinverters may be used. These inverters may be non-islanding. In this embodiment, the power grid 1005 connects to a power entry panel 1006.

In some embodiments the inverter output directly connects to the subpanel via 1007. In other embodiments it connects to 1102 through 1008 via actuatable switch 1508.

Element 1010 is a service disconnect switch/breaker and elements 1012 are individual circuit breakers. In microgrid operation, switch 1010 or its equivalent is open, isolating the wiring in the house from the grid. The width of the schematic power connections may indicate the order of magnitude of power, e.g., a doubling of the line width corresponding to a 10× increase in peak power flow, but this depiction is not intended to be limiting. Power connections indicated by dashed lines are alternative connections. Connections 1020 and 1030 may be breakable connection to power outlets. Connections 1022 and 1032 may be wired connections, made, for example, by an electrician.

The controller system 1000 comprises an "inertial power module" 1100 with primary power circuit 1102 comprising a motor/generator 1200, a flywheel assembly 1300, and an aerodynamic cowling assembly 1400.

Some motor/generators 1200 comprise one or more of: rotor electronics 1210, rotor control electronics 1220, rotor to stator communications channel 1230, main rotor winding 1250, auxiliary rotor winding 1252, stator winding 1260, and auxiliary stator winding 1262.

Some flywheel assemblies 1300 comprise a flywheel disc 1302, a flywheel hub 1304, and a flywheel retainer 1306.

Some aerodynamic cowling assemblies 1400 comprise an inlet 1410 and outlet 1412. Airflow induced by flywheel motion 1414 may be used gainfully in some embodiments, e.g., for drying, applying force-air convection, ventilation, attic ventilation (e.g., mounted near 1090).

Some embodiments comprise outlet 1412 features that modify volumetric flow via air entrainment e.g., a diffuser, nozzle, ejector.

Some cowling designs according to an embodiment produce a circulatory airflow 1420 that passes over the motor/generator windings for enhanced cooling.

Some cowling designs comprise at least one vanelet 1430 to redirect flow, suppress or enhance a secondary flow, etc.

The system further comprises a "source-control module" 1500. In some embodiments this module comprises a user portable housing 1502 having breakable connections 1504 that provide for relocating and re-purposing the module when the microgrid is not active. Element 1506 is an actuatable switch controlled by signal 1507 that connects and disconnects the generator output from the microgrid. In some embodiments element 1508 is an actuatable switch controlled by 1509 that connects and disconnects the inverter output from the generator output. In some embodiments at least one of: switch 1506 or switch 1508 are proximal to service disconnect 1010 such that their mutual on-states may be mechanically or electrically inhibited.

A controller 1510 measures at least one dynamic line measurement (1512) of the microgrid and at least one dynamic line measurement (1514) of a motor/generator stator circuit 1532. Controller 1510 further coordinates (1516) a battery charge controller and battery bank module 1520. The DC bus of the battery 1524 is used by a bridge-circuit 1530. In some embodiments 1530 is an inverter. In some embodiments, this inverter can function as a phase of a variable frequency AC, DC, or brushless DC motor drive having output 1532. In some embodiments this inverter can further function as an islanding voltage-source AC line inverter, supplying a power outlet 1560.

Some embodiments further comprise second bridge circuit 1540. In some embodiments 1540 is an inverter whose output 1542 can drive a winding of a motor. In some embodiments 1540 can further function as an islanding voltage-source AC line inverter supplying outlet 1562. Some embodiments alternatively comprise a switchable phase-shifting circuit 1550 to produce signal 1542 in lieu of 1540.

Some source-control modules further comprise a subsystem 1580 that may provide functionality that is helpful during an outage or emergency. Element 1582 comprises one or more low-voltage DC chargers, such as USB, USB-C, etc.

Element 1580 may comprise a connection to an automotive starting battery or other such battery. In some embodiments, this allows a dead automotive battery to charge from power supplied by the battery module or microgrid. In some embodiments, this allows the battery module to charge from the external battery, e.g., in the event the battery module is too depleted to spin up the flywheel.

Element 1580 may comprise one or more lights 1586, e.g., an LED, a UV sterilization light, a strobe, a beacon and a radio receiver or transceiver 1588.

Some embodiments comprise a "load-control module" 1600. In some embodiments, this module may have a housing 1602 that allows the module to be portable. In some embodiments the module is connected breakably to an electrical outlet on the microgrid 1030. This module comprises a controller 1610 that measures at least one line parameter 1612, e.g., voltage or frequency, and controls at least one actuatable switch, e.g., 1620, 1630 to a line load. Some embodiments comprise load 1624 comprising a forced-convection heating element. In some embodiments, this load may be used as a space heater or dryer or may be used as an energy dump to the outside environment by appropriately locating the portable load-control module. In some embodiments, a user may plug an alternate load into an output of the load-control module, e.g., 1634. Some load controllers comprise a plurality of controlled switches and outlets 1634.

Some source-control modules may comprise at least one switch to one load. Some load-control modules operate based on line frequency and voltage specifications, applying at least one load when the frequency, rms voltage, or instantaneous voltage is out of specification. Some load control modules switch at least one load on and off fast enough to perform real-time voltage-defect and transient suppression.

Some such load-control modules may operate autonomously from the rest of the microgrid system. Some alternative embodiments comprise a communication channel 1640 to the power source controller. Some alternative embodiments comprise a communication channel 1650 to a remote load-control system 1700 located substantially at a breaker panel or subpanel.

Element 1700 is a breaker panel load control system. Some embodiments of this system comprise a master-switch indicator 1702 which senses the position of the service disconnect and can report this status remotely. Some master-switch indicators 1702 further comprise an actuator, allowing controller 1700 to disconnect from the grid automatically. Some embodiments further comprise a grid-side signal sensor to determine when grid power has returned. Some embodiments report any phase or frequency errors between the microgrid and the grid over communications channel 1650 to the load controller or 1720 to the power source controller, so that controllers can take actions, e.g., shed loads, add loads, change the power factor, actively spin up or spin down the flywheel, etc. so errors can be substantially nulled, allowing a synchronous reconnect to the grid. In addition, a communication channel 1720 to the load controller may be used as a safety interlock to prevent power from the microgrid from being exported to the grid during an outage or to prevent 1506 from being closed while the microgrid and grid are asynchronous. In some embodiments, 1702 is a position-indicating interlock switch and communications channel 1720 is a wired connection to the power-source controller.

In some embodiments, a startup of the system can be initiated by a user or automatically, e.g., via a real-time clock, photosensor, wireless command, etc.

In some embodiments at startup, the operation of bridges and phase-shift functions are coordinated via signals 1518 to initiate motion of or "start" the motor/flywheel. In some embodiments it may be desirable to prevent microgrid loads from experiencing the voltage waveforms produced during the starting of the motor/generator because the voltages and frequencies are out of grid specification and the motor-drivers, e.g., 1530, 1540, 1550, or battery module 1520 may not have the capacity to drive microgrid loads. Therefore, in some embodiments this initiation of the motor may occur with switch 1506 open until the generator is substantially at its speed setting.

In some embodiments, switch 1508 is open during motor/generator start up. In other embodiments, during startup, the switch 1508 is closed between the waveform 1102 and the inverter because grid-tied inverters may not require isolation during the ramp up of the generator, however, the inverter may need to be isolated from all panel loads.

In some embodiments, when the motor/generator has reached a sufficient rotation rate, e.g., 10% to 90% of the line-synchronous rotation rate, the phase-shift circuit 1550 or auxiliary winding driver 1540 may be switched off.

In some embodiments, when the motor/generator has reached line frequency, the controller 1510 maintains a tight frequency and voltage control of its bridge 1530 to maintain frequency. If not already connected, the circuit 1102 is electrically connected to the inverter or inverters, which may sense a valid grid signal and begin their own startup delay timers, which may typically elapse after two to five minutes after which the inverters begin to deliver power synchronously to circuit 1102. At this point, there may be an excess of energy flowing to the generator, which may raise the rotation frequency, voltage, or change the direction or magnitude of a flowing current. The controller 1510 may sense this state and change to a new starting mode. In some embodiments the controller may operate bridge 1540 such that a reverse current flows to recharge batteries module 1520. The controller 1510 may close a connection, e.g., switch 1506 to allow power to flow through the microgrid. The controller may communicate to an external device.

In some embodiments, when the housing 1502 is removed from its breakable connections 1504, the operating mode can convert to battery-powered AC inverter. In some embodiments, the removal of the module physically exposes at least one power outlet for use, e.g., 1560, 1562.

Figure 1B:
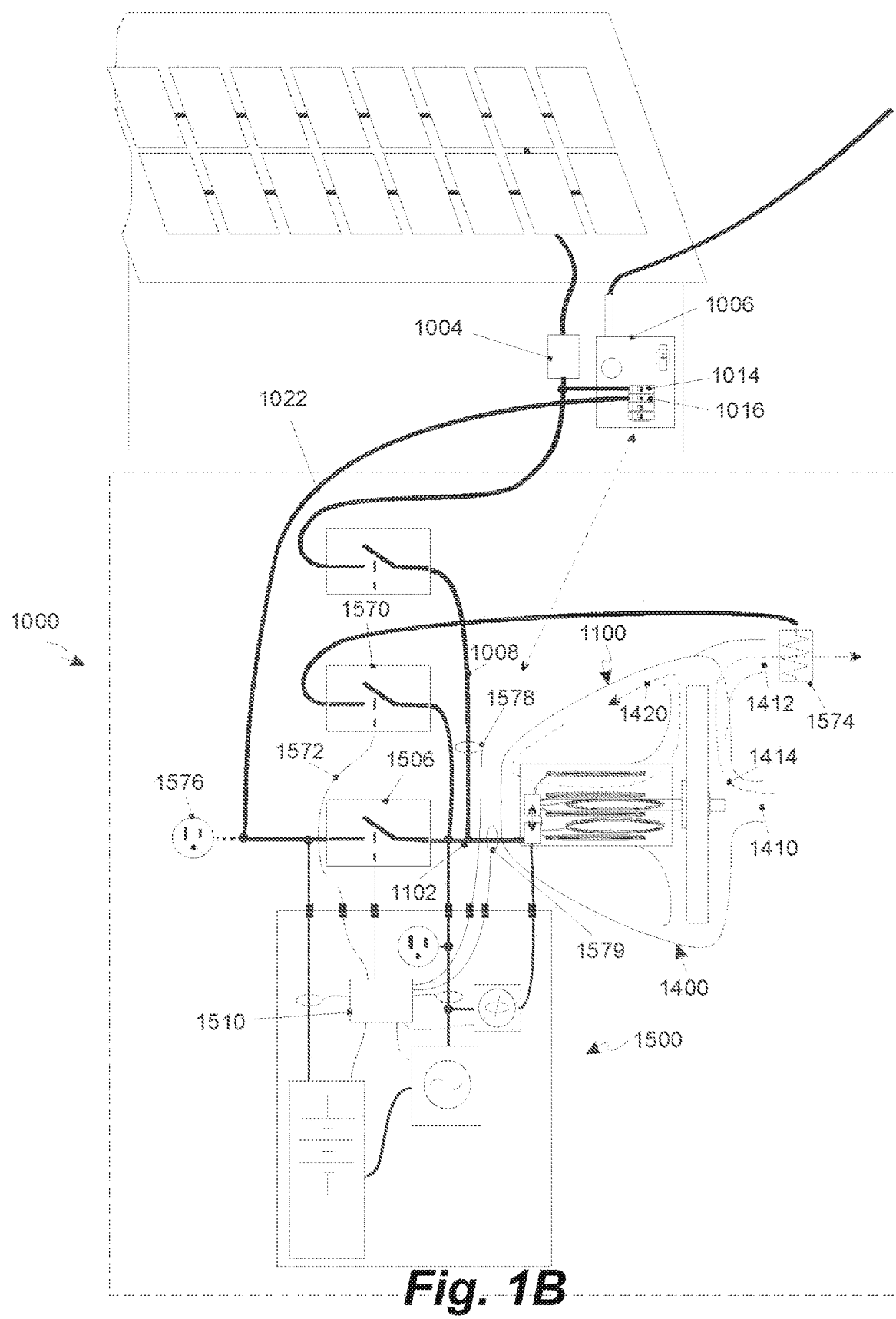
FIG. 1B shows a schematic diagram of a microgrid system controller having an integrated load according to an embodiment.

FIG. 1B shows an alternative embodiment of a microgrid system controller according to an embodiment. In this embodiment, the controller 1000 is wired through a switch to the inverter. The inverter and microgrid system controller are connected to breakers 1014 and 1016, respectively. This embodiment further comprises a switch 1570 controlled by controller 1510 via signal 1572 that can energize a resistive load 1574. In some embodiments this resistive load is physically disposed proximal to a flow outlet 1412 such that induced air flow 1414 passes over the heating load such that heat is convected from the load. Some such embodiments may obviate a separate load controller 1600. Some embodiments comprise sensing of a line parameter from the inverter 1578. Some embodiments comprise sensing of a line parameter from the motor/generator 1579. Some embodiments may comprise one or more power sockets 1576.

Figure 1C:
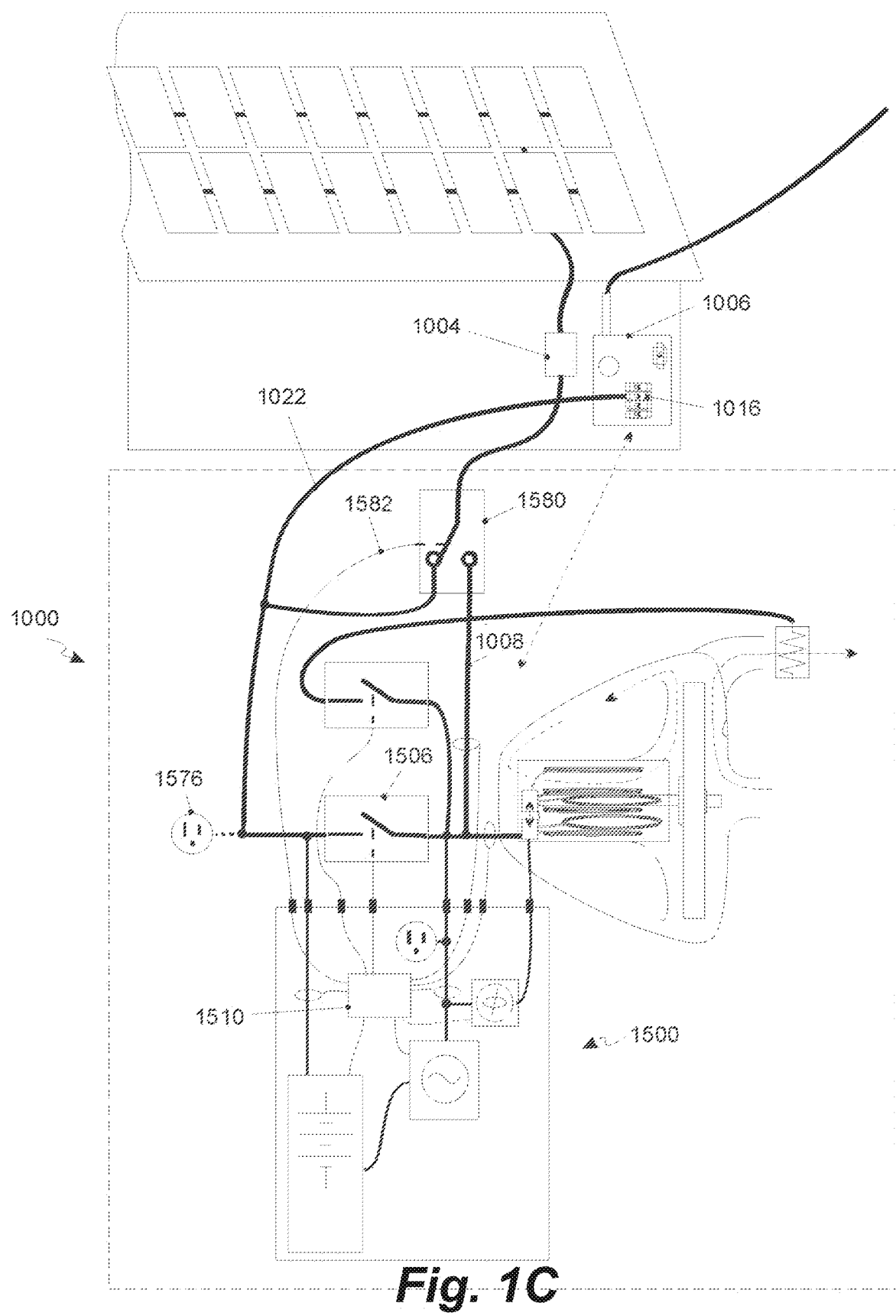
FIG. 1C shows a schematic diagram of a microgrid system controller having a starter switch according to an embodiment.

FIG. 1C shows an alternative embodiment comprising a "starter switch" 1580 and single breaker connection 1016. When the microgrid is idle or operating, the switch 1580 may quiescently connect the inverter output to line 1022 to the breaker. For some time period when the microgrid is starting, signal 1582 from controller 1506 switches the inverter connection to 1008, feeding the line signal produced by the generator to the inverter. When power is detected flowing from the inverter, the switch 1506 may be closed and the switch 1580 may optionally be returned to its quiescent state.

In some embodiments, when power flows from the PV inverter, a power controller, e.g., 1510 measures the available power. In some embodiments, the measurement is obtained in part by communication with the inverter. In some embodiments, the power controller monitors at least one line parameter measurement. In some embodiments, the power controller determines the duty-cycle of a resistive load, e.g., 1574 that maintains a substantially steady motor speed, AC voltage, AC frequency, etc. In some embodiments, the controller reports this available power to a second device. In some embodiments knowledge of the instantaneous available power is used to manage loads.

Figure 1D:
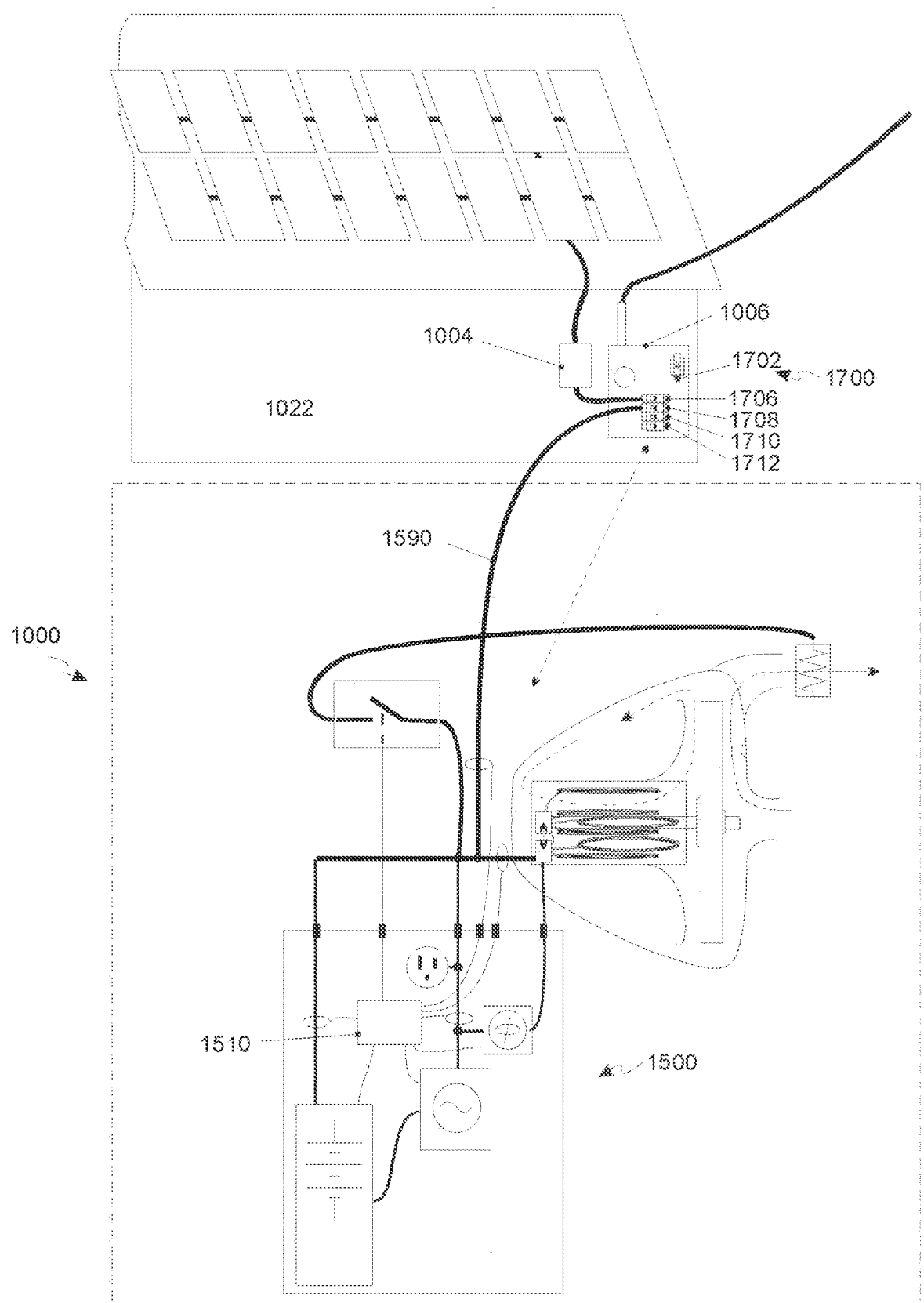
FIG. 1D shows a schematic diagram of a microgrid system controller incorporating an electrical-panel-based load switch system according to an embodiment.

FIG. 1D shows a schematic diagram of a microgrid system controller embodiment that employs a breaker-panel-based automated switch control system 1700. Power to and from the microgrid system controller is connected to breaker actuated at 1708 via conductors 1590. In some alternative embodiments, the switching is performed manually. In this embodiment, the inverter is connected to a breaker at actuation station 1706. The microgrid system controller is connected to a breaker at actuation station 1708. Actuator stations 1710 and 1712 connect to a plurality of loads that may have different priorities.

In this embodiment, when the grid goes out, actuation station 1702 disconnects the panel from grid service. Actuation stations 1710, 1712, etc. turn off all loads. In some embodiments, one or both of stations 1706 and 1708 are switched off. When the microgrid system controller is up to its specified speed, stations 1706 and 1708 are closed, sending the microgrid signal to the inverter. When there is excess power available from the inverter, the actuation controller may switch on loads, in some embodiments according to a priority that may be time dependent.

Micro Grid Interlocking

To prevent the possibility of exporting power to the grid during an outage (non-islanding), an interlock on a service disconnect switch may be used. In some embodiments this interlock comprises a position-indicator 1702. In some embodiments this interlock comprises a lockout lever or mechanism that prevents reconnection to the grid while the interlock is satisfied. In some embodiments the interlock is in mechanical or electrical communication with a switch 1806, 1506, or 1508, in such a way to prevent the simultaneous closure of the service switch 1010 and system power switch. Some embodiments provide a software or firmware mediated control over interlocking, since a rigid interlock may prevent the system from operating beneficially in normal non-islanded circumstances. In some such embodiments, the source controller 1510 may monitor the microgrid waveform like a standard PV inverter does and switch off if the grid has exceeded its specified limits for longer than the specified duration. In some embodiments, this may involve the microgrid system controller periodically switching off and observing the waveform. In some embodiments, this may involve the microgrid system controller periodically applying a load that is substantial enough that it would require valid grid power to maintain and then monitoring the effect of the load. In some embodiments, the microgrid system controller switches off its output when it senses a change in the grid state. In some embodiments, the microgrid system controller switches operation when it detects that the grid has gone down by performing one or more of: actuating a service disconnect switch open, e.g., via 1702 or its equivalent, initiating load shedding. In some embodiments, a non-islanded microgrid system controller acts to isolate from the grid while the local line parameters are within the inverter specifications, so the inverters do not trip or stop producing power during the conversion to islanding.

In some embodiments, the microgrid system controller may perform an automatic grid-reconnection procedure comprising sensing a valid grid signal for a specified interval, synchronizing its flywheel motion to the valid grid signal, then re-closing the service disconnect 1010, e.g., via 1702. In some embodiments, a controller in the microgrid system 1000 may automatically initiate load adding as full service is restored.

Microgrid Startup Procedure

These components work in concert to create a microgrid by a micro-grid startup sequence of steps in which the node is isolated, a grid-signal generated in the microgrid and components are switched in and out to maintain the microgrid. One embodiment of a micro-grid starting procedure comprises one or more of the steps:

a. isolating or ensuring isolation from the grid (switch 1010 to off position),
b. opening a switch 1012 to a load circuit, opening all breakers to load circuits,
c. opening a switch 1506,
d. spinning-up the generator 1200 connected to the flywheel 1300 to stabilize the voltage waveform and frequency within a specified range,
e. closing a source switch 1508 to one or more renewable resource, e.g., string inverter 1004 or microinverter, and
f. waiting an interval until source power is detected.

If source power is detected in the interval, the system may switch to a Microgrid Regulation Mode. If no source power is detected during the interval, the system may switch to a Microgrid Shutdown Procedure.

Alternative Micro Grid Startup Procedure

Some embodiments follow an alternative startup procedure wherein a small voltage-source sine-wave inverter circuit feeds a valid grid signal to the PV inverter with substantially no other battery load. If the PV inverter fails to begin supplying power during a startup interval, the controller turns the inverter circuit off, establishing a low-power idle state until the startup mode is reactivated manually or automatically after an interval.

If the PV inverter begins to supply power, the controller maintains a valid grid signal IO via high-speed regulation of its resistive load, while it soft-starts rotation of the generator and flywheel and brings the flywheel into synchronization with the PV inverter. Then the controller closes a switch between the generator and PV inverter to create the microgrid. The system may then switch to the Microgrid Regulation Mode.

Figure 1E:
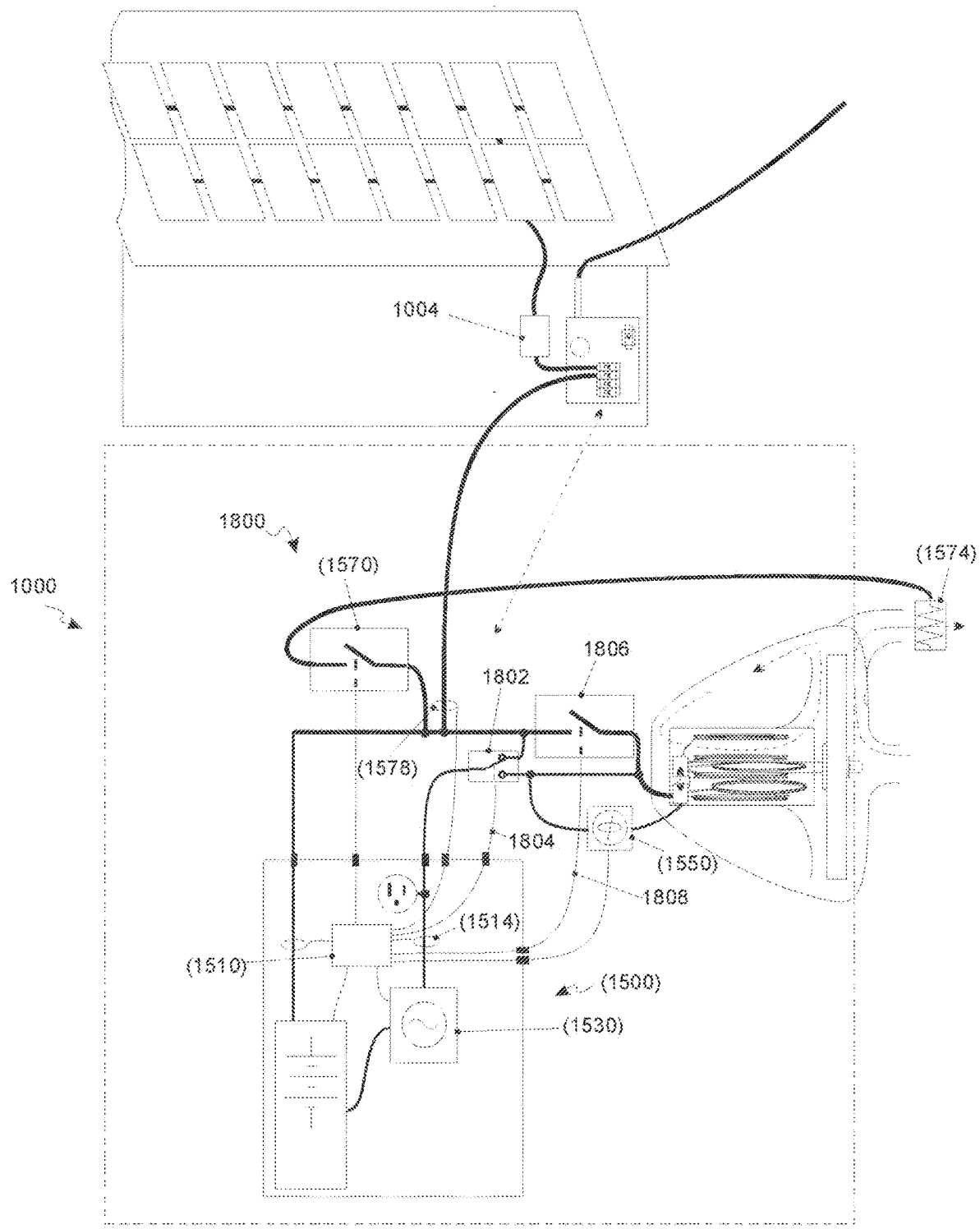
FIG. 1E shows motor or generator startup circuitry for reduced battery usage according to an embodiment.

FIG. 1E shows such an alternative embodiment of the inverter/motor/generator startup circuitry 1800, comprising a selector switch or its equivalent 1802. In the startup state position (shown), switch 1802 connects the bridge 1530, operated as a sign-wave voltage-source inverter, to conductors that are in electrical communication directly or through a network of switches and conductors to at least one PV inverter 1004. At startup, this supplies a valid grid waveform to the inverter for the duration of the PV inverter startup delay interval. When the inverter begins to apply power, a pulse-width-modulated (PWM' d), constant-on-time modulated or otherwise modulated, and, in some embodiments, low-pass filtered switch (e.g., 1570) to a substantially resistive load (e.g., 1574) regulates the AC waveform supplied by the inverter while the excitation from 1530 is removed, in some embodiments, gradually. Switch 1802 is then thrown by signal 1804, connecting the bridge 1530 to one or more stator windings of the motor generator. The bridge, in concert with zero or more of: a second bridge, a phase-shift circuit 1550, or a power-factor control circuit, soft-starts the motor generator, e.g., via a variable voltage-frequency control scheme. In this position of switch 1802 (opposite that shown) at least one line parameter of the generator waveform may be sensed (e.g., via 1514) by the controller and compared to that sensed (e.g., via 1578) from the PV inverter. The controller may then apply a control algorithm on one or more of the PWM'd resistive load, the motor-driving waveform to lock, or substantially match the voltage and frequency of both sinusoids. When these waveforms, present across switch 1806, are sufficiently similar, the controller may close 1806 via control signal 1808, electrically connecting the motor/generator to the PV inverter to create a microgrid that is tolerant of surges and power spikes.

The alternative arrangement of 1800 may confer the advantage that the battery usage during the PV inverter startup delay is dramatically reduced, since there may be no charging of the flywheel and motor losses. It may confer the advantage that the battery usage during the motor/generator startup is dramatically reduced, since AC power is available to the battery charger circuitry. In some embodiments, substantially all of the power to spin up the generator is supplied via the PV inverter output. In some embodiments, the power source to an inverter is switched from battery to the PV inverter or its rectified output.

In some embodiments switch 1806 is proximate to service disconnect 1010 such that they are prevented mechanically or electrically from simultaneously being in their on-state.

The arrangement 1800 may have the further advantage that it can be used to synchronize the flywheel to an established grid or secondary microgrid, allowing the system 1000 to be used for normal or non-islanded grid or microgrid enhancement, such as surge limiting, transient suppression, power factor correction, etc. In some such embodiments, forced air from the subsystem 1100 may be used to avail, such as for attic ventilation, drying, forced convection past a radiator or heat-transfer unit, air circulation, etc., providing value to offset the energy use of the motor.

In such embodiments the controller may allow service switch and generator switch 1806 to be simultaneously closed under conditions of a valid grid signal.

Some systems may be installed where islanding is guaranteed, e.g., where there is no grid service 1005. In such cases, a grid controller may operate with an islanding interlock defeat, a firmware, software, or jumper configuration that eliminates or unconditionally satisfies islanding checks.

Micro Grid Regulation Procedure

The aim of the regulation procedure is to maintain a high-quality, accurately specified grid waveform despite sporadic loads and surges. In some embodiments, regulation entails the coordination of a plurality of sources and sinks or loads. Excess sourced energy may increase the flywheel rotation rate and generator root mean square (RMS) voltage.

A deficit of sourced energy may decrease the flywheel rotation rate and generator RMS voltage, therefore a part of regulation is a process of maintaining the RMS voltage, frequency, or both. In some embodiments, this regulation comprises actuating at least one switch (e.g., 1620, 1630, 1570) to a load or to control battery charging (1516) to establish a time-averaged balance between energy production and usage. Rather than load-shedding when a temporarily unsustainable power deficit is encountered, some embodiments supplement power from the PV system by one or more of: allowing the flywheel rotation to drop or converting battery power to AC power via 1530. When the unsustainable load relaxes, the controller recharges the batteries and the flywheel. In some embodiments, the controller (e.g., 1220 or 1510) charges the flywheel substantially near the maximum specified frequency to provide maximal load-surge impulse capacity.

A second part of the regulation may be regulating the instantaneous voltage waveform to mitigate fast transients. In some embodiments, this regulation is largely provided by the action of the flywheel/generator. In some embodiments, this regulation further comprises a controller actuating a fast switch to a load (1610 actuating 1620 to 1624, or 1510 actuating 1570 to 1574). Some embodiments may provide a separate proximal local load that is actuated only for fast transients that avoids noise filtering and line inductance effects of remote loads. Some regulations may comprise a high-frequency pulse-width signal modulated by an instantaneous error voltage. Some embodiments or control loops comprise an error signal term that may be high-pass filtered to exclude line frequency and frequencies that the generator can mitigate.

Some regulations control loops dynamically adjust a parameter of the target voltage, e.g., amplitude, frequency, instantaneous phase, etc., to maintain synchronization with the flywheel/generator motion. Some embodiments gradually increase or decrease one or more of: voltage amplitude target or voltage frequency target to re-charge the flywheel or prevent excessive flywheel frequency, respectively.

A third part of regulation may be establishing a desired power factor, e.g., substantially unity. In some embodiments this regulation comprises a control circuit directly (e.g., 1230) or indirectly (e.g., 1220, or 1510) regulating a quasi-DC field current in a rotor winding.

A fourth part of regulation may be automatically load shedding or load adding, e.g., via a load controller 1610 and at least one switch (e.g., 1630) to a user-selectable load, e.g., a water heater on outlet 1634. Some embodiments comprise a load actuation system (e.g., 1700) that can actuate circuit switches at a power panel. Some embodiments comprise a home-automation system. In some embodiments a load controller (e.g., 1610, 1700) is coordinated with a second controller, e.g., the source controller 1510. In some embodiments a load controller (1610) takes independent action based on a measured (1612) line parameter. Some load controllers 1610 may coordinate a load actuation system 1700.

Microgrid Shutdown Mode

It may be desirable to effect a gradual shut-down of the microgrid, e.g., if the power source has dropped below sustainable levels or minimal-load. In such instances, some systems will have performed load-shedding as the available power levels drop. Some embodiments provide regenerative charging of the on-board batteries from the stored flywheel energy. Some embodiments may attempt to restart the microgrid periodically, in some cases, if an internal model or clock indicates power should be available. For example, the microgrid may power down temporarily because of passage of a dark cloud or temporary casting of a shadow and it may be desirable to restore power automatically after this event passes.

Synchronous Condenser

A key source/sink in some embodiments is a synchronously rotating generator 1200 having intrinsic or attached rotational inertia 1300, known as a "synchronous condenser," that is sufficient to supply or sink rated power spikes. In some embodiments, the stored flywheel energy is sufficient for the generator to supply an impulse long enough to satisfy the surge load without maintaining a voltage waveform within specifications, including frequency. Some embodiments comprise a generator that comprises novel design elements to maximize the stiffness of its current source/sink versus phase angle between the rotor field angle and synchronous stator field. In some embodiments, the flywheel generator has a storage capacity at rated power between 0.05 sand 10 sand preferably between 0.3 sand 3 s before the AC frequency drops below a specified minimum.

Distributed Energy Resource

Some embodiments may comprise a distributed energy resource, such as an inverter 1004 and photovoltaic (PV) array 1002 or an equivalent array of micro-inverters and PV panels. The illustration of the microgrid system in relation to a single PV array is not intended to be limiting. Some embodiments may control a microgrid fed by one or more energy resources derived from one or more of: solar, wind, water motion, chemical energy, flywheel motion, gravitational potential energy, elastic energy, compressed fluid, phase-change energy, etc.

Legacy PV inverters may typically operate to produce substantially maximal electrical power available from the solar panels. Some inverters have operating modes where their power setting can be limited or adjusted in a variety of ways, e.g., voltage-frequency adjustments, etc. Some inverters adjust their output according to the RMS grid voltage. Such enhanced inverter operations may help to achieve a low-frequency balance between production and consumption.

Some inverters adjust their output according to the instantaneous grid voltage, allowing a higher-frequency source-regulation capability. Some embodiments are designed to work without coordination or signaling with the inverter apart from the microgrid voltage waveform. An advantage of this minimal coordination may be a reduction in engineering effort to adapt to third-party inverters and an increase in the number of installations that can be serviced by the apparatus. Some embodiments are designed to work with an inverter whose voltage and frequency specifications can be adjusted from tight grid-connected ranges to more permissive ranges or whose grid-voltage checking may be software or hardware disabled. Such systems may have the advantage of requiring less flywheel energy storage, e.g., smaller physical size, mass, or rotation rate.

Auxiliary Load

Some embodiments comprise one or more auxiliary loads (e.g., 1624, 1634, 1574) that can be switched on and off to achieve a time-averaged balance between production and consumption. Some loads convert surplus electricity to one or more of heat, light, electrochemical reactions, battery energy, electric vehicle charge, gravitational potential energy of a mass or fluid, compression or tension of an elastic solid or gas, pressure in a fluid or solid, phase change of a gas, fluid, or solid, a manufacturing process, evaporation, increased or decreased humidity, etc. Some light outputs may comprise plant, algae, or tissue growth-enhancing, heat, or sterilization lights. Some electrochemical products may comprise a storable fuel or oxidizer, e.g., carbon, oxygen, hydrogen, methane, ethane, propane, n-ane, paraffin oil, wax, and the like. Some pressure products may be used to drive reverse osmosis. Some heat products may be used for hot water, ambient environment control, process, drying, or cooking heat. Some such heaters may be portably disposed so an end user may position the heat for best effect, e.g., outdoors if the indoor temperature is too high or in a room where space heat is advantageous.

Some auxiliary loads, such as a heating element, can be turned on and off rapidly (1 μs to 100 s) affording rapid regulation response. Other loads, such as an air or freon compressor may need to be switched on and off for longer intervals (e.g., 10 s to 1000 s) to be effective. Some loads, such as lights and heaters, can be driven at intermediate voltages that may comprise a low-pass filtered PWM'd waveform.

Connection to Auxiliary Loads

In some embodiments, at least one auxiliary load is breakably connected to the system, e.g., through a conventional power socket and plug arrangement (e.g., 1634). In some embodiments, an auxiliary load or controller (1600) may be connected through an extension cord (1040) to the system or site power 1030 so it can be positioned for best effect, e.g., placing a space heater in a room or outdoors. In some embodiments, an extension cord is retractably connected to the system. Some such embodiments employ a spiral torsion spring retraction mechanism.

In some embodiments, at least one auxiliary load is connected to the micro-grid via a switch, e.g., a circuit breaker (1012). In some embodiments, the circuit breaker or switch is installed in an electrical panel (1006) and in electrical communication with site wiring. In some embodiments, site wiring conducts current between the system and an auxiliary load. In some embodiments the system applies an actuating stimulus to a switch directly (1632) or through an intermediary actuator, e.g., 1700 via communication channel 1650. Some intermediary actuators are controlled wirelessly.

Auxiliary Load Controller

In some embodiments, a microcontroller or computer coordinates switching of one or more auxiliary loads (e.g., 1610 controlling power to 1624 or 1634, 1510 controlling power to 1574). In some embodiments, at least one auxiliary load is pulse-width modulated. In some embodiments, at least on auxiliary load is "on/off" controlled, herein defined as turned on and off substantially as in normal use.

Regulating the Voltage Waveform and Frequency

The regulation of the voltage waveform and frequency may comprise one or more of: turning on and off or adjusting the power setting of at least one auxiliary load, e.g., a heater, an air heater, a water heater, a ground heater, an electrolysis unit, an electrochemical process, a battery charger, a light, a growth light, a pump, a well pump, a pool pump, a sump pump, a pool heater, a gas compressor, a gas compressor with phase change, an air-conditioner, a de-humidifier, an ice maker, a digging mechanism, etc.

Inertial System

Some embodiments of 1100 comprise additional angular inertia over that of the generator 1200 and further comprise a flywheel system 1300 that comprises a flywheel disk (1302), hub (1304), and retainer (1306). Some flywheel discs 1302 comprise one or more of factory-installed hardware, user-installed fixed-mass hardware, and user-installed variable-mass hardware. Some variable-mass hardware comprises a flywheel enclosure that has a massive component added to it by a user, such as water, dirt, gravel, sand, concrete, molten metal, molten lead, molten tin, etc. Some such massive elements may be ubiquity, low-cost, high density, low-hazard. Some fixed-mass hardware comprises one or more round steel discs. Some flywheels comprise a hub apparatus to which one or more flywheel discs can be attached. In some embodiments, the storage capacity of the flywheel can be changed by the factory or end user by attaching more or fewer discs, in the manner of a bar-bell. Some flywheel discs comprise more than one kind of metal, e.g., iron or steel and lead or some other inexpensive dense material. Such embodiments may have the advantage of reducing the total shipping weight of the system for a given rotational energy storage level.

Some disks are produced by stamping, laser cutting, water-jet cutting, and saw cutting, casting, die casting, sand casting, etc. Some flywheels comprise a plurality of parallel-stacked discs. Some flywheels comprise laminated disks in some embodiments, lamination is achieved by welding, brazing, soldering, epoxying, riveting, mechanical fasteners, etc. In some embodiments laminated flywheels may include at least one interior disc containing at least one internal opening to produce an internal cavity in the flywheel. In some embodiments an arrangement of a plurality of openings in internal laminae are disposed away from the disc rim, to reduce the flywheel mass proportionately greater than the rotational inertia, without increasing the exterior wetted area or producing turbulence. In some alternative embodiments, a plurality of cast discs having a concavity on one side and a substantially flat opposing side are laminated or connected so the substantially flat side faces outward, into the immersion fluid.

Some flywheels further comprise one or more fiducial marks. Some fiducial marks comprise one or more sets of optically distinct marks arrayed circumferentially at one or more radii to facilitate a rotary encoder function. Some arrays have at least one signature circumferential or radial variation or modulation that can be used to detect absolute angle. Some stator-frame-of-reference controllers comprise an optical element to read or scan the fiducial marks as they rotate past a sensor to detect flywheel position angle accurately.

Some embodiments comprise a flywheel hub 1302 that transitions between the generator shaft and one or more flywheel disks. Some flywheel hubs accept a center-tapped or center-drilled tapered shaft. Some flywheel hubs comprise a surface of a mechanical clutch meant to prevent dangerous operation or damage in the event of a fault, such as a short circuit. In some embodiments, the mating clutch surfaces comprise mating contacts having one or more of taper, face, or cylinder surfaces. Some embodiments have a mating taper, further comprising a rod that applies a compression between clutch surfaces, and the rod may comprise one or more of a threaded end, a head, a head with provision for seizing wire, a castle nut, or an elastic element. In some embodiments, the compressive force applied to the faces is set to produce non-galling sliding slippage at a set point near the maximum torque setting of the generator at maximum peak power. In some embodiments, this applied force is maintained by elastic deformation of a spring or material. In some embodiments, this elastic element is a Belleville disc spring.

Some hubs further comprise a substantially cylindrical shaft for a rotary bearing mounted substantially to motor-generator housing or supports to ensure that the motor/generator shaft remains sufficiently parallel with the stator so that the stator and rotor do not come into contact.

Some embodiments further comprise a flange, the flange further comprising at least one feature to prevent relative motion between a flywheel disk and hub. Some such features comprise one or more of a hole, a tapped hole, a pin, an embossment, an indentation, a protrusion, or a keyway. Some flanges comprise one face of a clutch, and some retain a separate elastic element that comprises one surface of a clutch. In some embodiments the face of a flywheel disc comprises the second surface of a clutch. In some embodiments the clutch comprises at least one indentation and protrusion having a ramp-like interface such that a sufficient torque can clear the protrusion from the indentation despite an elastic preload.

Some flywheel hubs further comprise a substantially cylindrical shaft which accepts the central opening of one or more flywheel discs. In some embodiments, the shaft has a circular cross section. In other embodiments the shaft has a shape that interlocks with a feature such as a spline, tooth, or keyway in the central opening of a flywheel disk such that the disk orientation with respect to the shaft is indexed or maintained. Some shafts and flywheel openings are toleranced to limit the maximum run-out of the flywheel.

Some flywheel hubs are configured to accommodate a retainer mechanism 1306 to ensure flywheels cannot accidentally or unintentionally escape the flywheel hub. Some such accommodations comprise at least one circumferential feature to hold an external retaining ring.

Some embodiments comprise a plurality of retaining ring grooves to facilitate flywheels of different thicknesses or disc counts. Some hubs provide a mount for an alternative flywheel backing mounting ring 1306. Some hubs allow the installation or removal of one or more flywheel disks without disassembly of anything in the motor/generator/flywheel apparatus other than a backing mount or retaining ring. Some hubs further comprise at least one mass-distribution adjustment to provide for manually or automatically balancing the flywheel.

Flywheel Balancing

Some embodiments include tolerance shafts, hubs, and flywheel disks to ensure to obviate additional balancing operations.

Some embodiments provide for a flywheel validation commissioning procedure based on one or more of maximum permissible vibration amplitude, maximum flywheel slip, minimum flywheel inertia, or maximum flywheel inertia. Some embodiments perform validation commission testing at flywheel spin up. Some embodiments perform commission testing continuously. Some embodiments perform balance calculations automatically from vibration displacement, acceleration, or force measurements. In some embodiments these measurements and calculations are performed during flywheel spin-up, which may be aborted by the controller (e.g., 1510) if excessive or unexpected vibration or substantially different-than-expected rotational inertia or resistance is sensed. Some systems further comprise software that can identify where and how much to add, remove or shift mass to balance the system. Some embodiments may automatically make balancing adjustments.

Aerodynamic Design

Lost rotational energy from a disc flywheel operated in an immersion fluid such as air may mostly appear as impelled air motion. The magnitude of lost energy depends on the details of the housing and cowling around the flywheel, but is of the order of 100 Wat 3600 RPM for a 0.7 m flywheel. This amount of air motion may be useful for cooling the apparatus without requiring additional cooling fins or fans. Some embodiments provide fly-wheel impelled forced air as a desirable side-effect, secondary intent, or primary intent. For example, the flywheel may be configured as an attic ventilation fan, offsetting the idle losses of the flywheel/generator system. Some such embodiments comprise a generator/flywheel/housing assembly that is disposed in an attic or other area where daytime forced air is useful. Some embodiments, further comprise a motor-controller, battery, and load controller system 1500, 1600 located remotely from the generator/flywheel/housing assembly. In some embodiments one or more components of the system can be disconnected from the rest of the system and operated remotely. In some embodiments, remote operation is facilitated by one or more of power, signaling, and communications via existing building wiring. Some flywheel designs may comprise at least one vanelet (1430) to enhance or inhibit aerodynamic pumping effect, e.g., having a slight spiral angle directing air radially outward or inward, respectively.

Cowling

Aerodynamic losses and sound production from the flywheel may be parasitic and unwanted. Some flywheels reduce the fluid pressure or viscosity surrounding the flywheel to reduce losses. Some embodiments comprise a cowling and check valve disposed about the flywheel substantially to maintain a vacuum. Some cowlings further surround the generator to
- obviate a vacuum seal around a rotating shaft. Some such embodiments comprise one or more of a thermal mass, heat pipe, liquid cooling channel, etc. to maintain a safe operating temperature for the generator.

Some systems comprise an aerodynamic cowling 1400 designed to minimize noise and turbulent losses of the flywheel and, in some embodiments, provide a generator operating in atmospheric air. Some such cowlings comprise at least one internal feature or vane-let 1430 that acts to maintain an orderly circulation pattern within the cowling. Some such vane-lets comprise a ridge on a surface. Some vanelets are substantially circumferentially disposed. Some vanelets have a radial spiral component. In some embodiments, this radial spiral component angle directs air in opposition with the natural outward angle produced by centrifugation causing an orderly secondary flow recirculation. In some embodiments, the vanelet angle directs air in concert with the outward flow angle, producing an orderly radial bulk fluid flow. In some embodiments the cowling further comprises at least one fluid outlet (1412, 1413) for this radial flow. Some cowlings further comprise one or more aerodynamic ducts (1410, 1412), a plurality of aerodynamic vanelets, openings (1413), slots, holes, tapers, nozzles, etc. to collect and redirect this radial flow, ideally with low noise and good pressure recovery. Some external (1430) and internal (1432) cowlings direct this flow (1420, through opening 1413) to resupply the bulk flow. In some embodiments this resupply air passes over at least one element that requires cooling. In some embodiments a portion of the resupply air passes through the generator (1420). In some embodiments, resupply air passes over one or more of: power electronics, heating coils or elements, cooling plates, cooling fins, or heat sinks.

In some embodiments, a portion of the bulk flow (1414) produced by the flywheel is ducted or vented externally (1412), facilitating a use (e.g., ventilation or drying) for what may otherwise be a parasitic load. Some embodiments may duct air to the inlet (1410), e.g., for ventilation or air quality maintenance.

Some cowlings comprise a material or composite having acoustic damping properties. Some cowlings comprise material having vibration damping properties, e.g., having a viscoelastic or mechanical energy absorptive element. Some cowlings further comprise a part of the device housing.

Motor/Generator

Some embodiments may comprise a bidirectional power source 1200 comprising one or more of an alternator, brushless alternator, brushless DC motor, brushed alternator, brushed DC motor, induction motor, brushless synchronous motor, or brushed synchronous motor. The motors may have salience. Some embodiments may comprise a two-pole motor having a synchronous rotation rate of 3600 RPM at 60 Hz or 3000 RPM at 50 Hz. An embodiment of a synchronous motor comprises a two-phase stator and a rotor comprising a field winding 1250 and at least one auxiliary winding 1252 used to do one or more of: draw power from the stator fields to supply power to the field winding, damper rotary oscillations, or provide motor starting torque while operating in an induction mode.

Rotor Electronics

Some embodiments comprise a field control/regulation circuit 1210 in the rotor frame of reference. Some controllers comprise a microcontroller in communication with a second circuit 1220 in the stator frame of reference. In some embodiments, the communication channel 1230 is wireless, free-space optical, acoustic, electrostatic, magnetic, or electromagnetic. In some embodiments, electromagnetic transmission is achieved by modulating data at a carrier frequency away from line frequency (e.g., much higher than line frequency) and coupling this modulated data into the current or voltage waveform of a rotor winding or stator winding. Electromagnetic reception is achieved by filtering the modulated data from line-frequency components and demodulation. In some embodiments, at least one signal is communicated to a motor controller via one or more of: an analog signal, a digital signal, an analog modulated signal, or a digital modulated signal.

Some rotor controllers 1210 can adjust reactive power production by varying the field current. Some embodiments can actively trim unwanted non-sinusoidal voltage-output characteristics by superimposing a compensating line-synchronous periodic excitation to the field coil. In some embodiments, this compensation may allow a generator winding and lamination design to be simpler or easier to assemble, resulting in lower cost. Some controllers contain non-volatile calibration data to achieve this trimming. In some embodiments, a stator-monitoring microcontroller (e.g., 1220 or 1510) may communicate voltage-defect feedback data to the rotor that the rotor controller may use to perform self-calibration or adaptive compensation. In some embodiments, adaptive compensation may allow a generator to correct voltage defects produced by loads or grid non-idealities. In some embodiments, adaptive compensation may allow a generator to mitigate voltage transients.

At startup, the rotor rotation rate may be zero and there may be an arbitrary angle of the rotor windings with respect to the main stator windings 1260. This may prevent a rotor from experiencing a startup torque at some angles. To mitigate this effect some embodiments further comprise an auxiliary stator winding 1262 whose field is oriented at an angle (e.g., 45° to 135°) with respect to the stator windings. This field may be energized at startup (e.g., via 1540 or 1550) to produce an unconditional torque on the rotor windings. The energization of 1262 may be removed or changed depending on the rotation rate of the rotor or line parameter.

Some alternative embodiments comprise a three-phase motor/generator, which may not require an auxiliary winding to ensure that a start-up torque is applied.

At synchronous rotation, windings on the rotor of the two-phase motor/generator experience an oscillating magnetic field component at twice the line frequency produced by currents in the primary stator windings. In addition, the rotor may experience a field induced by an auxiliary stator winding. If an auxiliary winding current is substantially DC, a rotor winding experiences a magnetic field oscillating at the line frequency. Some embodiments use an AC component of the current in an auxiliary stator winding at a non-line frequency. In some embodiments, an auxiliary rotor winding is in electrical communication with circuitry that extracts power from the induced voltage and current.

In some embodiments a part of that power extraction circuitry is a rectifier, a half-bridge rectifier, a full-bridge rectifier, or a totem-pole synchronous rectifier. In some embodiments a part of this circuitry is a regulator of voltage or current. In some embodiments the regulator has an adjustable threshold. Some regulators comprise a switching converter. Some embodiments utilize a voltage comparator circuit in part to determine switch timing. In some embodiments, the comparator compares a reference voltage with a voltage derived from one or a combination of: the output voltage of the circuit, the output current of the circuit, an analog signal from an auxiliary winding, a demodulated analog signal, or a sensor. In some embodiments the reference voltage is fixed, while in others it may be adjusted by a controller.

Some embodiments comprise feedback wherein the feedback circuit regulates the power factor of the generator via adjusting how the field winding is energized.

In some embodiments, the field-winding current or applied voltage is regulated by adjusting the current or voltage applied to an auxiliary winding of the stator, and the induced current in the auxiliary winding of the rotor is rectified as described previously and the resulting voltage waveform or low-pass-filtered waveform applied across the field winding to produce the field current.

Some embodiments obviate a rotor microcontroller by providing for indirect control of the field winding energy via a stator-reference-frame controller that supplies a waveform to at least one stator winding. In some embodiments the waveform is substantially DC, substantially near line frequency, or substantially above line frequency.

Some rotor electronics comprise a frequency selective filter on a rotor winding. Some embodiments obviate an auxiliary rotor winding by frequency multiplexing operations of a rotor winding. Some rotor electronics comprise at least one winding on a distinct magnetic circuit from the field windings. Some embodiments couple power to at least one rotor winding using a magnetic field having a substantial axial component.

Some rotor electronics receive power used to supply the field winding from an alternative source, e.g., a rotating battery, coupled photovoltaic cells, an electrostatic coupling, etc.

Non-Rotary (Stator-Frame) Electronics

Some embodiments comprise stator electronics 1220 that perform one or more of: communicating with a second controller, optically measuring flywheel position from fiducials and indicia, measuring generator shaft angle (e.g., optically, via a sensor including a rotary encoder, hall-effect sensor, etc.), measuring instantaneous stator-winding parameters (e.g., currents, voltage, power, voltage error, temperature, vibration offset, vibration force, acceleration, IR temperature), free-space optical communications, wireless communications, control of the voltage and current in at least one stator auxiliary winding, analog to digital conversion, digital to analog conversion, pulse-width modulation, battery charge control, interlock monitoring, performance monitoring, data reporting, data logging, variable-frequency motor drive, or AC inversion.

Some non-rotary electronics perform load management as described above. Some functionality of the stator-frame electronics may be physically connected to the motor/generator apparatus, such as shaft encoders, optical sensors, optical communications, etc.

Some embodiments package some functionality of the non-rotary electronics into a removable or re-positionable module, e.g., in housing 1502. For example, some embodiments combine battery charge control and motor control electronics in a removable package that is connected by a plurality of breakable electrical connections 1504, that on removal changes functionality over to one or more standard AC sinewave inverters (1530, 1540) connected to one or more outlets (1560, 1562) and battery charge controller (1510, 1516, 1520). Some embodiments further allow the removed module to be plugged into a wall outlet to charge the battery pack. Some embodiments further allow the removed module to be plugged into an automotive "cigarette lighter" connector (1584) to allow recharging even if the AC grid is unavailable.

Some embodiments include additional functionality that is useful in an emergency, such as one or more of a light (1586), a radio (1588), a 12-V battery charger (1580/1584), a USB charger (1580/1582), etc. In some embodiments, when the power from solar panels is no longer sufficient to power household loads, the system automatically regeneratively breaks the flywheel, supplying charge to its batteries. It may then be disconnected from the motor/generator connector and moved to a convenient location for supplying limited overnight spot power. In the morning, it can be reconnected to the motor/generator connector and reinitiate the system startup procedure.

Conventional PV inverters may generally fall into two categories: grid-tied or non-islanding inverters and off-grid or islanding inverters. Both types of inverters are substantially limited in the surge power they can provide because the average output power is limited by the photon flux on the PV panel or panels at their input and the inverters generally have little on-board bulk energy storage. Some inverters comprise a bulk storage (e.g., battery) element that can supplement the PV source power when needed. This energy may flow through the same circuit that carries the PV energy or through additional circuitry. Either way adding substantial surge capacity increases the cost of the inverter.

Increasingly, battery backup systems, comprising a battery-fed inverter, are used to create a microgrid during an outage. The surge capacity of these systems may be limited by battery capacity or amount of active material in the batteries or desired service life of the batteries. Adding a three-times surge capacity to a battery system requires one or more of: the use of more expensive high-discharge batteries, a reduction in the service life of the batteries, or a corresponding increase in the amount of active material in the batteries, all of which decrease the economy of the battery system. In addition, the inverter tied to the battery must be rated for the surge power, compounding the system cost.

Some embodiments overcome this problem by substantially eliminating surge-power requirements for the battery or inverter components of a microgrid. Some embodiments may comprise a generator/alternator, a flywheel, an inverter and dump load controller herein called an "agent," and a generator motion controller. The combination works as a miniature "synchronous condenser" to create and stabilize the voltage waveform and, in some embodiments, power factor in a microgrid. The generator may be sized affordably to have a low effective output resistance (e.g., 0.5 n for a 10-kW generator) so that an instantaneous current surge of 80 A, produced, e.g., by the start of a vacuum cleaner, air conditioner, or power tool, produces a momentary Voltage dip of −17% in the microgrid of (40 V out of 240 VRMS), which may be tolerable for the vast majority of household and industrial loads. The mass of active material in such a generator, mostly steel and copper or aluminum, may be roughly 32 kg, and the volume of the active element may be approximately 0.007 m3. The commodity cost and size requirements of the generator material compares favorably to the corresponding costs for present-day-technology chemical storage batteries. Of course, the additional active battery material adds capacity, but the value of this capacity diminishes if it far exceeds the needs for average load power.

Figure 2A:
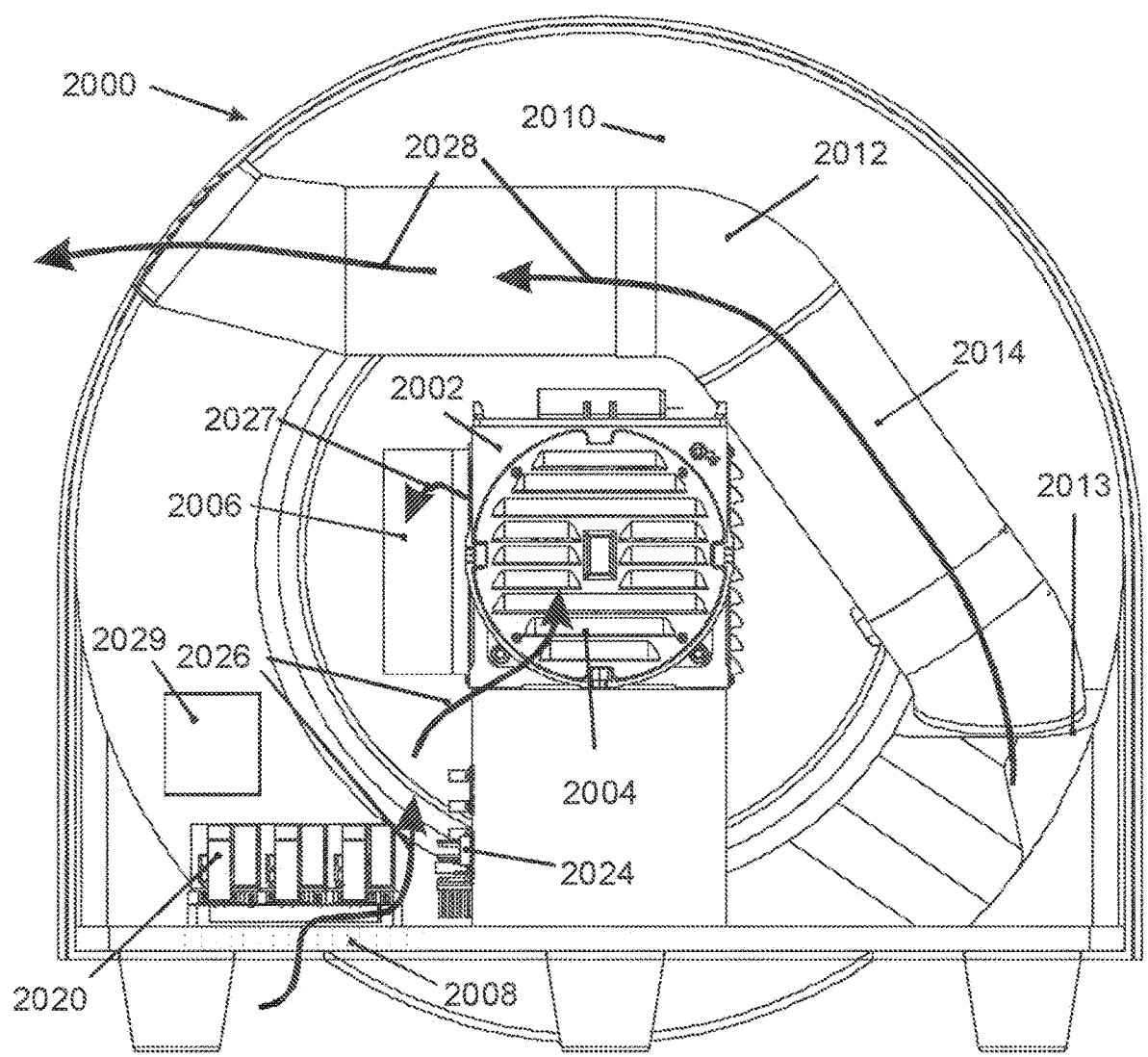
FIG. 2A shows a front-side view of an exemplary microgrid system controller with a front cover removed according to an embodiment.

FIG. 2A shows a front-side view 2000 of an exemplary microgrid system controller with a front cover removed according to an embodiment. Element 2002 is an AC generator. Element 2020 comprises in part a variable frequency drive to start the motion of the generator. Element 2024 is a controller board herein called an "agent" used to manage the voltage waveform experienced by a connected inverter. Element 2012 is an exhaust air duct and element 2014 is a duct-based resistive heater used to dissipate surplus energy from an inverter.

Airflow Control

Some embodiments seek to take advantage of air motion induced by the flywheel to enhance the cooling performance of one or more of: electronics, generator, bearings, or heat dump heater. In the embodiment of FIG. 2A, element 2008 is an array of negative-pressure (inlet) holes positioned so incoming air passes over cooling fins on the circuits 2020 and 2024. In some alternative embodiments a circuit is cooled by a positive pressure induced by the flywheel. The flow lines 2026 represent the route of air into the unit, over electronics and into the generator body. Element 2006 is an air duct from the air exit of the generator into the flywheel cavity whose outer front is surface 2010. Flow line 2027 depicts the route of air from the generator into this cavity. Element 2013 is the exhaust port of the flywheel cavity. This port feeds forced air through heater 2014 and ductwork 2012 along the flowlines depicted by 2028.

Some embodiments further comprise element 2029, a thermally conductive plate disposed on the wall of the flywheel cavity 2010. In some embodiments, the thermally conductive plate extends to comprise more or all of 2010. The opposite surface of 2029 is exposed to flywheel-induced recirculating airflow. Some embodiments employ this plate as a cold plate or heat sink for at least one power electronic component.

Figure 2B:
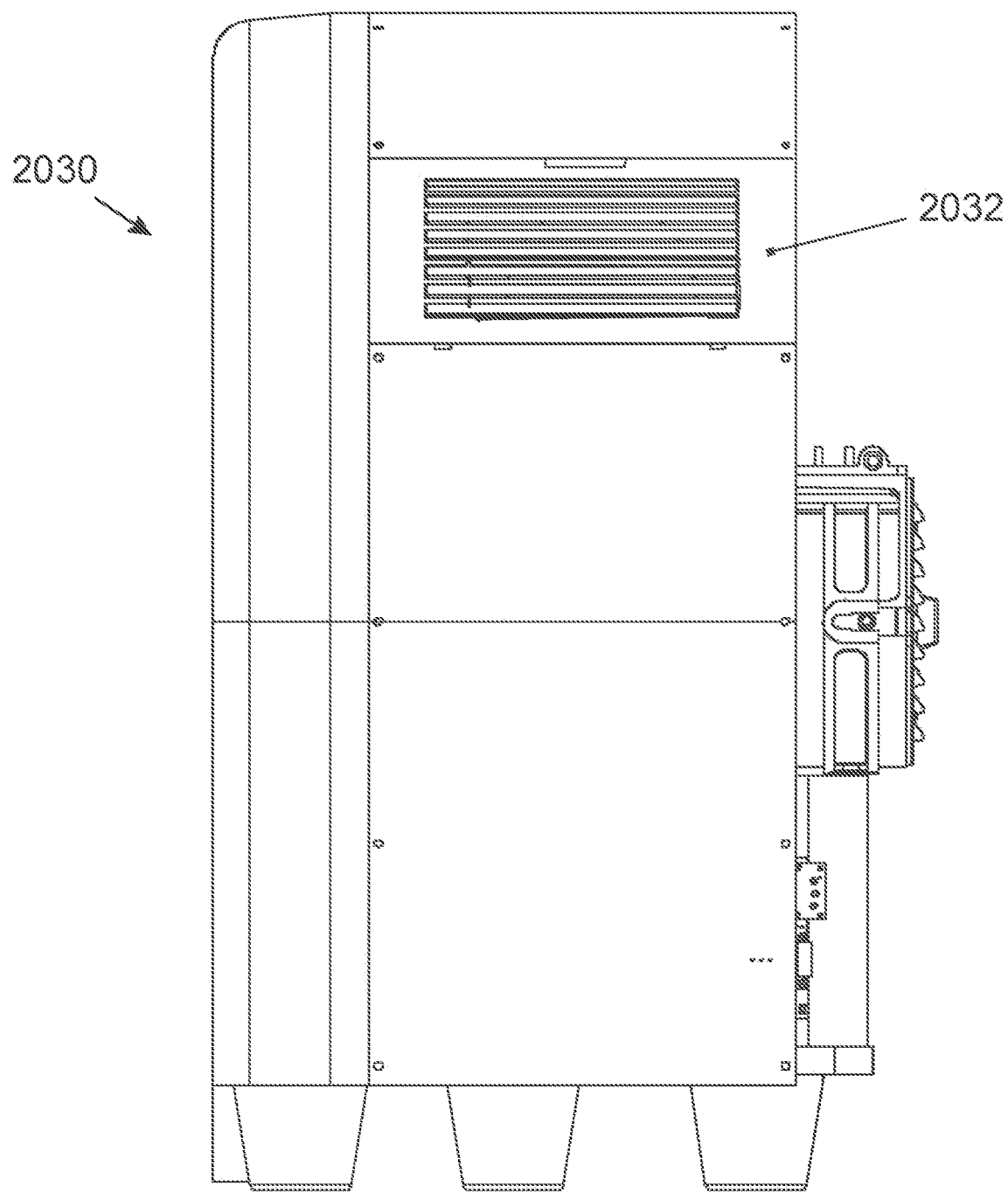
FIG. 2B shows a side view of an exemplary microgrid system controller according to an embodiment.

FIG. 2B shows a side view 2030 of an exemplary microgrid system controller according to an embodiment. Element 2032 is an exhaust air vent. In some embodiments, this vent may be steered. In some embodiments, this vent cover can be removed or swung open revealing a connector for a detachable flexible vent hose, such as a dryer hose. In some embodiments, a cavity behind the vent cover provides storage for a collapsed segment of high-temperature air hose. In some embodiments this allows dump heat to be routed for best effect, e.g., for drying or heating or to dump unwanted waste heat where it is not a nuisance.

Figure 2C:
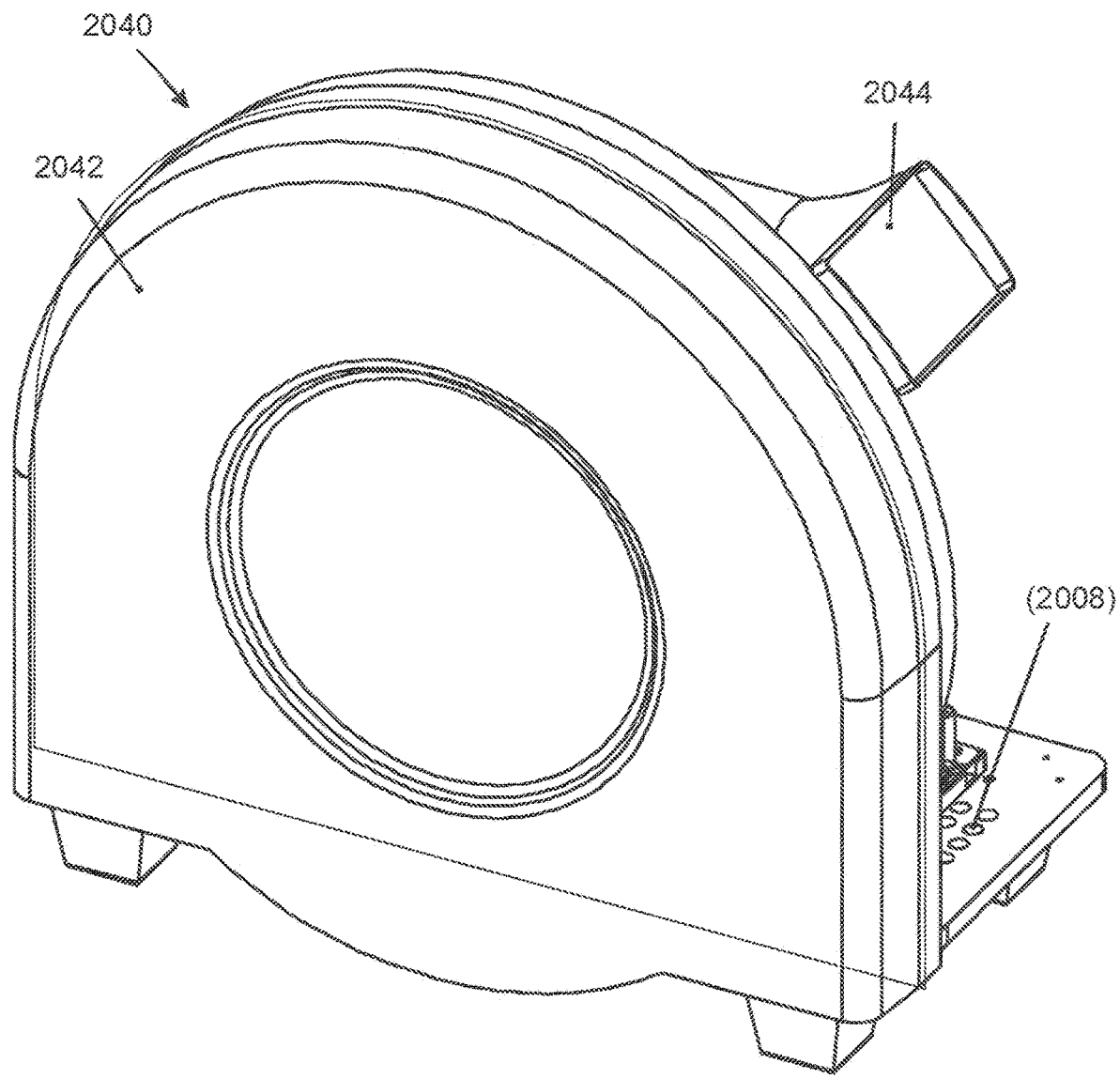
FIG. 2C shows a back-side view of an exemplary microgrid system controller with central and front covers removed according to an embodiment.

FIG. 2C shows a back-side view 2040 of an exemplary microgrid system controller with central and front covers removed according to an embodiment. Element 2042 comprises the back cover and the rear outer surface of the flywheel cavity. In some embodiments, the flywheel-facing surface is substantially smooth and streamlined to reduce aerodynamic drag. Element 2044 is the exit cavity of the duct 2012.

Figure 2D:
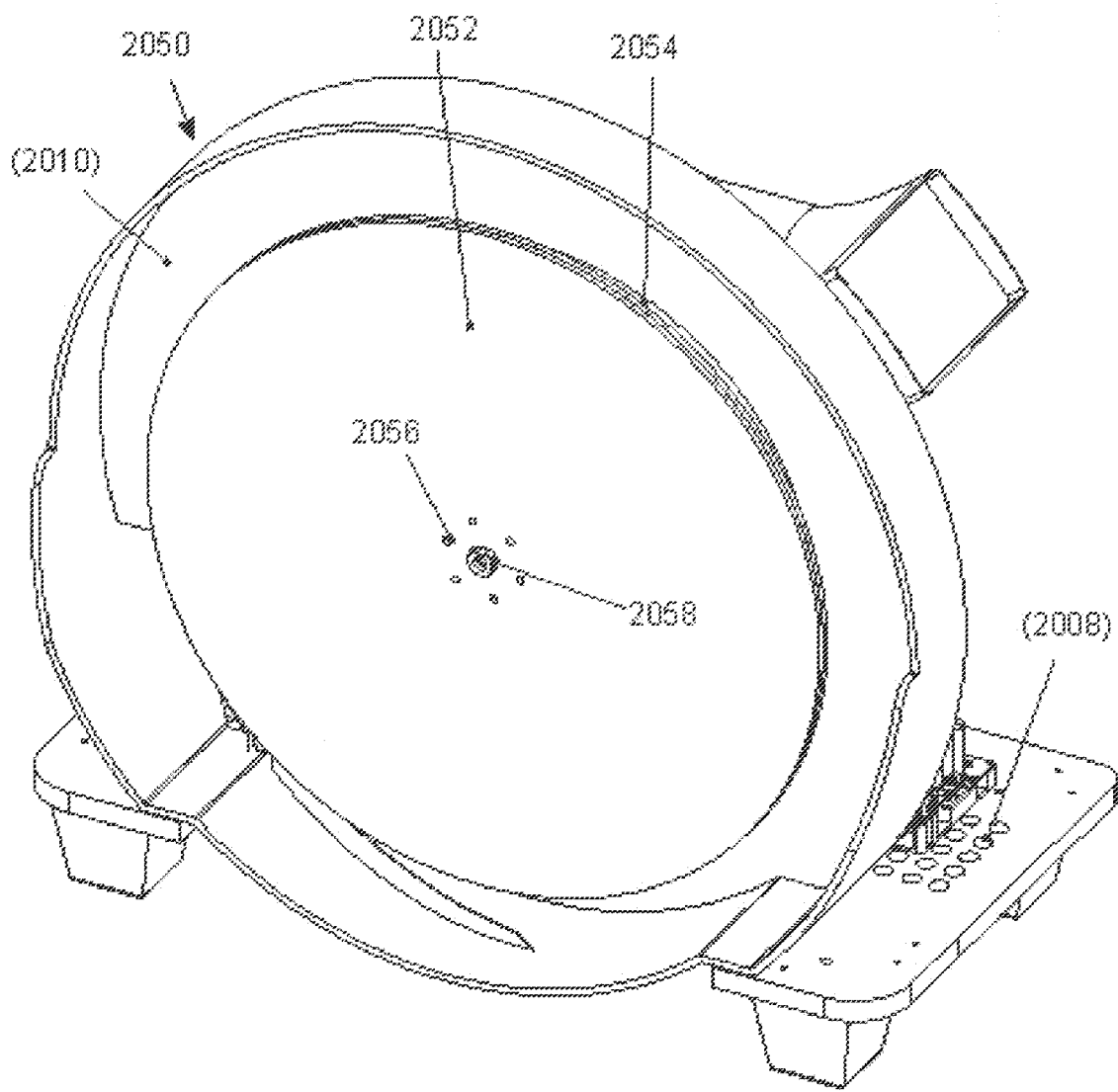
FIG. 2D shows a back view with a back cover removed of an exemplary microgrid IO system controller according to an embodiment.

FIG. 2D shows a back view 2050 of an exemplary microgrid system controller with a back cover removed according to an embodiment. Element 2052 is a flywheel. In some embodiments the flywheel comprises one or more sheets or plates of steel that is stamped, cut, or machined into an axisymmetric shape. In some embodiments, the flywheel may comprise a stack (2054) of multiple cut parts. This may facilitate installation over a single heavy flywheel. It may further simplify adding or removing flywheel storage capacity. Elements 2056 are holes for bolts that hold the flywheels firmly to a flange. In some embodiments, these holes are slightly oversized so that the bolts do not substantially resist any outward deflection of the flywheel under centripetal loading. In some embodiments, the hub shaft 2058 fits the central hole of 2052 with a substantially tight tolerance, e.g., 0.05-0.5 mm. In some embodiments, this shaft provides the primary radial force that centers the flywheel. In some embodiments, the flywheel is waterjet cut to net shape. In some embodiments, an outer surface of the flywheel may be smoothed or polished to reduce aerodynamic drag.

Figure 2E:
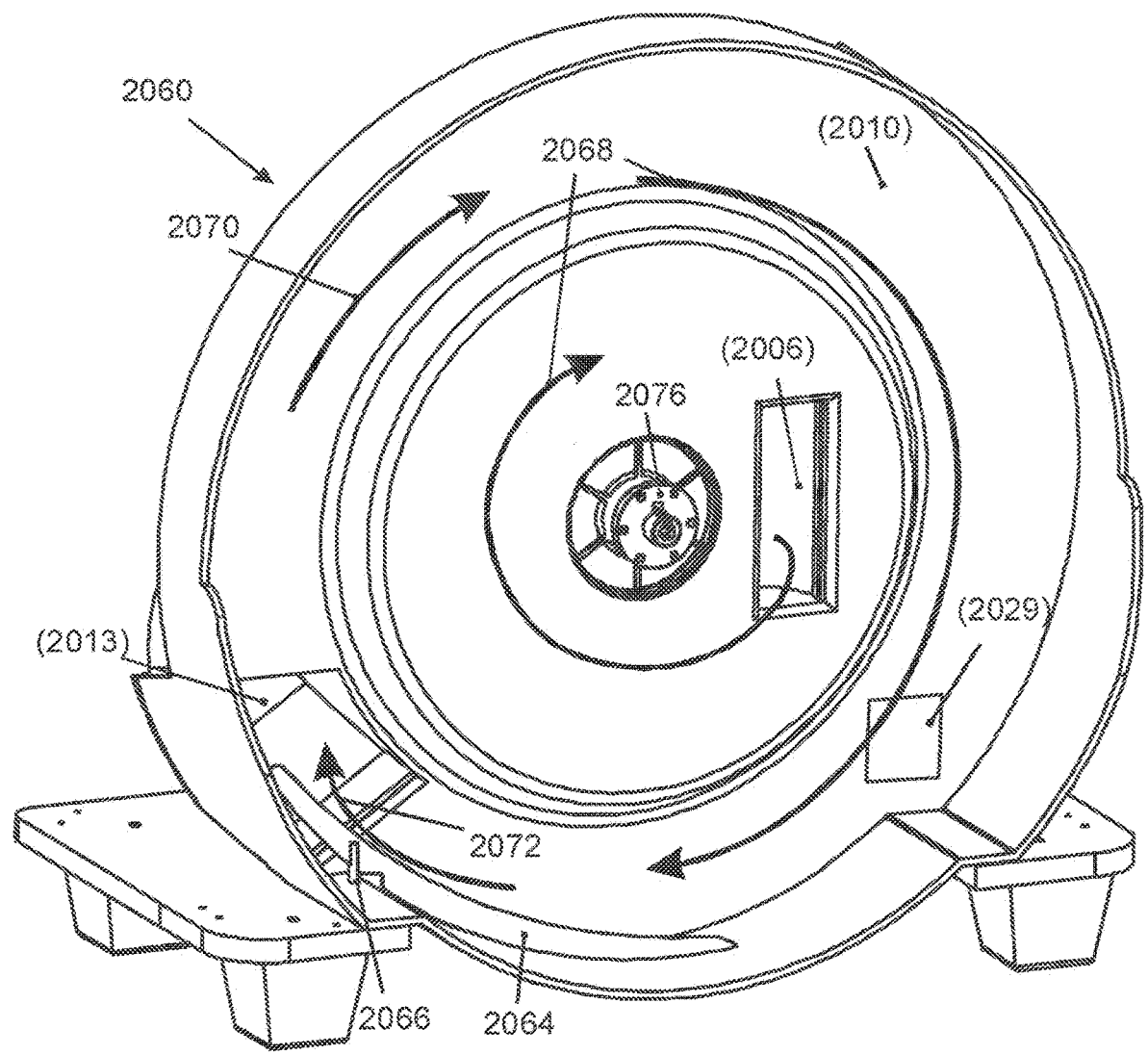
FIG. 2E shows a back view of an exemplary microgrid system controller with a flywheel removed according to an embodiment.

FIG. 2E shows an alternative back view 2060 of an exemplary microgrid system controller with a flywheel 2052 removed according to an embodiment. Element 2006 is the air inlet cowling from the generator and element 2013 is exhaust duct of the flywheel cavity. In some embodiments an aerodynamic vane 2064 may be used to augment the flywheel-induced flow through the exhaust. In some embodiments an actuator 2066 may be used to regulate or adjust the flow through the exhaust. In some embodiments this flow control is used in concert with the heat dump to maintain a desired out-flow or case temperature. Some alternative embodiments employ a variable obstruction that changes the flow area of 2013. Elements 2068 represent the gradual outward spiral of the flywheel induced flow. The relatively wide cavity around streamline 2070 may reduce aerodynamic drag losses. Streamline 2072 represents the outflow path. Element 2076 is the flywheel mounting flange/hub which in some embodiments is affixed to the generator shaft strongly enough to resist pulling off the shaft under any flywheel fault condition. In some embodiments, this flange locks into a mechanical detente, groove, or shoulder of the shaft. In some embodiments, this flange is welded to the shaft. In some embodiments this flange is held to the shaft with at least one high-strength pin.

Element 2029 is the side of the cooling plate exposed to induced airflow. In some embodiments, this plate may further comprise surface features to increase the wetted area. In some embodiments, a surface feature of 2029 may be substantially aligned in the circumferential flow direction.

FIGS. 2F-2J show alternative arrangements of the power dump and cooling air vents according to some embodiments. Some embodiments comprise a housing element 2102 designed to prevent ingress of standing water. Some embodiments further comprise one or more housing elements 2104 designed to shed rain water. Some embodiments further comprise an element or elements 2106 designed to prevent ingress from splashes, insects, animal, fingers and the like such as a screen, a hydrophobic mesh, etc. Such elements may facilitate the use in hurricane or flood disaster recovery or use outdoors. Elements 2108 and 2110 are respectively the air inlet ports and air exit ports.

Figure 2F:
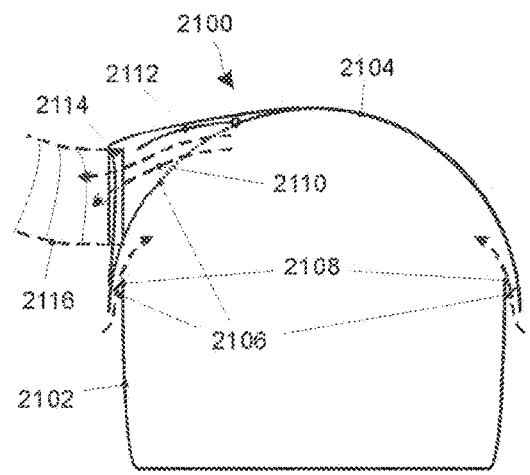
FIGS. 2F-2J show alternative views of air inlet and outlet configurations of exemplary microgrid system controllers according to some embodiments.

FIG. 2F shows an arrangement 2100 comprising a plurality of inlet ports according to an embodiment. The exit port may comprise a flap 2112. In this embodiment, element 2114 is a hose connector. Element 2116 is a fixed or detachable flexible hose that may be used to position the exhaust heat.

Figure 2G:
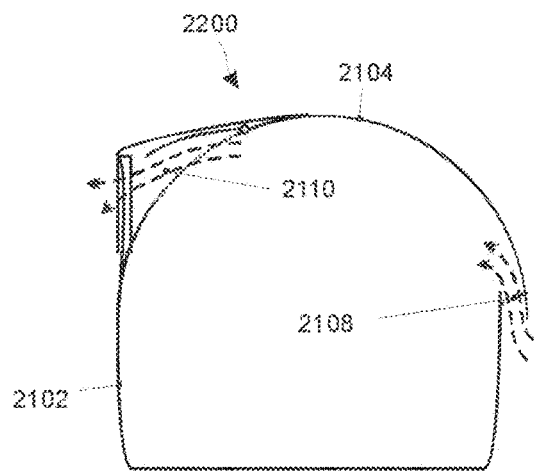

FIG. 2G shows an arrangement 2200 comprising an inlet port and an exit port on opposite sides of the device according to an embodiment. Such an arrangement may help to prevent re-ingestion of exhaust air.

Figure 2H:
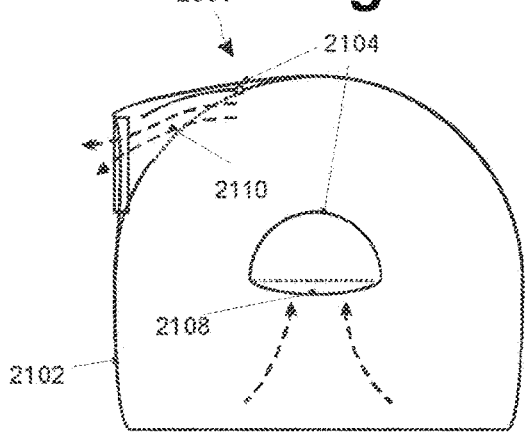

FIG. 2H shows an arrangement 2300 comprising an inlet located proximally to the generator air inlet according to an embodiment.

Figure 2I:
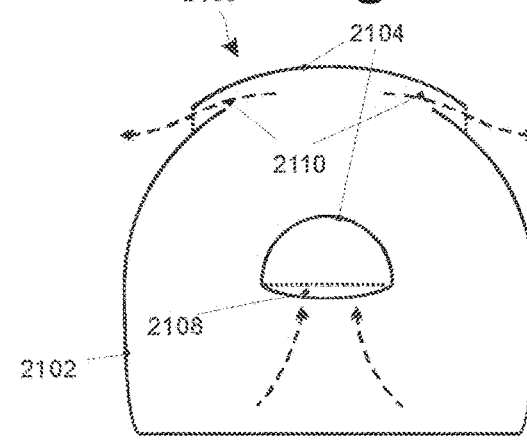

FIG. 2I shows an arrangement 2400 comprising a plurality of air exits according to an embodiment.

Figure 2J:
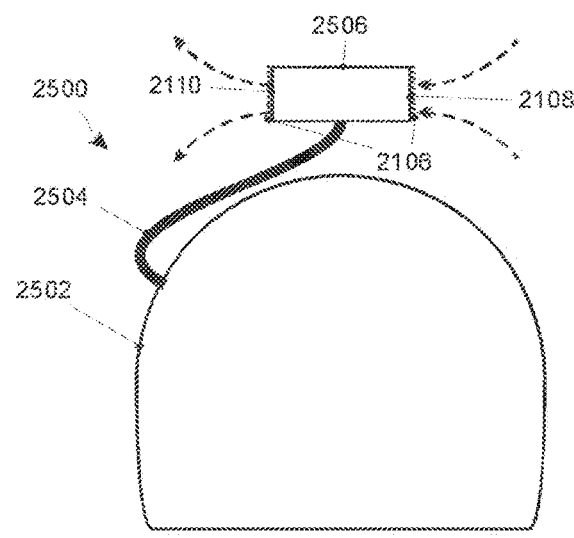

FIG. 2J shows an arrangement 2500 that houses the active power dump outside a substantially water- and air-tight housing 2502 according to an embodiment. Element 2504 is an electrical cable carrying power and control lines. Element 2506 comprises a load and load housing. In some embodiments, element 2506 further comprises a fan. Some such embodiments may eliminate an internal cowling (2010) allowing the fly-wheel-induced air to circulate throughout the interior of the housed system. Such an arrangement may spread internally generated heat for better natural convection from the outer surface of 2502.

In some embodiments an element of the outer housing is made of a thermally conductive material. Such an arrangement may enhance removal of heat from the interior of the system. In some embodiments an element of the outer housing comprises an insulating material. Such an arrangement may prevent burns from contact. Some embodiments may comprise both thermally conductive elements and insulating elements to provide both efficient cooling and safety from burns. In some embodiments the housing may comprise a metal shell with a perforated, slotted, meshed, screened, or otherwise disposed outer insulator that keeps fingers away from heated surfaces, but facilitates airflow.

Figure 3:
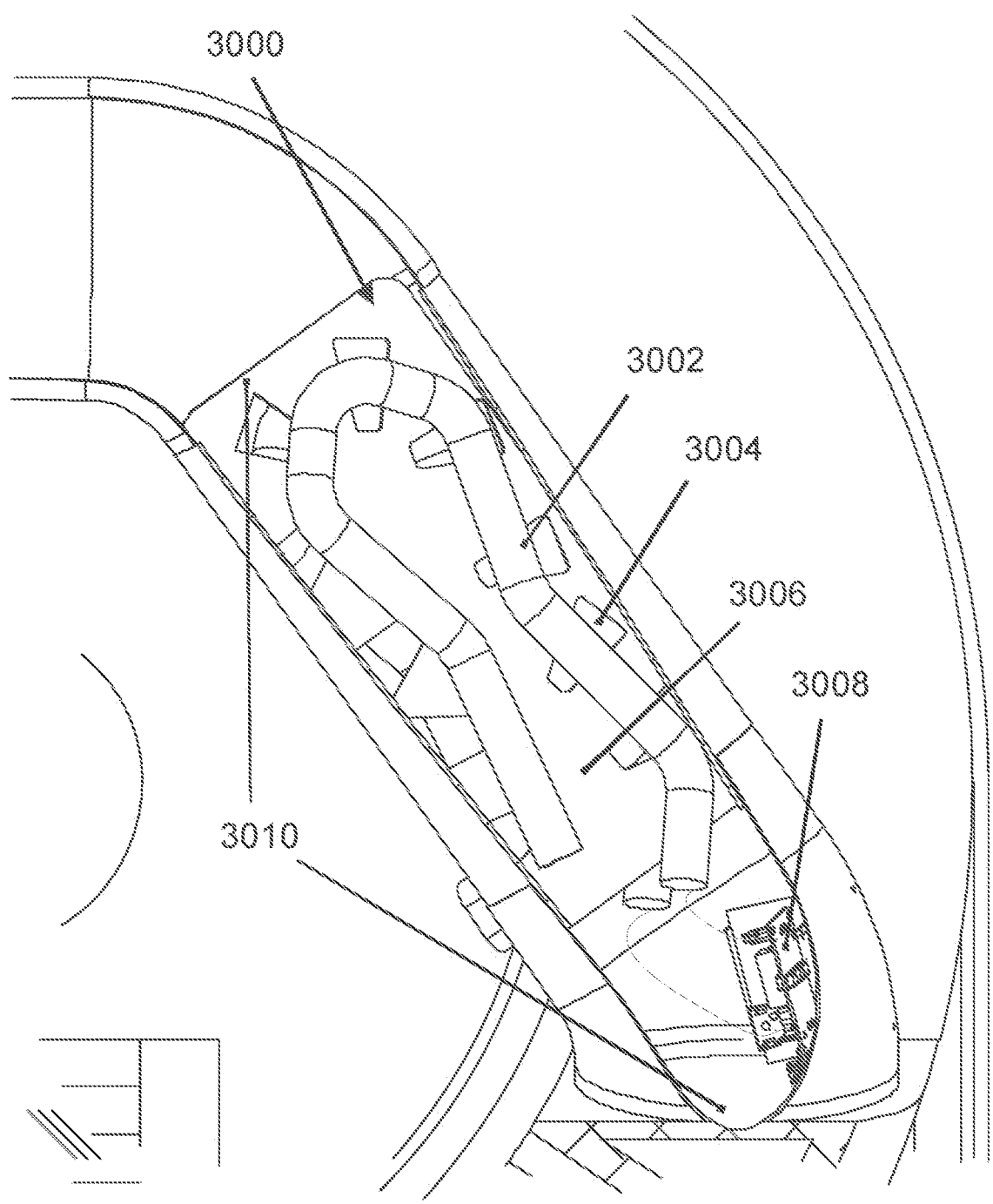
FIG. 3 shows a view of an interior of an exemplary microgrid system controller having a ducted heater according to an embodiment.

FIG. 3 shows a view 3000 of an interior of an exemplary microgrid system controller having a ducted heater 2014. Element 3002 represents the outside extent of a coil of a heating element, e.g., a nichrome wire. Element 3004 is a ceramic or other high-temperature insulating standoff from the internal frame 3006. This frame structure may be substantially flow aligned to reduce back pressure or aerodynamic losses. Element 3008 is a dump load switch circuit. Some embodiments further comprise metallic or screen, mesh, perforated plate, etc. at the entrance and exit of the heater 3010 to contain electromagnetic emissions that may otherwise radiate resulting from PWM-ing or otherwise modulating a switch in circuit 3008. Some circuits 3008 employ substantially constant-on-time switching, which may confer faster time response and may help to eliminate excessively short switching pulses at low duty cycles. In some embodiments, the constant on-time may be adjusted dynamically for power conditions. In some embodiments, the controller may change switch driving modes in different parts of the AC cycle. For example, the controller may aggressively enforce zero-crossing times by switching full on or near full on, whether the voltage waveform is out of specification or not. This may help to satisfy a PV inverter that is probing the grid signal by perturbations.

Some embodiments comprise a second, in some cases low-pass-filtered dump circuit which can be wired or plugged into an appropriate load. Some embodiments comprise a water heater circuit similar to an instant hot water heater. Some embodiments may employ a limited amount of water heating in normal operation or as a thermal fail-safe.

Electrical Connections

Some embodiments comprise a unit having one or more of: an AC connection to an output of a PV inverter, an AC connection to a circuit breaker rated appropriately for a PV inverter on an electrical panel, or an AC connection to a circuit breaker rated appropriately for a generator on an electrical panel.

Some embodiments further comprise an actuatable switch rated appropriately for a generator. In some embodiments, this switch may comprise one or more of a thyratron, SCR, MOSFET, IGBT, transistor, or an arrangement thereof, a solid-state relay, a mechanical relay, a contactor, or a manual switch. In some embodiments, this switch is actuated by a controller circuit in the unit. In some embodiments the switch is manually controlled. Some embodiments employ a circuit breaker in lieu of this switch.

Agent Controller

The agent module (2024) may comprise power switching circuitry to do one on more of: apply a load to the inverter output, isolate the inverter from a load, or apply power to an inverter output. The role of the agent may be to manage these loads. A second role of the agent may be to provide protection for loads connected to the external electrical panel, herein called "microgrid loads." In some embodiments, while the generator is connected to the external electrical panel its low output impedance provides damping of voltage transients. However, when the generator is disconnected from the microgrid (e.g., during a microgrid blackout) this protection is not present.

Continuous Overvoltage Protection

Figure 4A:
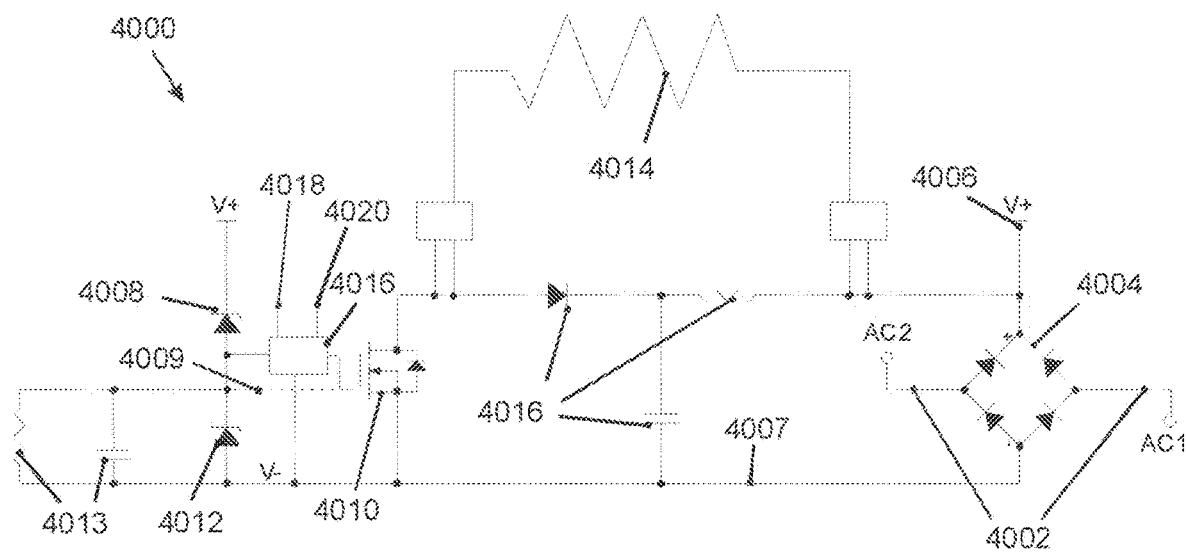
FIG. 4A shows a schematic view of an exemplary circuit having a passive overvoltage power dump according to an embodiment.

In some embodiments, some agent circuitry remains connected to the electrical panel/loads even during a microgrid blackout, for example, an overvoltage power dump used to protect devices connected to the electrical panel from inductive spikes, spurious generated voltage sources such as induction motors, or other faults. Some embodiments comprise a metal oxide varistor or other such powerline protection device. Some embodiments may comprise a protection module as shown in FIG. 4A, which is a schematic view 4000 of a passive overvoltage power dump according to an embodiment. In circuit 4000, two AC circuits 4002 are full-wave rectified by 4004 producing a positive voltage difference between 4006 and 4007 that is substantially proportional to the absolute value of the peak voltage between inputs 4002. Element 4008 is an avalanche or Zener diode having an appropriate reverse breakdown voltage such that when the voltage 4006 to 4007 exceeds a threshold, in some embodiments, current flows through diode 4008 through conductor 4009 into the gate of switch 4010, raising the gate voltage to a value that may be limited by Zener diode 4012, e.g., having a 6 to 20 V reverse breakdown voltage. Some embodiments of 4010 comprise a MOSFET, IGBT, etc. Some embodiments may further comprise a current-limiting resistor in this diode circuit, however this may increase the actuation delay of switch 4010 and affect the performance in protecting against fast transients.

When the gate voltage of switch 4010 exceeds a threshold, it turns on providing a low resistance path between 4006 and 4007 through power resistor/heating element 4014. A snubbing network 4016 may provide a current path for intentional or parasitic inductance of load 4014 to dissipate without producing a voltage spike across switch 4010 when turning off.

Circuit elements 4013 and 4012 are intended to tailor the turn-on and turn-off dynamics of switch 4010. It may be desirable to operate the switch substantially in its fully saturated gate state to avoid excessive heat generation in the switch. In some embodiments, the gate circuit contains a nonlinear element 4016, such as a voltage supervisor or under-voltage lockout circuit, to prevent out of saturation behavior. Some such embodiments may further comprise circuitry to accept a second input, e.g., a digital switch signal 4018. Some such embodiments may comprise circuitry to perform logic such as an 'or' operation on a second input with the primary input in setting the switch-gate state. Some embodiments may comprise an input 4020 that is an analog signal. Some such embodiments may comprise logic and a comparator function between the primary and secondary input to determine the switch-gate state.

Some fast overvoltage protection embodiments comprise protection between single-phase circuits L1 and L2 (applied across 4002). Some embodiments comprise protection between single-phase circuits L1 to N (applied across 4002 of one circuit) and L2 to N (applied across 4002 of a second circuit). Some embodiments provide capacitive isolation to at least one AC line, allowing the two single-phase circuits driving separate bridges 4004 to share the same switch circuit and load.

Inverter Voltage Limiting

As used herein, the phrase 'tripping the inverter' refers to applying an out-of-specification voltage waveform to an inverter that causes the inverter to pause output or shut down, herein called 'tripping.' An objective of the agent controller may be to prevent the inverter from tripping over the widest practical envelope of load applications. As used herein, the phrase 'derating inverter output' refers to an inverter operating below the maximum power point because of a frequency, voltage amplitude, or instantaneous voltage excursion past a nominal setting, e.g., 'voltage-frequency control.'

Some agent controllers comprise circuitry to ensure the inverter experiences only in-specification voltage waveforms that prevent inverter tripping while the apparatuses described herein are operating. An 'in-specification voltage waveform' may comprise minimum and maximum sinusoidal voltage amplitudes and frequencies and instantaneous voltages that may be fixed, linked to each other, set programmatically, or set via non-volatile memory settings according to a configuration. As used herein a 'voltage envelope' comprises the instantaneous minimum and maximum allowable voltages and may further comprise other instantaneous thresholds.

Envelopes or threshold may similarly apply to other sensed parameters, such as current and temperature. For example, an agent in a grid-connected unit may enforce a "no-power-export" requirement or otherwise limit power export via such an envelope. These envelopes may depend in real time on measurements, e.g., a current envelope may be reduced when the temperature is high.

Some embodiments contain circuitry to ensure the inverter experiences only voltage waveforms that support its nominal output, so that the inverter can operate substantially at the maximum power point setting of the solar array. Some embodiments relax the maximum voltage or frequency specifications to allow an inverter to derate its output by a fixed or programmable amount, a fixed or programmable fraction of output, or a combination. Some embodiments adaptively change at least one envelope setting according to measurements of one or more of production, load, time-of-day, or temperature. Some embodiments change at least one envelope setting according to external commands, e.g., from a home-automation system.

Figure 4B:
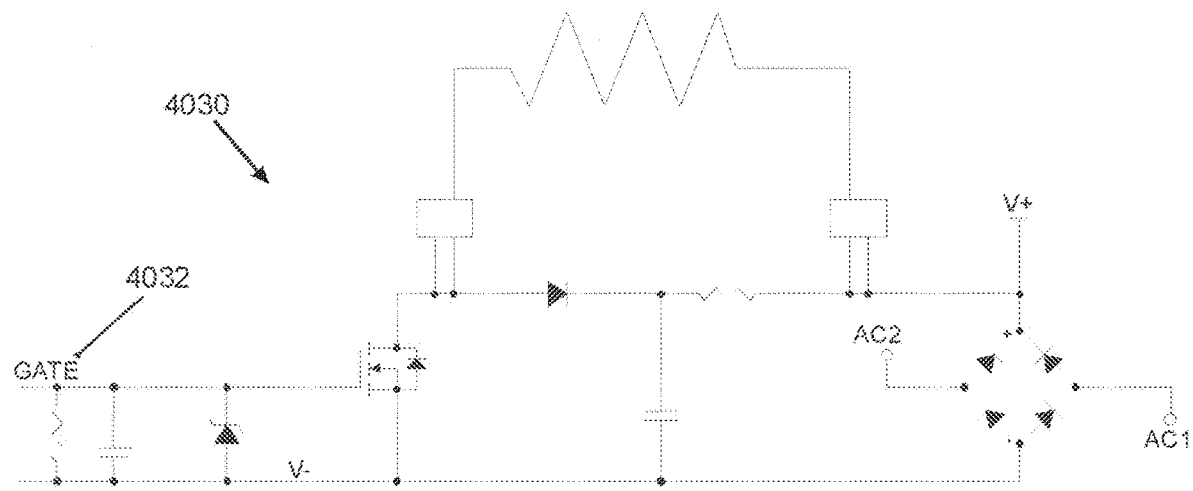
FIG. 4B shows a schematic diagram of an exemplary circuit having an agile load dump circuit according to an embodiment.

Some agent controllers control at least one agile load dump circuit. FIG. 4B shows a schematic diagram 4030 of an embodiment of such a circuit. Its operation is identical to that of the overvoltage protection circuit FIG. 4A, except that the gate signal 4032 is applied (in some embodiments through voltage isolation) by the agent controller instead of leakage through an avalanche diode.

In some embodiments a microcontroller performs calculations to establish numerical values related to the voltage envelope according to a configuration. In some embodiments, this configuration or this calculation employs a 'derating factor' that reduces the allowable range from the inverter's limits to prevent measurement error or line-impedance effects from tripping the inverter or to provide tolerance for control-loop lag, hysteresis or perturbations used in the internal workings of the agent's power circuitry. In some embodiments, a microcontroller discretizes the voltage envelope into 'lookup tables' of numeric entries representing the instantaneous voltage minimum and maximum limits. In some embodiments, these lookup-table settings are dynamically updated by a control system or in response to a digital command. The use of such lookup tables may facilitate efficient updates of real-time parameters in high-speed interrupt service routines.

In some embodiments, a microcontroller maintains a model of an ideal instantaneous voltage, phase, and voltage amplitude, herein called a 'target' to apply to the inverter. In some embodiments, this model is derived from one or more of: repeated analog to digital conversion, analog comparison, zero-crossing detection, digital handshaking lines to a second controller, digital communication lines, analog handshaking lines from a second controller, or an analog waveform.

In some embodiments, a microcontroller generates one or more analog voltage waveforms related to the instantaneous voltage envelope at the target phase, herein called 'inverter voltage limit signals' (IVLS). In some embodiments this generation employs a digital-to-analog converter (DAC) peripheral. In some alternative embodiments, this generation employs a filtered pulse-width modulated (PWM) waveform with due compensation of phase lag of the filter.

In some embodiments, at least one analog comparator compares an analog signal, herein called the 'inverter voltage monitor signal' (IVMS), derived from the actual inverter voltage by one or more of: resistive division, filtering, level shifting, or phase shifting, with an IVLS to produce a digital signal that changes state when a limit threshold is exceeded. In some embodiments, this digital signal may trigger one or more of: a switch, an interrupt, a timer, a counter, or a gate. In some alternative embodiments, a comparator generates an output based on the comparison of the sum or difference of IVMS and IVLS with a fixed voltage reference, including 0V.

Some embodiments comprise a further signal, herein called a 'switch coordinator signal' (SCS) comprising a periodic perturbation signal, such as a triangle waveform at a preferred switch frequency. In some embodiments the SCS frequency lies between 4 kHz and 1 MHz and preferably between 25 kHz and 250 kHz. In some embodiments this signal is summed or differenced with the IVLS or IVMS. In some embodiments this signal is summed or differenced with the difference between the IVLS and IVMS. In some embodiments this perturbation signal has a hysteretic effect that favors the establishment of switching at a desired frequency.

Some embodiments employ a weak positive feedback signal from the output of the comparator to the input to effect hysteresis that may have the effect of limiting the maximum switching frequency. Some embodiments comprise a digital switch-duration limiter. Some embodiments comprise a monostable timing circuit. Some embodiments comprise a counter circuit. Some embodiments allow real-time programmatic control of the switch duration.

Some embodiments perform rapid analog to digital conversion of a IVMS and digitally compares the instantaneous reading with one or more instantaneous limits. In some embodiments an excursion past a limit may prompt an immediate response, e.g., an abrupt increase or decrease in a PWM duty cycle or an abrupt change in switch state. In some embodiments this change may be relaxed after a subsequent measurement lies within the instantaneous limits An abrupt excursion may be caused by an inrush current to capacitors, a motor start, the actuation of a switch on a heavily loaded circuit, cycling on and off of a main load like an oven, etc. In some embodiments, the agent circuitry and firmware have sufficiently high time response to maintain the inverter voltage within the envelope, whatever transient loads appear or disappear. To this end, higher switching frequencies, and higher sampling rates, may be preferred. A typical response time of a comparator may be in the range ns-µs. A typical AID sampling period may be 4 µs-50 µs. A typical PWM period may be 5 µs-50 µs. The inductance of a filter inductor to smooth the switch effect may be judiciously low enough to provide sufficiently high responsivity. In some embodiments, filter capacitors may slow the rate of excursion.

Some agent controllers comprise a closed-loop controller. Some closed-loop controllers adjust the value of a duty-cycle parameter according to a combination of one or more of: the instantaneous error signal between an IVMS and a target, (discrete) nth-order time derivatives thereof, nth-order integrals thereof, the instantaneous error signal between an IVMS and a limit, (discrete) nth-order time derivatives thereof, or nth-order integrals thereof. Some control loops change a least one parameter used in the calculation of a duty cycle depending on an operating state variable. This operating state variable may be changed by high-speed interrupt service routines used to detect excursions past limits.

In some embodiments, if the instantaneous inverter voltage error tends toward excessively high voltage (positive or negative) the controller increases the amount of power dumped. In some embodiments this action comprises turning on or increasing the duty cycle of a switch in an agile dump circuit. In some embodiments, if the instantaneous voltage excursion is toward low-voltage (too close to 0 V), the dump power is reduced, e.g., by reducing or zeroing the duty cycle of the power-dump circuit switch. If the low-voltage state is severe, e.g., passes the instantaneous limits, the agent may open an agile isolator circuit between the inverter and microgrid load, momentarily powering the entire microgrid from the flywheel generator. This kind of situation may arise when a high surge load is applied to a microgrid. For example, the surge current to start a rotary power tool may instantaneously exceed 80 A If the flywheel generator has an output impedance of 0.5 0, the microgrid voltage instantaneously drops by 40 V, −17% of the nominal RMS value. This surge decays rapidly over several AC cycles. This level of perturbation to the microgrid may have minimal or no effect on other microgrid loads, but is sufficient to trip the inverter. Legacy PV inverters will trip and not resume power production for long enough that the microgrid will black out (without a secondary source of power, such as a battery inverter).

PV inverters with ride-through capabilities will trip for a number of cycles or seconds, then restore power. However, the seconds of lost power production could still lead to a microgrid blackout. While the isolator circuit is open, the agent may stabilize the inverter waveform by actively controlling the dump circuit.

Figure 4C:
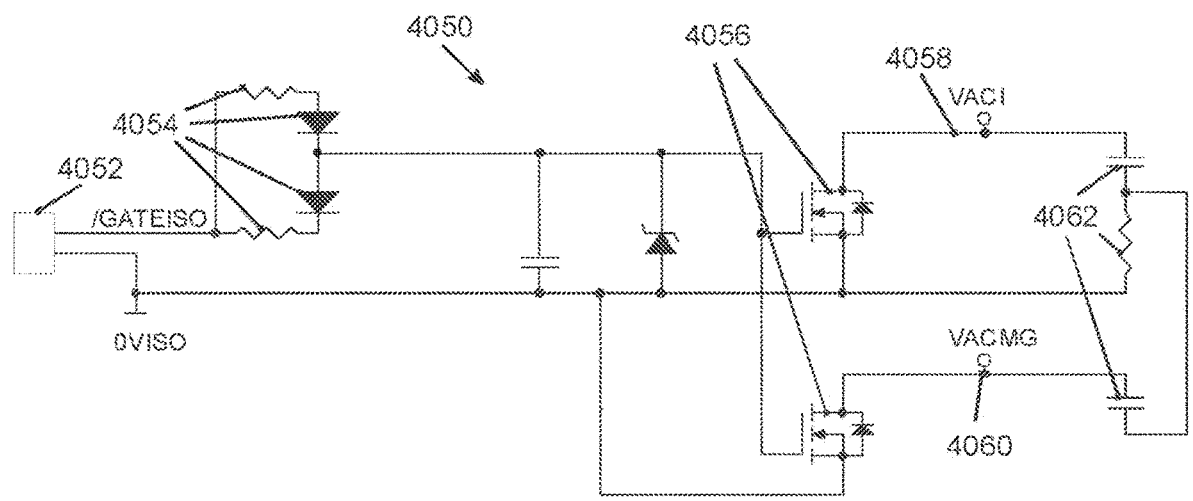
FIG. 4C shows a schematic diagram of an exemplary circuit having a fast isolator circuit according to an embodiment.

FIG. 4C shows a schematic diagram 4050 of an embodiment of a fast isolator circuit according to an embodiment. The agent actively controls the voltage 4052, in some embodiments through an isolated gate driver circuit. The circuit 4054 may tailor the turn-on and turn-off dynamics of the isolator for smoother, low transient isolation and re-connection. Switches 4056 may comprise MOSFETS, IGBT, transistors, etc. They may also comprise thyristors or SCRs, but this may defeat some of the agility of operation e.g., if isolation is only needed during a fraction of an AC cycle. When the voltage 4052 is above a threshold, switches 4056 conduct bi-directionally with low resistance, connecting 4058 and 4060. When the applied voltage is below a threshold, switches 4056 are high resistance and do not substantially conduct bidirectionally. The circuit elements 4062 are intended to smooth and absorb transients that occur during switching. While the switches 4056 are non-conducting, 4062 weakly capacitively couples 4058 and 4060, but not enough to drive the inverter voltage below its limits. In some embodiments, one of the LI and L2 lines is isolated. In some embodiments, such as when an inverter has an active neutral, two lines (e.g., LI and L2, LI and N, or L2 and N) may need to be isolated.

Microgrid Reserve Capacity

In some embodiments, a controller monitors the load current and the PV inverter production capacity. In some embodiments, the controller learns the excess production capacity by measuring or inferring from a switch duty cycle the amount of power it must dump to a load to keep the voltage waveform in specifications. In some embodiments, the microgrid system controller periodically or occasionally ramps its dump power to determine the PV inverter capacity. In some embodiments, the controller measures the current from the PV inverter. In some embodiments, the microgrid system controller controls its dump circuit so that the PV inverter operates substantially at the maximum power point of the photovoltaic array. In some embodiments, this may have the benefit of providing the maximum responsivity to surge loads. The rate at which a PV inverter can slew its output power and determine maximum power point may be practically and regulatorily limited (e.g., to 10-1-102 s), whereas the controller may reduce its dump load power rapidly (e.g., in 10-6-10-3 s). By rapidly shedding dump power, the controller may help to handle fast surges in a time frame that the mechanical response of the flywheel generator (e.g., 10-3-10-2 s) cannot.

If the dump power is used productively, e.g., for heating, drying, cooking, cooling, dehumidifying, process power, battery charging, water pumping, electrolysis, etc., it may be advantageous to operate the dump so that the PV inverter always produces substantially maximal power. If excessive dump power is problematic, e.g., produces excessive temperatures or overpowers a process, etc., it may be advantageous to operate at a lower inverter power, while maintaining a reduced fast-reserve capacity.

In some embodiments, a controller wirelessly signals one or more receivers in response to changes in the reserve capacity. For example, a transition to a low-reserve state may be announced via a wireless transmission or broadcast to one or more of: a smart phone, a home automation controller, a computer, a WIFI access point, a Bluetooth device, a Bluetooth low energy device, a Zigbee device, or a radio receiver or transceiver. This announcement may help a homeowner quickly switch off an appliance or load that they recently added. For example, turning on an electric range may overload the system. Within a second, a beeping on a phone may alert the person using the appliance that it is taking too much power giving the person time to turn off the overload before there is a blackout.

Remote Alerts and Control

The unit may report instantaneous reserve-capacity readings which may be displayed in a variety of formats including images or icons of devices that can be turned on without risking a blackout. In some embodiments, devices may be color coded depending on their risk factor, e.g., grayed out, invisible, or removed from a list may mean a device can definitely not be powered. Red may mean a device may risk a blackout, yellow may mean adding the device will bring the reserve capacity below a desired minimum threshold, green may indicate no problem. In some embodiments, the controller communicates with a smart appliance/smart home server or directly with smart home devices on a priority system. In some embodiments, a user may click an item to add before turning on that item. This selection may be communicated to a controller which may take direct or indirect actions to shed loads or add microgrid capacity to accommodate the request. The state of success of these actions may be communicated to a remote device producing a visual, audio, or tactile feedback that indicates that it is safe to add the load or not.

Microgrid Blackout

In some embodiments, a microgrid blackout may be triggered when a controller senses that the applied loads are unsustainable, e.g., the reserve capacity is less than or equal to 0 or a minimum threshold value. In some embodiments, the controller opens the load circuit via a solid-state relay or other fast acting semiconductor switch circuit. In some embodiments switching is preferably performed at a zero-current or zero-voltage state part of the AC cycle. In some embodiments the controller opens a contactor or breaker between the generator and electrical panel/loads.

In some embodiments, during a blackout, the apparatuses described herein keep the inverters productive and maintains the flywheel rotation, etc. In some embodiments, a user may remotely request the apparatuses to retry powering the microgrid by, e.g., touching a button on a smart phone, etc. In some embodiments, the apparatuses may automatically retry establishing the microgrid when its flywheel is spun up to full capacity.

Energizing the Flywheel Generator

Some generators comprise a brushless design with a split rotor winding with opposing diode rectifiers and a stator comprising a split main winding and an auxiliary winding feeding a capacitor. Some embodiments further comprise one or more damper windings on the rotor. Such a generator may be self-started by use of a single-phase variable-frequency drive (VFD) circuit, behaving qualitatively similar to an AC induction motor until it locks into synchronous rotation. An advantage of the use of a single-phase VFD is a reduction in circuit complexity and an improved ability to utilize stators having different turns ratios in the primary and secondary. In some embodiments shaft or flywheel angle feedback may be merited to optimize the spin-up time, energy, and reliability. Some alternative embodiments comprise a separate VFD phase on the main winding and on the secondary winding. Some generators comprise a brushed design with a substantially DC current in the rotor winding, transmitted across brushes. Advantages of this arrangement may be an improved regulation of output voltage, and an improved ability to sink and source variable reactive power. Such a generator may require an auxiliary stator winding to ensure startup from an arbitrary shaft angle. With a brushed design, there is an increased likelihood of an insulating film produced by corrosion or oxidation between the brush and the rotor contact. In some embodiments, such an insulative layer may be disrupted by applying a momentary high voltage, applying across the brushes a momentary AC or radio-frequency pulse train with or without a DC component.

Some generators comprise a brushless design employing a claw rotor with a non-rotating solenoid at its center. This arrangement may have the benefit of good voltage regulation and reactive power (VAR) control of a brushed design without some of the complications of brushes. A cost may be an increase in leakage inductance. Some generators comprise a permanent magnet on the rotor. In some embodiments, this permanent magnet field augments an armature winding field.

External Flywheel Generator Starter Mechanism

Some embodiments obviate a secondary winding by the use of an external forcing mechanism. In some embodiments the forcing mechanism is one of: a motor, a brushless DC motor, a brushed DC motor, a stepper motor, or an induction motor. In some embodiments, the forcing mechanism is one of a solenoid actuator, a spring, a solenoid-actuated spring release. In some embodiments, flywheel/rotor motion is initiated by actuating a solenoid that imparts a circumferential force on the flywheel, shaft, or rotor. In some embodiments, this motion may scrape a clean contact for brushes. In some embodiments, the actuator impulse is designed to produce enough motion to rotate a rotor that has stopped in a position where the stator winding field does not produce a substantial torque to a position suitable for starting by energizing a primary stator winding.

In some embodiments, an external forcing mechanism obviates an auxiliary stator winding. In some embodiment, the solenoid may be actuated repeatedly so that its impulse to the flywheel can be a multiple of the single actuator impulse. In some embodiments an external starter mechanism may be employed in normal operation to add power to or draw excess power from the flywheel. Such a mechanism may provide a simple means to add DC-side battery backup capabilities, by feeding power to the flywheel generator through the starter mechanism using regulated battery power.

An alternative flywheel generator starter mechanism may be a fuel-burning engine. The engine may be started to energize the fly wheel, then electromechanically decoupled until it is needed to provide additional power. Such an arrangement may provide substantial night-time power capacity while saving on fuel costs during the day.

In some embodiments electrical power to energize the flywheel generator comes substantially from the PV inverter. Because the PV inverter may require a carefully shaped voltage waveform, it may be important to use a power-factor control circuit in the formation of a substantially DC supply to feed a VFD circuit. In some alternative embodiments, the fast-dump circuitry agilely compensates for a lack of or imperfect power factor control on the VFD power supply.

Some VFD controllers comprise a DC supply that can dynamically vary its output during the energizing process. Some VFD controllers comprise a low-voltage, high current power supply, in some cases supplied by a battery, to provide the high-current low-voltage waveforms needed during the early startup of the generator. Such voltage sources may be "or-ed" together using switches or diodes. Some controllers may switch a parallel and series arrangement of a power source such as batteries, transformer windings, motor windings, etc. A motor generator may comprise a centrifugal switch.

5A shows a microgrid system controller 5000 and its external context according to an embodiment, including the PV system, external PV inverter (1004), electrical panel (1006), and an optional grid connection (1005). Elements 5008 represent the physical connection between external and internal wiring and may comprise terminal blocks, swage connections, or other line-voltage connections. In this embodiment, current from the PV inverter output flows through conductor element 5010. Some embodiments comprise a second conductor element 5012 that connects to a circuit breaker 5006 on an electrical panel. At times, element 5012 conducts current from the PV inverter to the electrical panel. Some embodiments may further comprise a connection 5014 that connects to a circuit breaker 5002 on an electrical panel. At times, element 5014 conducts current from the generator 1200 to the electrical panel. In some embodiments, having two separate outputs to the subpanel can independently protect against inverter overloads and generator overloads, which may require substantially different current trip points. Some alternative embodiments comprise an internal circuit breaker 5015 between connection 5013 and 5014, obviating connection 5012. Such an arrangement may have the advantage of a simpler installation process. A retrofit installation may already comprise the PV inverter breaker and wiring, allowing the system 5000 to be spiced into existing circuitry. Element 5004 is an interlock that prevents the simultaneous closure of the generator breaker 5002 and a main switch, e.g., a service disconnect 1010. In this embodiment it is a mechanical interlock that physically interferes with closing both switches simultaneously. Some alternative embodiments may comprise an alternative interlocking scheme or manual or automatic transfer switch to ensure the generator cannot back-feed power to the grid. Some embodiments allow the generator to back-feed the grid and either do not have an interlock or can disable the interlock.

Element 5016 is an actuatable switch, e.g., a relay or other switch as herein defined. In one state, the switch may short-circuit 5010 and 5012 so the current from the PV inverter can flow to the subpanel. In the other state, the switch may short-circuit 5010 and connection 5032 herein called the 'regulated bus.' Element 5018 is an agile power dump circuit like that in FIG. 4A or FIG. 4B, or another switch as defined herein. When actuated, it connects the regulated bus to a load 1574, e.g., a substantially resistive load in the 100's of Watts to 10's of kW range, and preferably in the range where this load can dissipate power comparable to or greater than the capacity of the solar array.

Element 5020 is a second actuatable switch, e.g., a fast isolator such as that in FIG. 4C, or another switch as herein defined. In some embodiments, this switch is used to interrupt current from the regulated bus to the subpanel, e.g., during an overload event to prevent the inverter from turning off its output. Element 5022 is one or more actuatable switch, e.g., a relay, fast isolator circuit or other switch as herein defined, that individually connects the regulated bus to a user-configurable load via a connection 5024. These switches may allow excess power in the regulated bus to be applied to a load other than load 1574.

Element 5026 is an actuatable switch as defined herein that can connect a battery and charge controller module 1520 with the regulated bus. In this embodiment, 1520 can supply power to a variable-frequency drive (VFD) inverter 1540. Actuatable switch 5030 is a relay or other switch as defined herein between the output of the VFD and regulated bus in one position and the output of the VFD and at least one winding of the generator 1200. In this embodiment, element 5034 is a relay or other switch as defined herein that connects circuit 5031 either to circuit 5036 to the primary stator windings 1260 or 5038 to at least one auxiliary or secondary stator winding disposed so that the magnetic field produced by current in the winding lies at an angle along the circumference of the rotor, e.g., 90 degrees with respect to that produced by the primary stator windings. Element 5040 is a relay or actuatable switch as defined herein that connects the output of the generator (5036) with the electrical panel via conductor 5014.

Figure 5A:
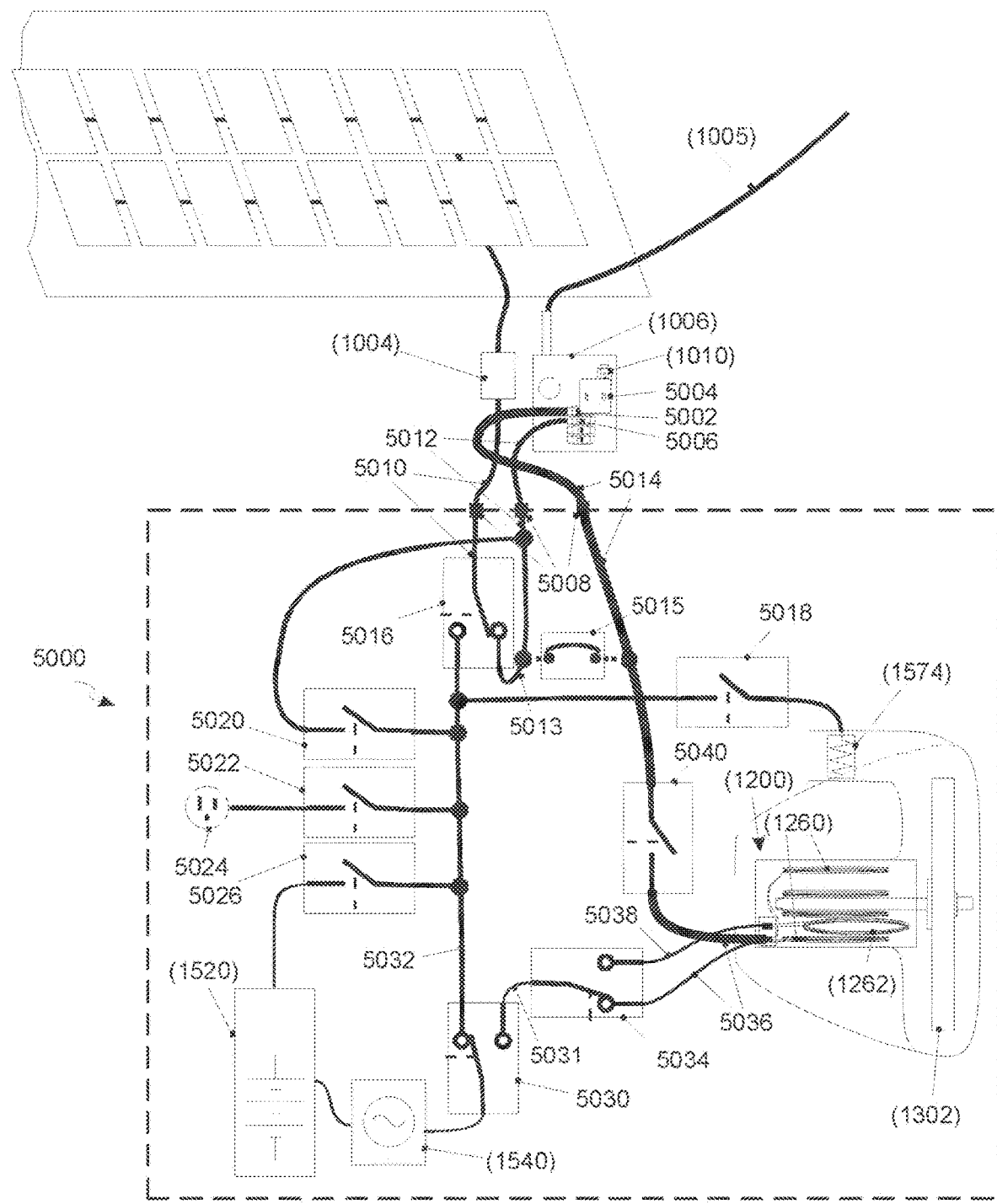
FIG. 5A shows a schematic diagram of a microgrid system controller according to an embodiment.
Figure 5B:
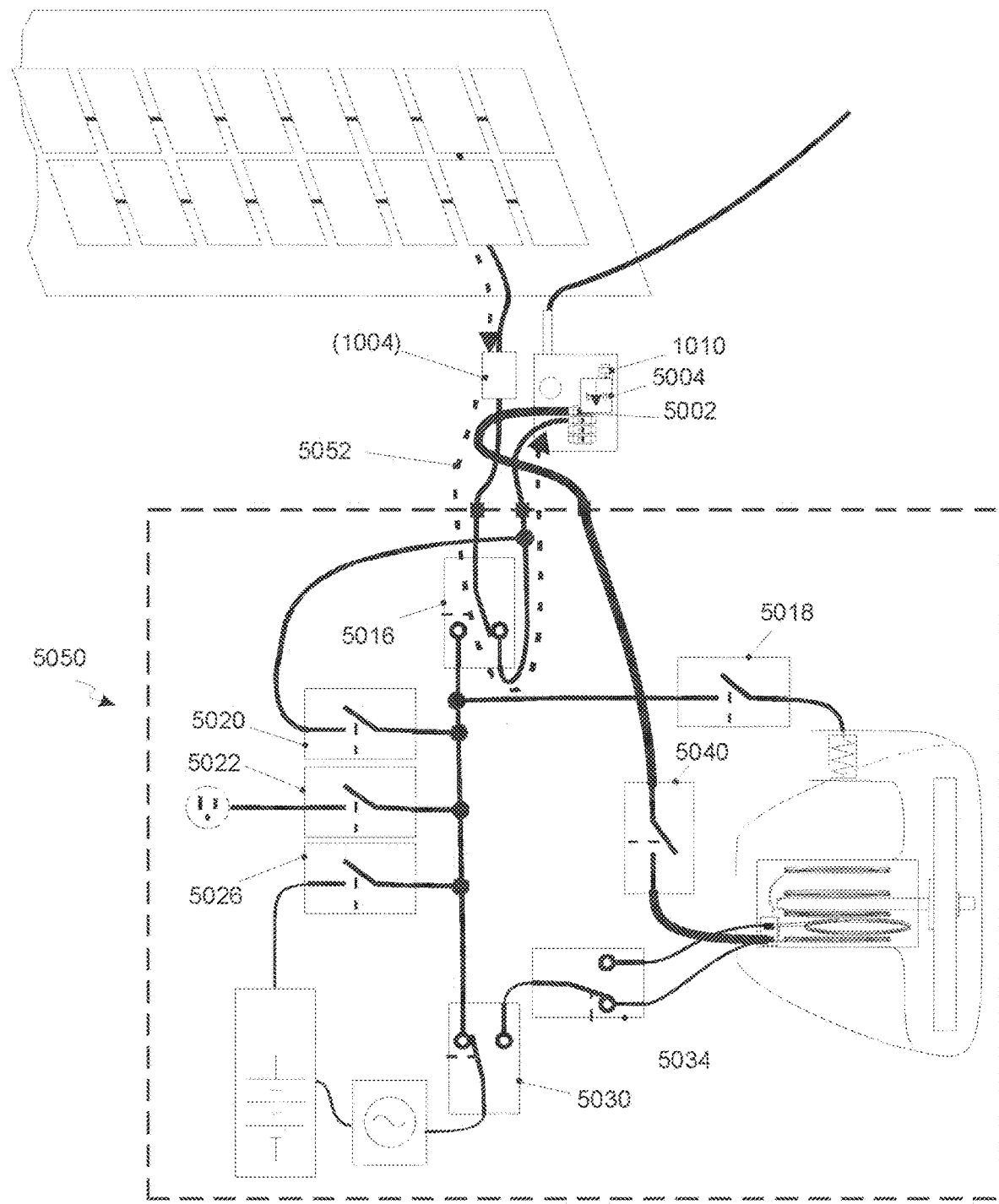
FIGS. 5B-5C show power flow through a microgrid system controller in a grid-connected idle state according to some embodiments.

FIG. 5B shows a microgrid system controller 5000 in a state 5050 wherein power from the inverter flows through switch 5016 to the subpanel along path 5052. In some embodiments, switch 5106 is a relay having this position as its quiescent state. In state 5050, the interlock 5004 is in the position where the service switch 1010 is closed and the generator breaker 5002 is open. In this state, the inverter may feed power to loads on the subpanel and may further supply power to the grid. In this state, the apparatus of 5000 may be substantially un-powered or in a low-power standby state.

Figure 5C:
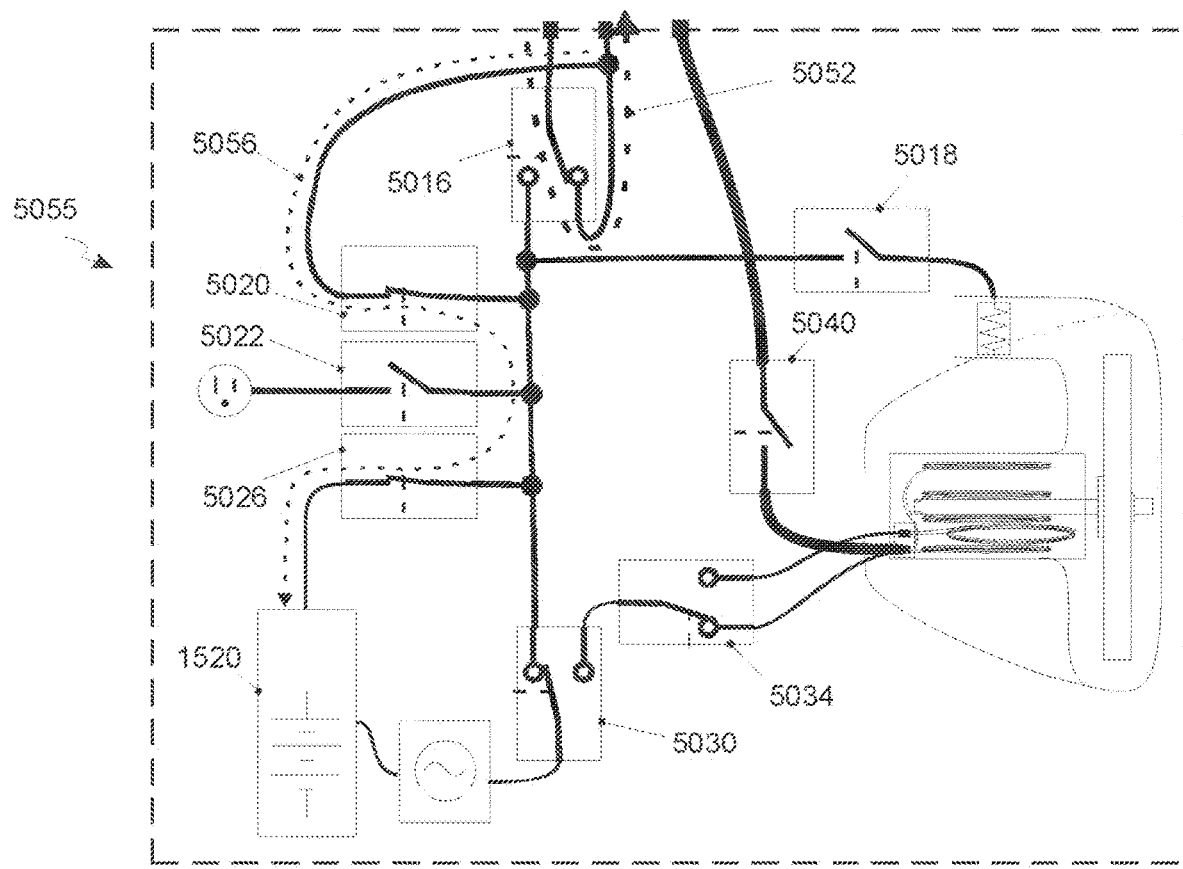

FIG. 5C shows a microgrid system controller 5000 in a state 5055 which is the same as state 5050 except that some power flows through switches 5020 and 5026 along path 5056 to charge battery 1520.

Figure 5D:
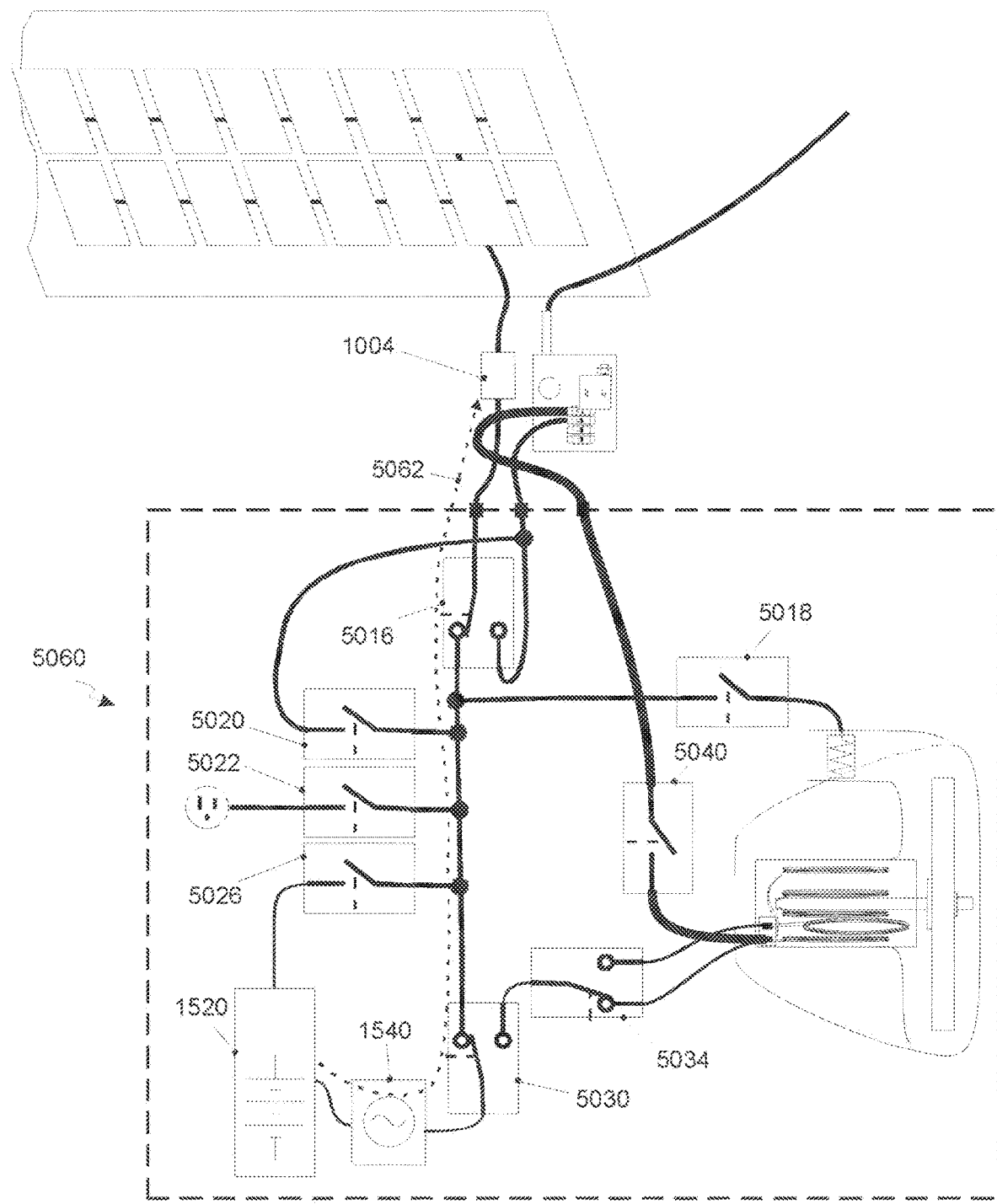
FIG. 5D shows a schematic diagram of a microgrid system controller in an early step of a turn-on procedure according to an embodiment.

FIG. 5D shows a microgrid system controller 5000 in a state 5060, an early step of its turn-on procedure, for example during a power outage. In this state, the interlock 5004 is in the position where the service switch 1010 is open and the generator breaker may be closed. The PV inverter or inverters have shut down because of the outage. The states of switches 5016 and 5020 isolate the regulation bus and PV inverter outputs from the electrical panel. In this state, the battery module 1520 powers an inverter circuit, such as the VFD module 1540. This inverter circuit may operate as a substantially fixed-frequency driver to produce an in-specification grid voltage waveform. Switches 5030 and 5016 direct this voltage waveform along path 5062 to the PV inverter or inverters 1004. This state may take seconds to several minutes while the PV inverter or inverters wait for a prescribed interval of stable grid operation before they begin to source power.

Figure 5E:
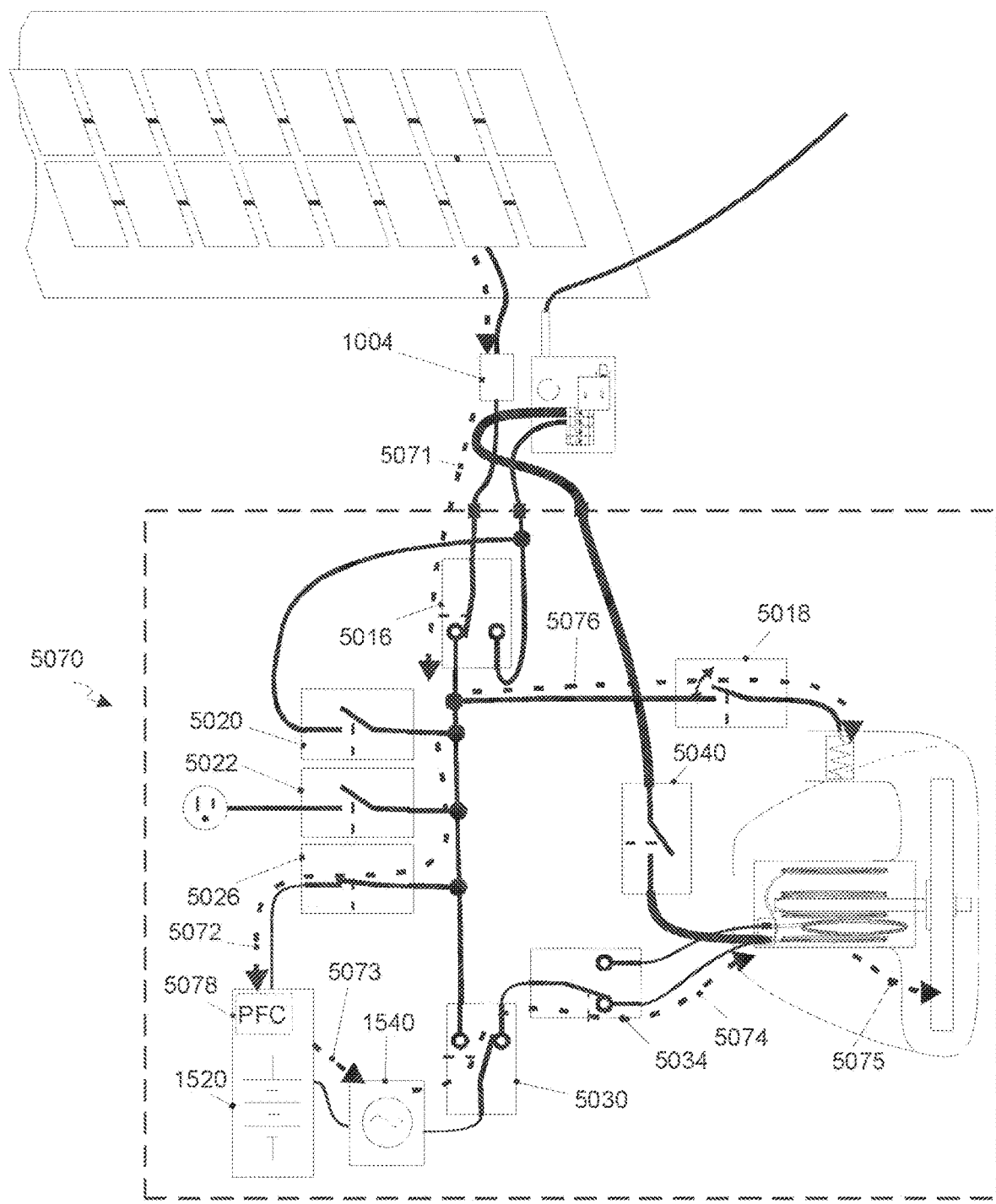
FIG. 5E shows a schematic diagram of an a microgrid system controller with photovoltaic (PV) inverters sourcing power according to an embodiment.

FIG. 5E shows a microgrid system controller 5000 in a state 5070 after the PV inverters 1004 have started to source power. In this state, the embodiment uses some of this power to charge up the mechanical energy of the flywheel via current flowing along path 5071 and 5072 to a device that rectifies the AC waveform, e.g., the battery/charge controller 1520, then as a voltage having a substantial DC component along 5073 to the VFD module 1540, then as a variable frequency and voltage waveform along 5074 to a winding in a generator. In this embodiment, the winding is the primary generator winding. As a result of magnetically induced torque, the energy is transferred (5075) to rotational kinetic energy of the flywheel and generator. Residual power may flow to the fast dump circuit along path 5076.

During state 5070, the switch 5030 connects the VFD output to the motor/generator so the VFD is no longer driving the regulated bus. Instead, this bus is regulated via judicious coordination of the fast dump switch 5108, the load applied by the charge controller 1520, and the load drawn by the VFD 1540. During this state, the regulated bus must be kept within a valid grid voltage specification or the PV inverter or inverters may stop producing power. The open switch 5040 prevents the VFD output from being applied to the electrical panel.

The drive power of a single-phase motor may fluctuate at a multiple of the shaft rotation rate. On startup, the shaft is not spinning synchronously with the AC output so the AC output may experience a time-varying load from the VFD. In some embodiments the VFD may modulate its drive voltage or power waveform at twice the grid-spec frequency. In some embodiments this modulation depth may range from 0 to 1. In some embodiments, the modulation depth may change with shaft frequency. In some embodiments, the fast dump switch 5018 modulates its load in opposition to load changes from the VFD and battery/charge controller to maintain the regulation bus voltage within tight tolerances. In some embodiments, the charge controller may comprise a short-term storage element like a supercapacitor or electrolytic capacitor to reduce the time-varying load. Some embodiments may further comprise a power-factor control circuit 5078 in concert with DC storage. An advantage of power-factor control or DC storage may be reduced flywheel spin-up times for a given PV inverter power.

In some embodiments, the VFD monitors the generator shaft angle for feedback. In some embodiments, the VFD initially applies an open-loop, low-frequency and voltage current to produce an electromagnetic field and to induce a second magnetic field. The driven and induced magnetic fields lead to a torque on the generator shaft except at node angles where the torque is zero. If the VFD detects that the direction of rotation is wrong, it may reverse the sign of the applied field. It may alternatively turn off the applied field, wait for the shaft to be in a favorable position to produce a torque in the positive direction, and apply a delayed pulse. In some embodiments, the open-loop motion control transitions to a closed-loop control once a threshold rotation or rotation rate is established.

In some embodiments, the VFD applies a waveform having a substantially sinusoidal base variation that is synchronous with the shaft rotation with a prescribed phase angle relative to the shaft angle. In some embodiments, this base variation is further modulated, e.g., via multiplication at the specified standard grid frequency. In some embodiments, the VFD intentionally spins to a frequency that is intentionally higher than the specified grid frequency so that the generator can bear surge loads that occur when the electrical panel is re-powered without spinning below the specified grid frequency before substantially relocking the generator output to the regulation bus and so the PV inverter can be connected to the microgrid.

In some embodiments, when the VFD reaches a target frequency, it transitions to a mode wherein it phase locks to the waveform of the regulation bus. Because there may be shaft angles where there is no starting torque from the primary winding, some embodiments further comprise an optional state 5080 shown in FIG. 5F, wherein switch 5034 may re-direct VFD current along path 5082 to an appropriately oriented secondary or auxiliary winding 1262. Alternatively, switch 5034 may parallel, antiparallel, or series connect windings 1262 and 1260. The resulting magnetic field angle change may allow the generation of a starting torque. Once the shaft has reached a rotation amount, a target angle, or a target rotation rate, after an interval, or some other trigger, this state may revert to state 5070 or state 5080 may continue through the spin up of the generator.

Some embodiments may switch 5034 in concert with a discrete phase change of the VFD driving waveform. This may help to maximize the power delivered to the flywheel during periods where the primary phase is out of an angular position for driving the rotor/flywheel while the instantaneous AC power is near its peak. Some embodiments may perform this switching when the frequency of rotation of the flywheel generator approaches that of the microgrid/inverter output.

Some embodiments may maintain a relatively high, in-specification AC frequency in the regulated bus to the PV inverter while spinning the flywheel up to a relatively low, but in-specification generator waveform frequency. Some embodiments may slew the AC frequency of the inverter to match the generator frequency and phase, then close an electrical connection between the generator and PV inverter.

Figure 5F:
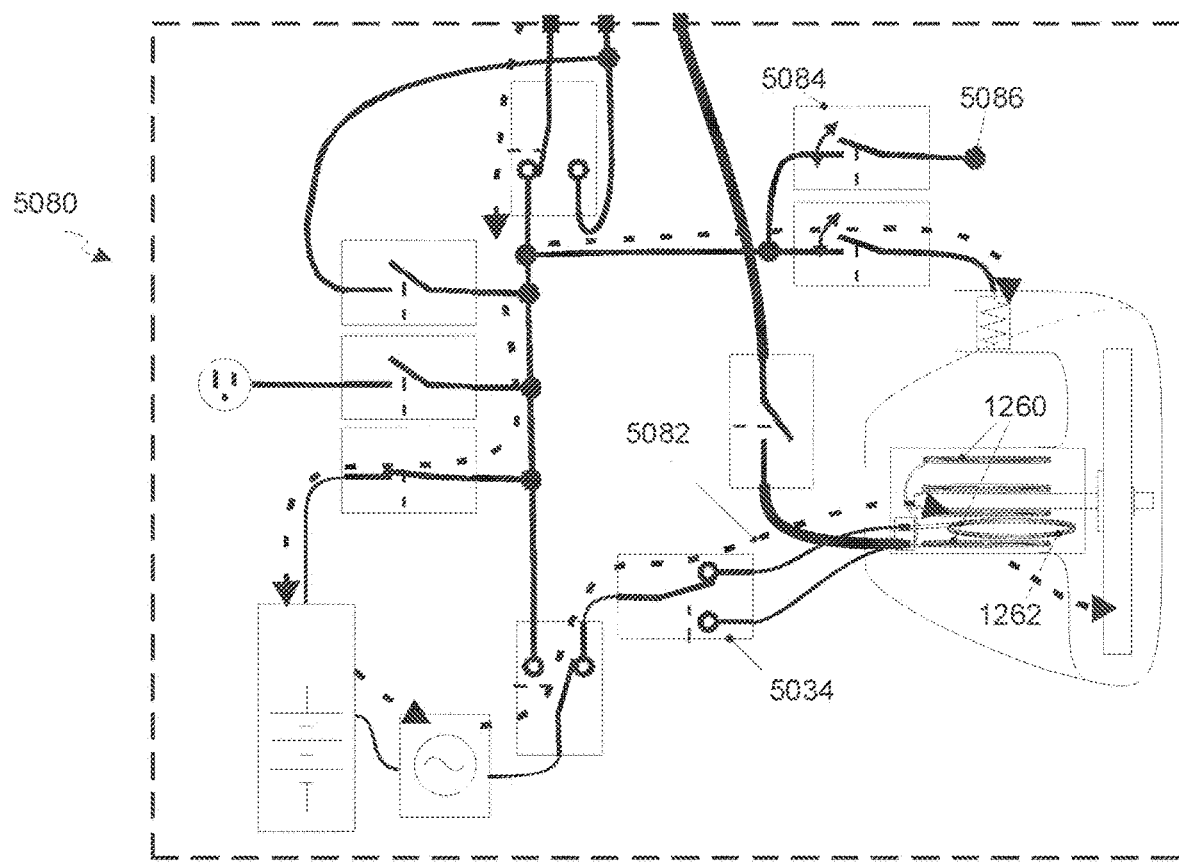
FIG. 5F shows power flow through a microgrid system controller to an appropriately oriented secondary or auxiliary winding according to an embodiment.

FIG. 5F shows a further actuatable switch 5084 that connects to a substantial short circuit 5086 or low-resistance load, e.g., 10 n-<1 mO. Some embodiments may close switch 5084 for a brief duration spanning a zero-crossing of the AC waveform, e.g., <1/16 of an AC cycle. Some such embodiments may enforce the timing of at least one zero crossing of the AC voltage. Such a timed short-circuit may contribute to countering an PY-inverter-induced perturbation to check for a grid outage.

Figure 5G:
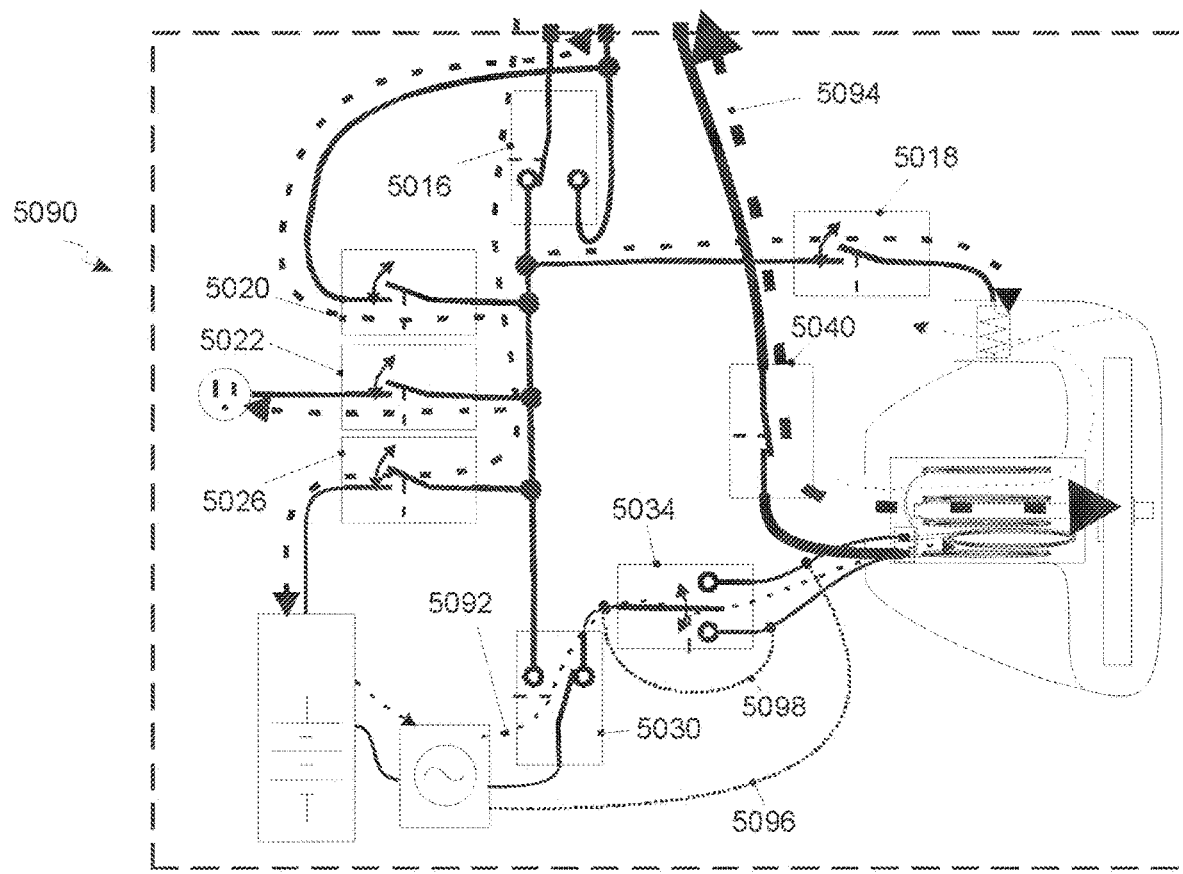
FIG. 5G shows power flow through a microgrid system controller in an operation state according to an embodiment.

FIG. 5G shows a microgrid system controller 5000 in its operation state. After the generator and flywheel are at a target rotation frequency, the switch 5040 may be closed, connecting the generator to the electric panel and all loads via path 5094. In some embodiments, the resulting power demand reduces the rotation frequency of the generator. In some embodiments, as the generator is spinning down, the fast isolator switch is closed when the instantaneous phase and frequency of the generator match that of the regulation bus within a tolerance, reconnecting the PV inverter to the microgrid.

In some embodiments, the deceleration of the flywheel may be actively reduced or increased, e.g., by power from the VFD. In some embodiments the frequency or phase of the regulated bus may be adjusted by changing a target waveform in a control loop or by increasing or reducing one or more applied loads to minimize or reduce the instantaneous or predicted error in the phase and frequency between the regulated bus and generator waveform e.g., to facilitate a smooth and rapid transition to a microgrid in stable equilibrium. This mode maintains the regulation bus within a grid specification waveform by actuation of one or more of switches 5020, 5022, 5026, and 5018. The generator efficiency, power factor, and frequency may be adjusted via the variable frequency drive and switch 5034. The VFD can also provide additional power to the subpanel via the generator with switch 5030 in the indicated position. The VFD can provide direct support for the regulation bus and inverter even when the PV inverter is isolated by switch 5020 by switching 5030 to the regulation-bus position.

In some embodiments one or more of switches 5016, 5018, 5020, 5022, 5026, 5030, 5034 may be controlled by the agent controller as disclosed herein. In some embodiments, one or more switches may be controlled by the VFD controller. In some embodiments, one or more switches may be controlled by a third controller. Some embodiments comprise a controller that can actuate one or more relays. Some embodiments comprise a relay-actuating controller that can further reduce the relay-drive voltage while relay states are not changing to reduce heating and power draw.

Some embodiments alternatively comprise a multiple-phase VFD controller having a second output 5096 that may drive a secondary stator winding directly. Some embodiments further comprise a direct connection 5098 of a first output to a primary stator winding, some in lieu of switch 5034. Some embodiments may comprise a third VFD output to a third stator winding. Some embodiments may comprise additional outputs to additional windings. Some embodiments may comprise a capacitor across the secondary stator winding as known in the art. Some embodiments may drive a plurality of windings in at least one operating state such that the total power drawn power is substantially constant. Some embodiments may drive at least one winding with a substantially sinusoidal output and a second winding with a phase-shifted, substantially sinusoidal output. Some embodiments may drive a second winding with a second waveform that is adjusted statically or dynamically to improve the generator output characteristics, e.g., sinusoidality, noise, apparent source resistance, etc.

Figure 6A:
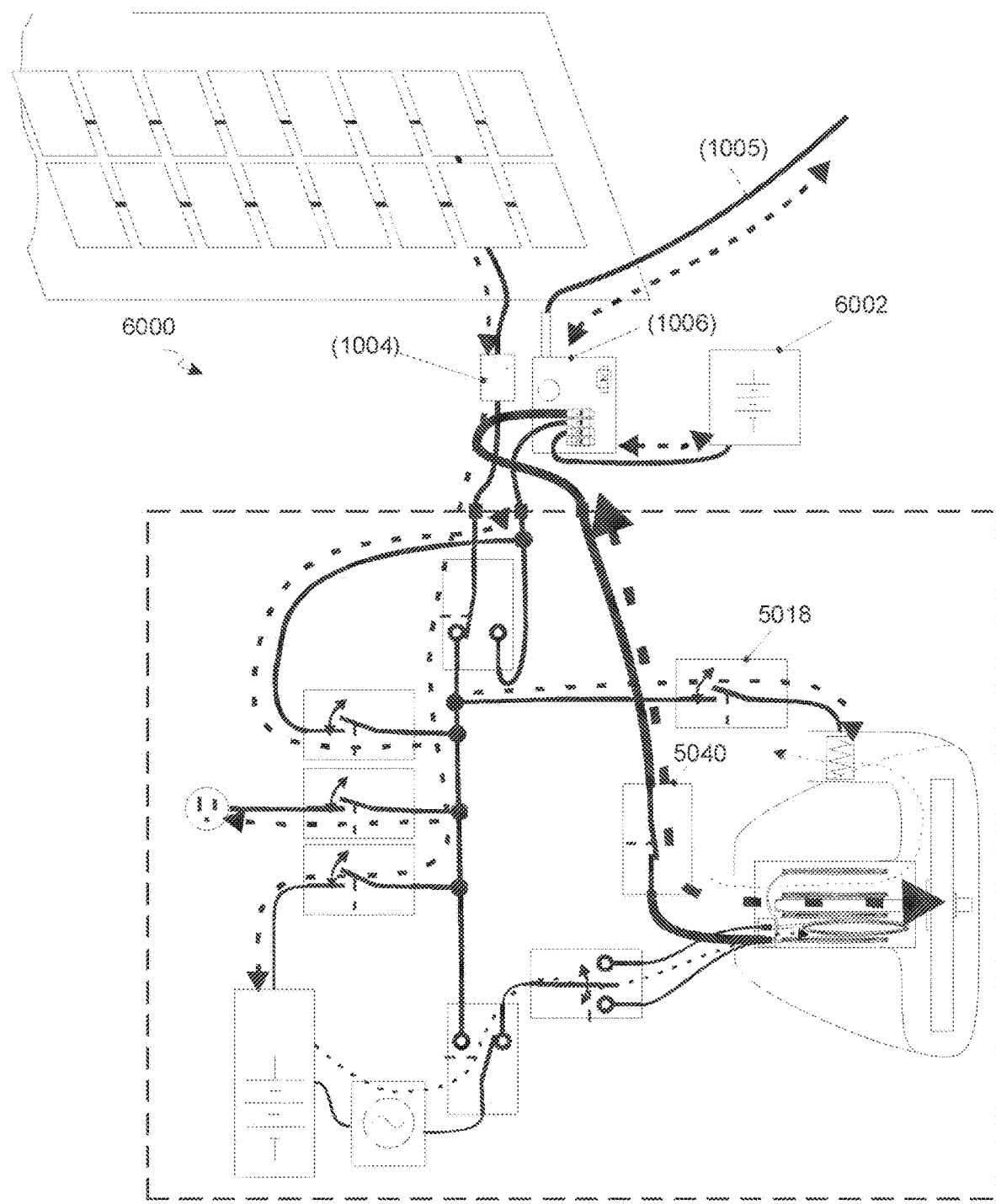
FIG. 6A shows a schematic diagram of a grid-connected system that may further comprise a PV inverter and battery/inverter system according to an embodiment.
Figure 6B:
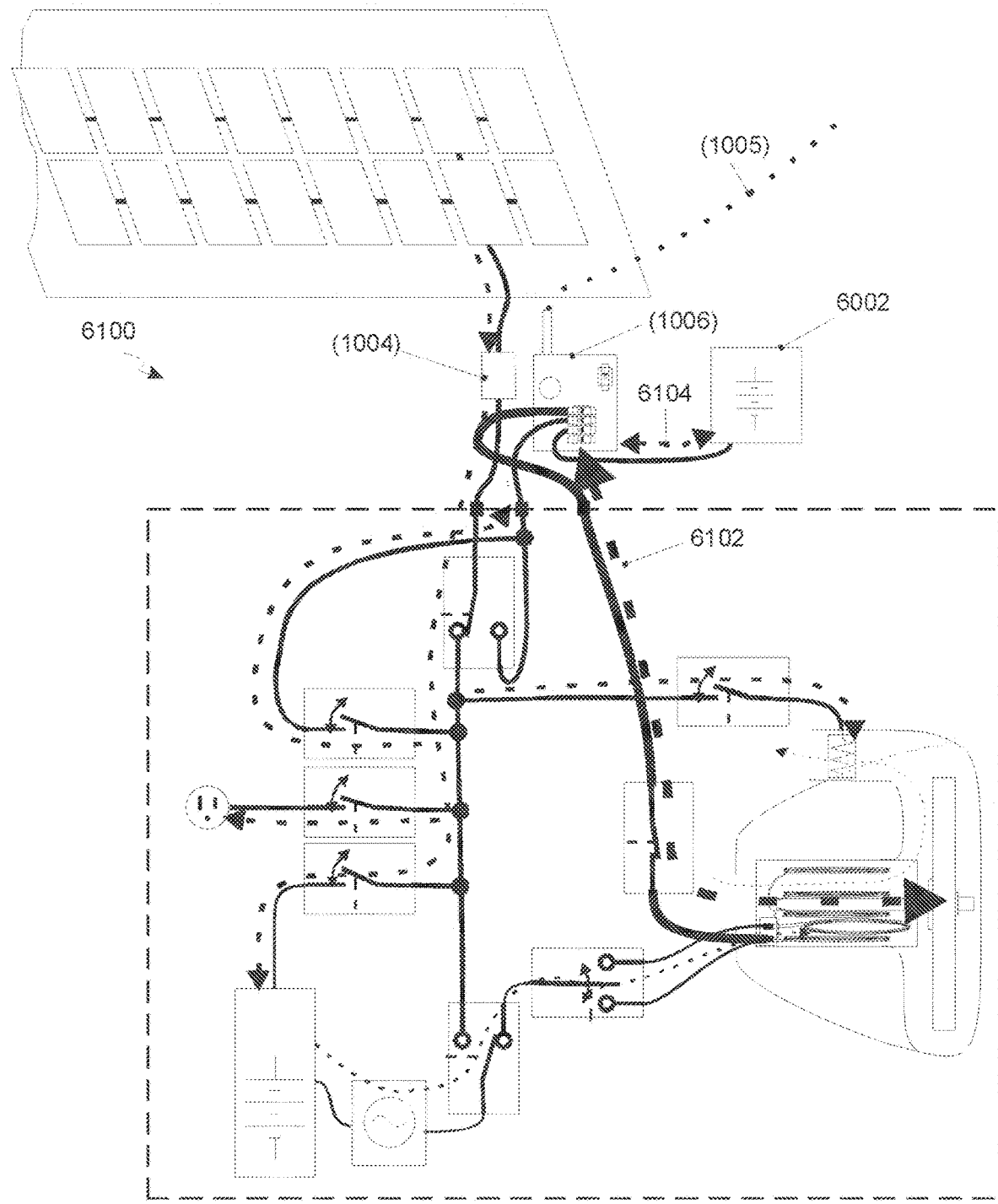
FIG. 6B shows a schematic diagram of a microgrid buffer comprising an external islanding device such as an AC-side battery or inverter according to an embodiment.

Some embodiments may operate in a system that comprises a connection to an energized grid 1005 and optionally an AC-side battery/inverter system 6002 and optionally a PV inverter 1004 as shown in FIG. 6A. In such a system, the controller will phase lock to the grid, and may not actuate its fast dump switch 5108. Some embodiments may operate in a system such as 6100 in FIG. 6B, that is disconnected from an electrical grid and comprises an external islanding or microgrid system controller, such as AC-side battery/inverter system 6002, and may further comprise a PV inverter 1004. In such a system the controller may phase lock to the voltage waveform produced by the external microgrid system controller. In such a system, the generator may provide surge power (6102) and in some embodiments, reactive power mitigation that reduces the surge power (6104) capacity required of the battery/inverter.

Figure 6C:
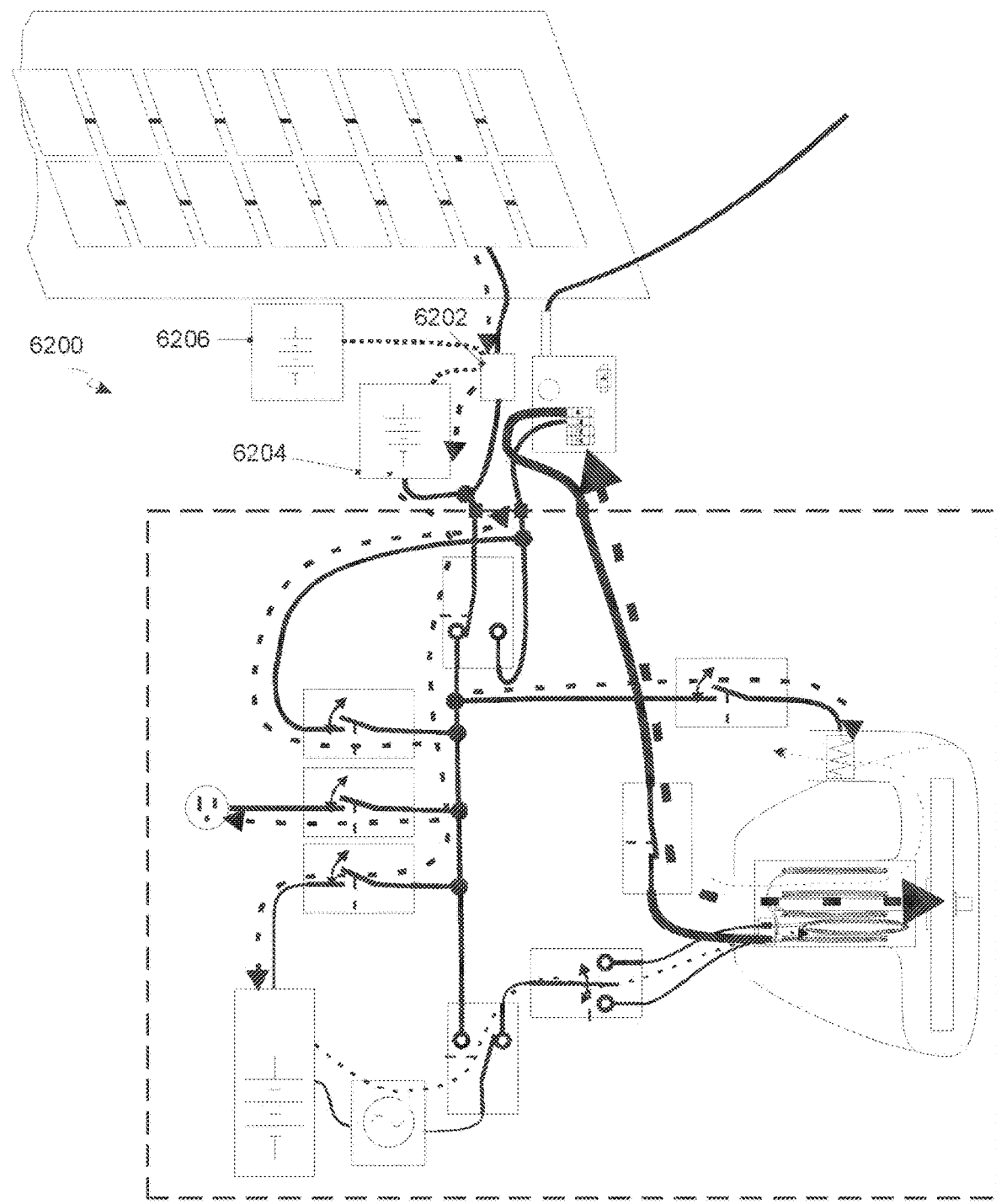
FIG. 6C shows a schematic diagram of an exemplary DC-fed battery storage according to an embodiment.

Some embodiments may operate in a grid-tied or islanding system such as 6200 in FIG. 6C, comprising one or more of a hybrid inverter 6202, a DC-fed battery/inverter 6204, a DC-side battery storage system 6206, and a PV inverter. When connected to an energized grid, some embodiments may idle, charge its batteries, or operate normally, phase locked to the grid waveform, to buffer and stabilize power. When disconnected from the grid, some embodiments may phase lock to an external microgrid system controller or islanding inverter if one is present, otherwise it may operate as the microgrid system controller. In some embodiments this operating behavior is configured manually. In some embodiments, the system automatically detects the presence of another controller based on a waveform, wired or wireless signal, user input, or the like.

Figure 7:
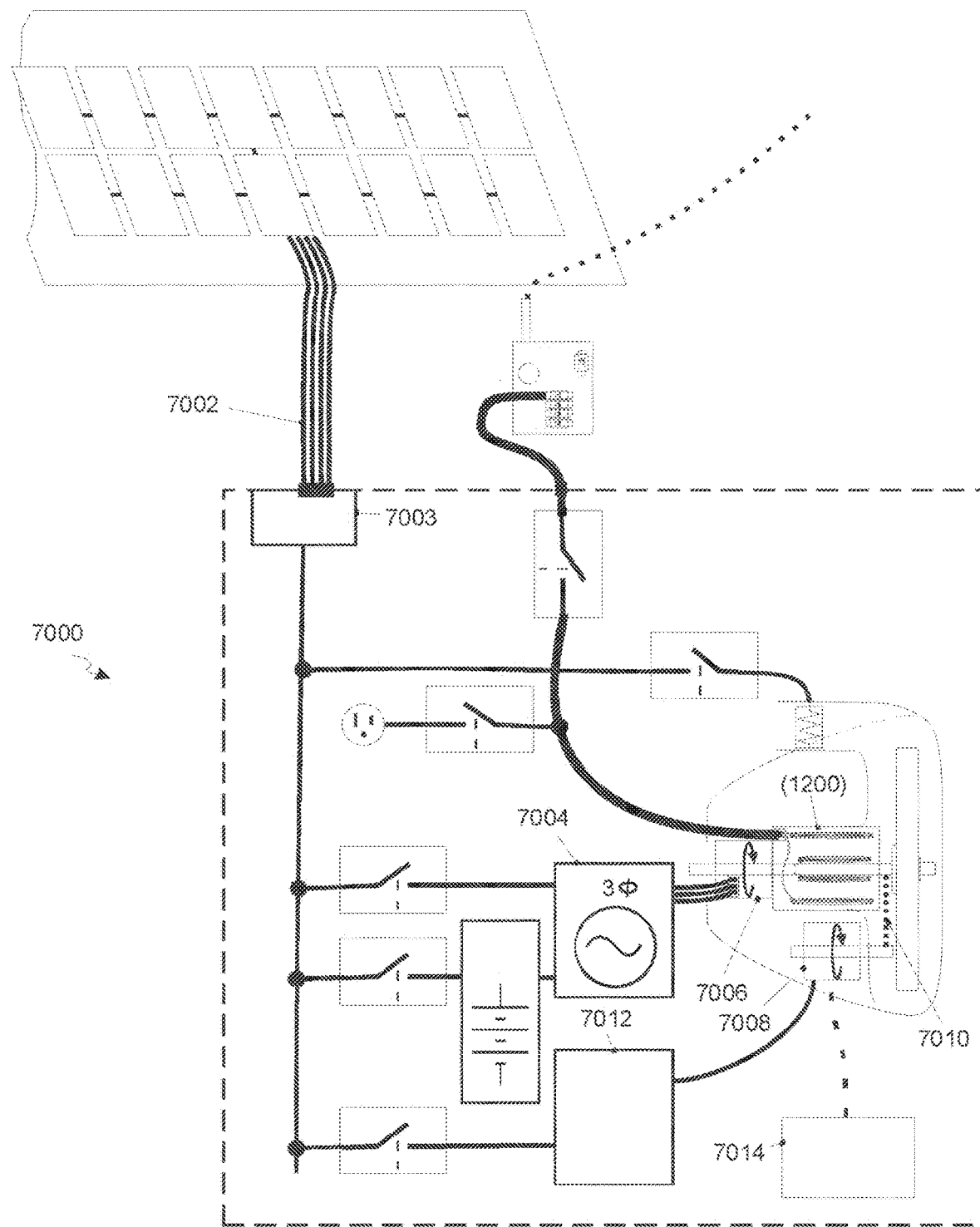
FIG. 7 shows a schematic diagram of a microgrid system controller comprising a DC power input and a single-phase AC power output according to an embodiment.

Some embodiments, such as 7000 in FIG. 7, may be powered directly (7002) from the PV system without an external PV inverter. Some embodiments further comprise a power optimizer/rapid shutdown device 7003, such as a 'balancer.' Some balancers further comprise DC-side battery storage. Some such embodiments comprise a single-phase VFD such as 1540 to start up and maintain the rotation of a single-phase generator (1200). The embodiment shown in FIG. 7 comprises a three-phase inverter 7004 that drives a three-phase motor 7006, to establish and maintain rotation of the rotor of generator 1200. This may have the advantage of reducing storage capacitance requirements and drive power pulsations. Some embodiments may alternatively or in addition comprise an additional element 7008 that can drive generator and flywheel rotation, e.g., via a linkage 7010. Some such embodiments may comprise an electric motor or a heat engine. Some embodiments may further comprise a converter 7012 that produces a storable energy source for 7008 from substantially DC power, such as a hydrolysis system. Some embodiments may comprise a refillable energy source, such as a fuel tank 7014.

Figure 8:
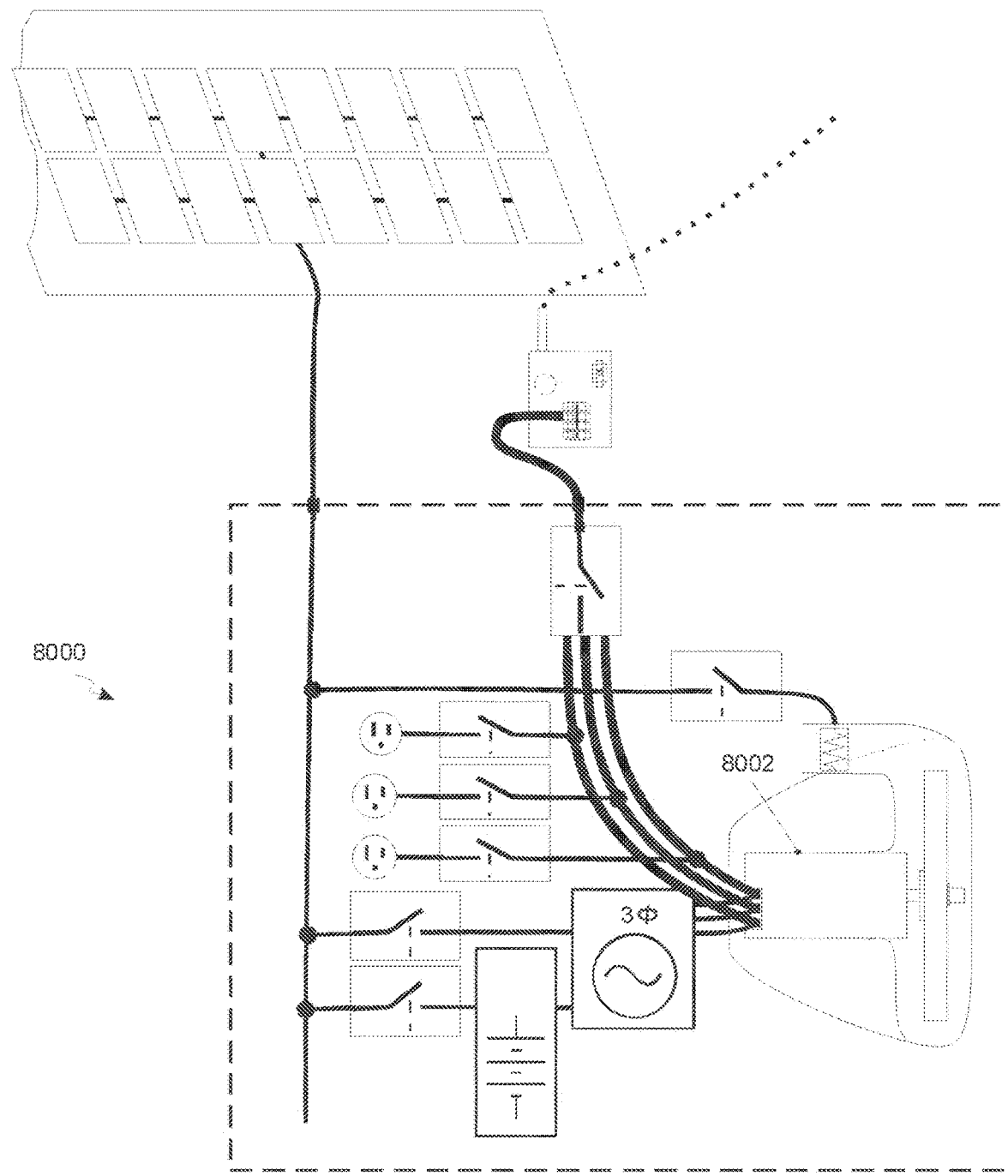
FIG. 8 shows a schematic diagram of a microgrid system controller comprising a DC power input and a three-phase AC power output according to an embodiment.
Figure 9:
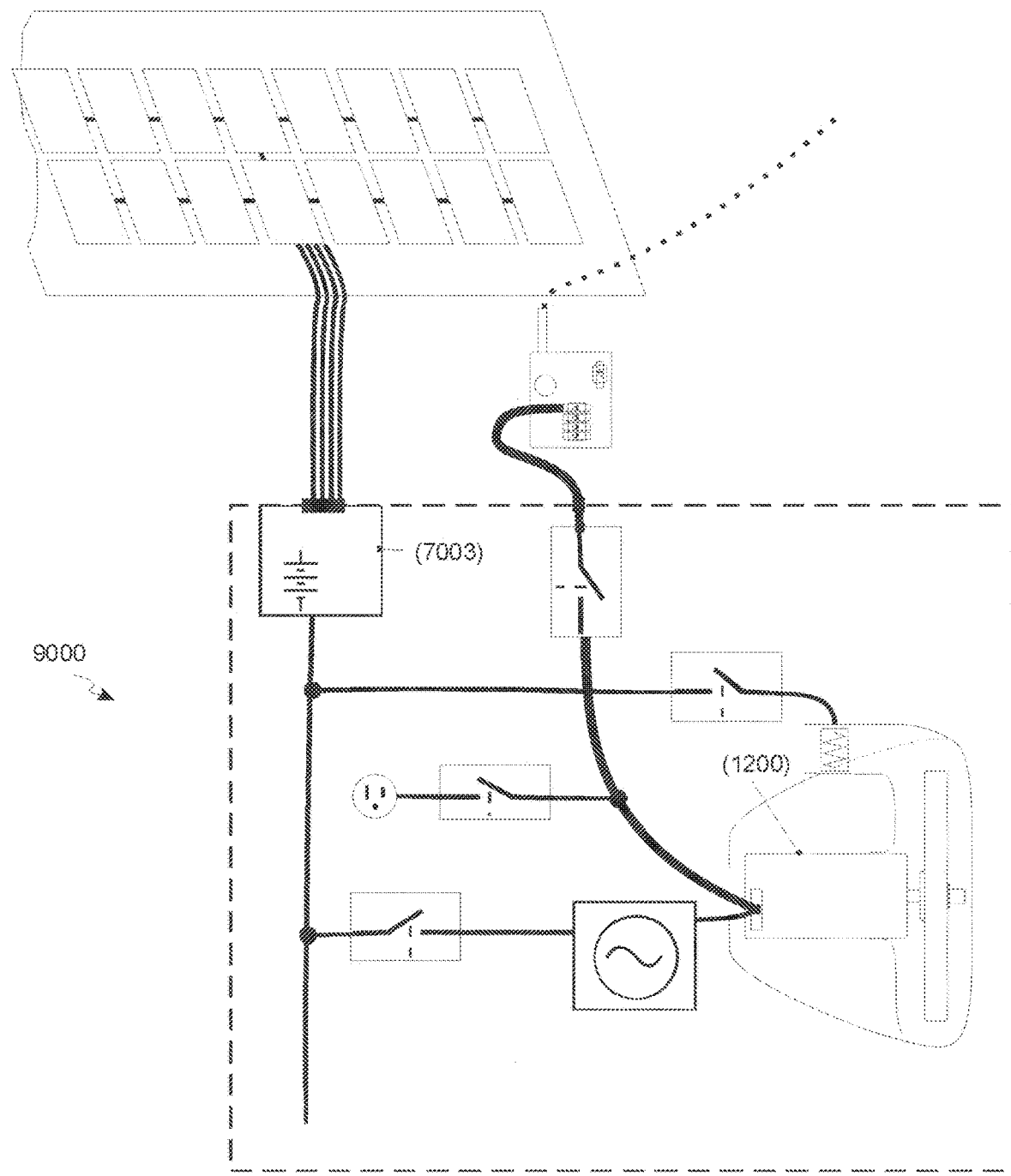
FIG. 9 shows a schematic diagram of a microgrid system controller comprising alternative DC-side storage according to an embodiment.

Some embodiments such as 8000 in FIG. 8 are employed in a three-phase electrical system and use a three-phase generator 8002. Some such embodiments derive power from an external inverter like the embodiment 5000. The embodiment 8000 draws DC power directly from one or more solar panels. Some embodiments further comprise one or more of: an integrated rapid shutdown device, PV power optimizer, or DC-side battery storage (e.g. 7003). Some embodiments such as 9000 in FIG. 9 are employed in a single-phase electrical system and use single-phase generator (1200) and comprise a DC-side battery storage, PV power optimizer, and rapid shutdown module 7003 for internal power instead of 1520.

The following embodiment is described at least partially with to FIG. 1A:

A microgrid system controller for creating and maintaining a microgrid, the microgrid electrically coupled to an inverter associated with an energy supply, comprising:
an inertial power module having a motor/generator and a flywheel assembly;
a source control module having a first controller, a battery bank module, and at least one bridge circuit, wherein the first controller is configured to monitor a first line associated with a microgrid and a second line associated with the motor/generator, and based on a status of at least one of the first line or the second line, the first controller is configured to:
provide first control signals to a first actuatable switch to connect and disconnect an output of the motor/generator with the microgrid, and provide second control signals to a second actuatable switch to connect and disconnect output from the inverter with the output of the motor/generator, and wherein the at least one bridge circuit is coupled to the battery bank module and configured to provide energy from the battery bank module to drive the motor/generator and the flywheel assembly; and
a load control module having a second controller, at least one actuatable switch, and a line load, wherein the second controller is configured to monitor the first line associated with the microgrid, and based on a status of the first line, the second controller is configured to provide third control signals to the at least one actuatable switch to provide energy to the line load.

The following embodiment is described at least partially with regard to FIG. 1B:

A microgrid system controller for creating and maintaining a microgrid, the microgrid electrically coupled to an inverter associated with an energy supply, comprising:
a motor/generator and a flywheel assembly; a battery bank module;
at least one bridge circuit;
a line load; and
a controller, wherein the controller is configured to sense a first line parameter from the inverter and a second line parameter from the motor/generator, and based on a status of at least one of the first line parameter or the second line parameter, the first controller is configured to:
provide first control signals to a first actuatable switch to connect and disconnect the inverter with the motor/generator, provide second control signals to a second actuatable switch to connect and disconnect the microgrid with the line load, and provide third control signals to a third actuatable switch to connect and disconnect the motor/generator with the microgrid,
and wherein the at least one bridge circuit is coupled to the battery bank module and configured to provide energy from the battery bank module to drive the motor/generator and the flywheel assembly.

The following embodiment is described at least partially with regard to FIG. 1C:

A microgrid system controller for creating and maintaining a microgrid, the microgrid electrically coupled to an inverter associated with an energy supply, comprising: a motor/generator and a flywheel assembly;
a battery bank module;
at least one bridge circuit;
a line load; and
a controller, wherein the controller is configured to sense a first line parameter from the inverter and a second line parameter from the motor/generator, and based on a status of at least one of the first line parameter or the second line parameter, the first controller is configured to:

provide first control signals to a starter switch to connect and disconnect the inverter with the motor/generator, provide the first control signals to the starter switch to connect the inverter with the motor/generator during a first time period when the first line parameter is below a predetermined threshold, provide the first control signals to the starter switch to connect the inverter with the microgrid during a second time period when the first line parameter exceeds a predetermined threshold, provide second control signals to a second actuatable switch to connect and disconnect the microgrid with the line load, and provide third control signals to a third actuatable switch to connect and disconnect the motor/generator with the microgrid, and wherein the at least one bridge circuit is coupled to the battery bank module and configured to provide energy from the battery bank module to drive the motor/generator and the flywheel assembly.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

FIG. 1A through FIG. 9, and description above referring to those figures teach a variety of equipment and combinations of equipment provided to interface between a array of PV panels, such as PV array 1002 in FIG. 1A, and various electrical apparatus and loads. The interfaces taught enable the array, or a combination of such arrays of PV panels to power a nanogrid.

FIGS. 10 through 28 and description below teach a specific portable, deployable structure in several embodiments, the structure comprising an array of PV panels that may be adjusted in angle to vertical. The structure itself may be anchored, such as in a driveway, and may be used as, for example, a carport.

An object of the present invention is to teach and claim a system comprising at least one structure as taught by FIGS. 10 through 28 and associated description, and interfacing equipment, as taught by FIGS. 1A through 9 and associated description, enabling the structure comprising the PV array to power a nanogrid.

Figure 10:
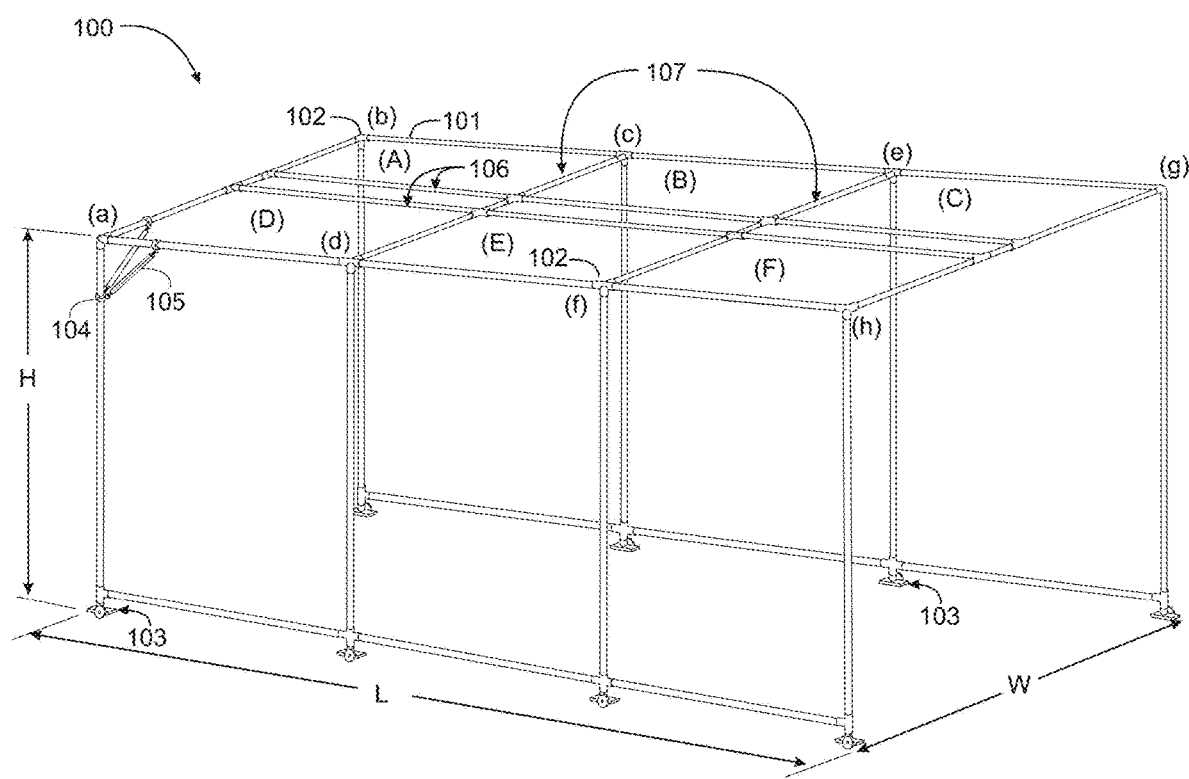
FIG. 10 is a perspective view of a movable framework in an embodiment of the present invention.

FIG. 10 is a perspective view of a movable framework 100 in an embodiment of the present invention. Framework 100 in this example is constructed of aluminum tubing sections such as section 101 which are joined by cast aluminum fittings such as fitting 102, which is a corner fitting. Many such fittings are commercially available. In the present example the tubing is standard 2.0 inch OD aluminum tubing, and once joined with a fitting tubing sections are TIG welded to the fittings.

Each upright (vertical) element in framework 100 ends at the lowermost extremity with a wheel assembly such as assembly 103. In this example there are eight such wheel assemblies. In some embodiments there may be more or fewer than eight, and the wheel assemblies may have a locking brake. In alternative embodiments the wheels may be extendable and retractable, such that the framework may be caused to rest directly on a supporting surface with the wheels raised.

One corner (a) of the framework is shown to be reinforced by braces 105 between clamps 104 fastened to the aluminum tubing. Although not explicitly shown in the figure, corners (b) through (g) may be similarly braced, and typically will be so braced. This triangulation adds needed strength and rigidity to the framework.

In FIG. 10 it is seen that the framework has a horizontal upper level defined by corners (a), (b), (h) and (g). This upper level is divided in this example by two lengthwise tubing arrangements 106 and by two lateral tubing arrangements 107, into six rectangular regions labeled in this example (A), (B), (C), (D), (E) and (F). These regions are sized by the placement of these tubing arrangements to be of the size of solar panels to be used with the system, as is described in enabling detail below.

Framework 100 has a height H, a width W, and a length L in this example, and these dimensions are important to the purpose of the invention. In one embodiment the framework supports solar panels in a solar panel system that doubles as a carport and utilizes driveway space to expose solar panels to sunlight to generate electrical energy, which may be used both for supplementing electrical power in a household or commercial building associated with the driveway or parking space, and to charge batteries for electrical vehicles that may be under the framework or in a nearby garage. Width W for purposes of the invention needs to be wider than an automobile associated with the system in a use case, but more narrow than a width of a garage doorway associated with the system, length L needs to as long as or longer than the automobile, and height H needs to be higher than the overall height of the automobile but less than the height of the garage door. It will be apparent that these dimensions may vary depending on use case and application, but one set of dimensions may well work for most applications.

Figure 11:
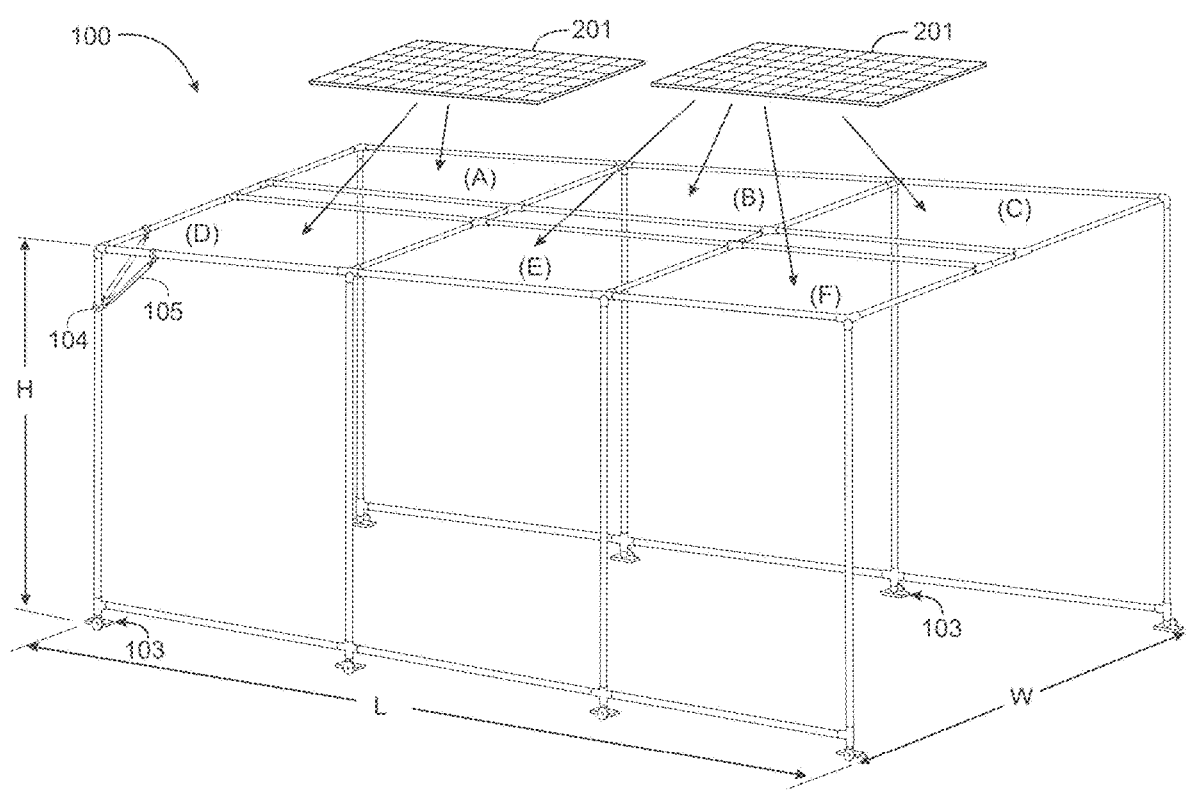
FIG. 11 is a perspective view of the framework of FIG. 1 showing where solar panels are mounted in an embodiment of the invention.

FIG. 11 is a perspective view of framework 100 of FIG. 10 with solar panels 201 shown to be added to regions (A) through (F). In this example the solar panels are GCL-M6/72DH Bifacial panels. Bifacial means that the 12 solar cells that make up one solar panel 201 are made to be active on both sides. When installed in regions (A) through (F) of the framework these six panels will be active especially for sunlight from above but will also be active and will generate electricity by reflected sunlight from surfaces of a vehicle under the framework.

Figure 12:
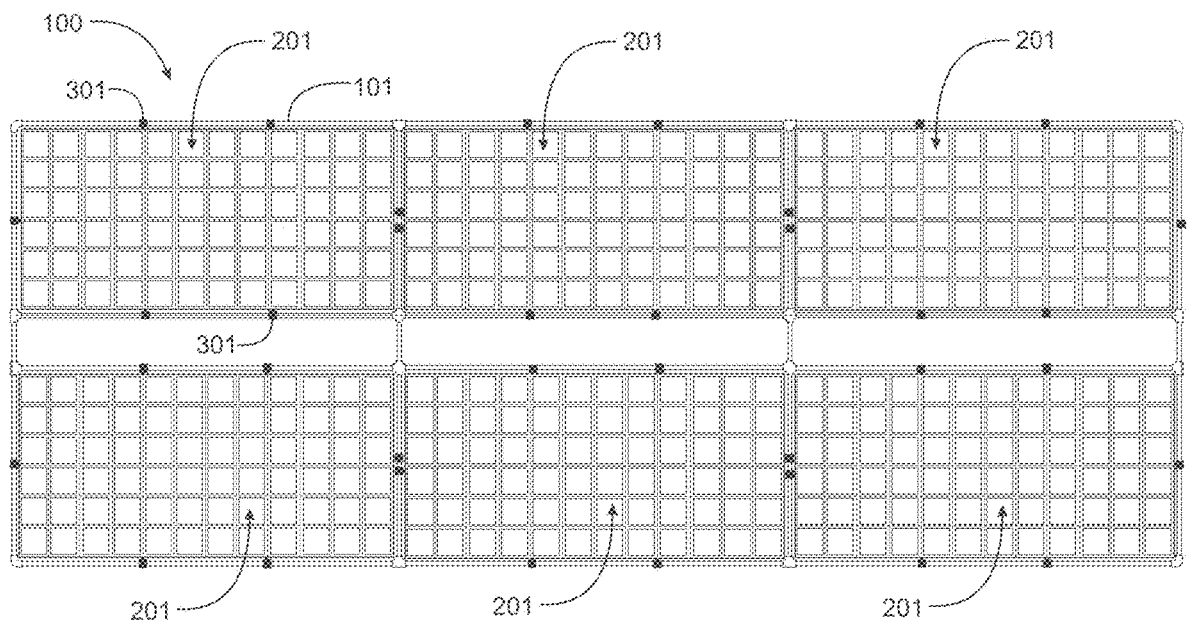
FIG. 12 is a plan view of an upper level of the framework showing six solar panels mounted in an embodiment of the invention.

FIG. 12 is a plan view of the upper level of framework 100 with solar panels 201 installed in each of the six regions (A) through (F) in this example. In this example the solar panels are GCL-M6/72DH Bifacial panels as indicated above, with each panel about 80 inches in length, so the overall length of the structure is a little more than three times this dimension, or about 20 feet in length. The width is about 8 feet. The solar panels are retained within each of regions (A) through (F) by use, in this example, of connectors 301, which in this example are clamps that are attached over the 2 inch tubes of the tubular frame, and connect to holes on the sides of the solar panels. This, it will be understood, is just one of a variety of ways that the solar panels may be secured in the regions of the framework. In the example of FIG. 12 there are 6 solar panels exposed to sunlight, but the structure in embodiments of the invention is not limited to 6 panels.

Figure 13:
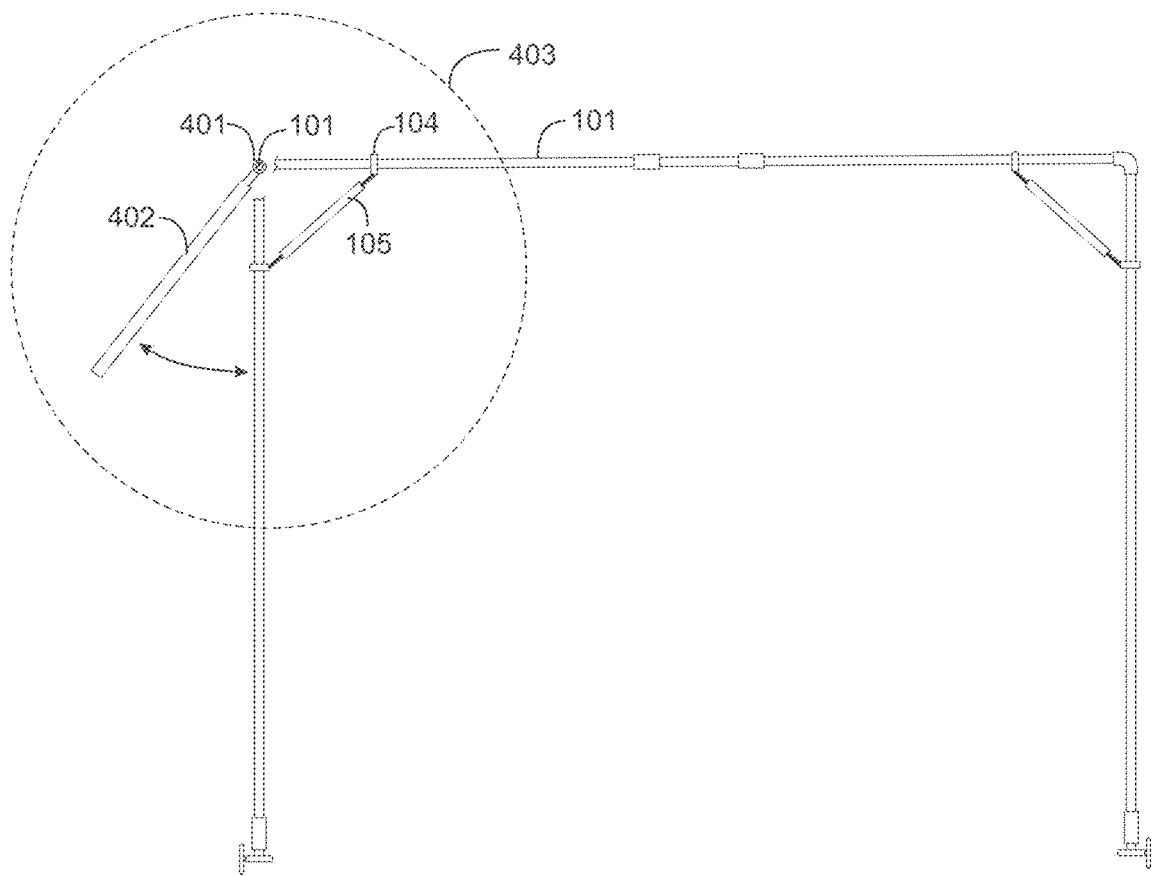
FIG. 13 is an end view of the framework showing how additional solar panels may be added to the framework.

FIG. 13 is an end view of framework 101 showing mounting of additional panels to outside tubes of the framework in a manner that the additional panels may be rotated into a horizontal position for maximum effect and may be rotated to a nearly vertical position to enable the framework to minimize the overall width to enable the structure to be moved, for example, from a driveway to inside a garage. In FIG. 13 a corner cast aluminum fitting is removed in the figure to show a clamp mechanism 401 mounted to a lengthwise upper tubing, with the clamp mechanism attached to a panel frame 402 which may hold a solar panel. The frame 402 is shown at an angle of about 30 degrees from vertical but may be lowered to minimize the overall width of the structure or raised so that a mounted solar panel in frame 402 may be horizontal for maximum sunlight exposure.

Figure 14:
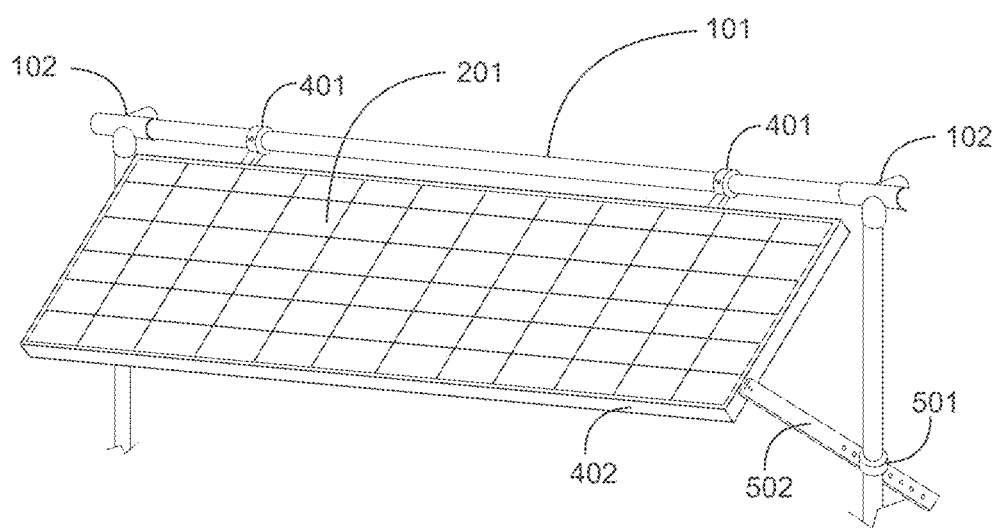
FIG. 14 is a perspective view of a frame mounted to the side tubing to better illustrate the nature of the mounting in this embodiment.

FIG. 14 is a perspective view of frame 402 mounted to the side tubing 101 to better illustrate the nature of the mounting in this embodiment. Frame 402 mounts a solar panel 201 the same as the solar panels mounted in the upper level as shown in FIG. 12. Clamp mechanisms 401 may be loosened to rotate frame 402 and tightened to secure the frame, and therefore the solar panel, at a new attitude, including a horizontal attitude parallel with the solar panels mounted in the upper level. In an alternative embodiment there may be props 502 connecting to anchors 501 by which the side panels may be raised or lowered. It will be apparent that there are a variety of ways that side frames 402 carrying solar panels may be raised or lowered.

As many as six frames 402 with solar panels 201 may be provided along the sides of the framework, three along each side, which effectively doubles the number of solar panels in the apparatus, to twelve.

Figure 15:
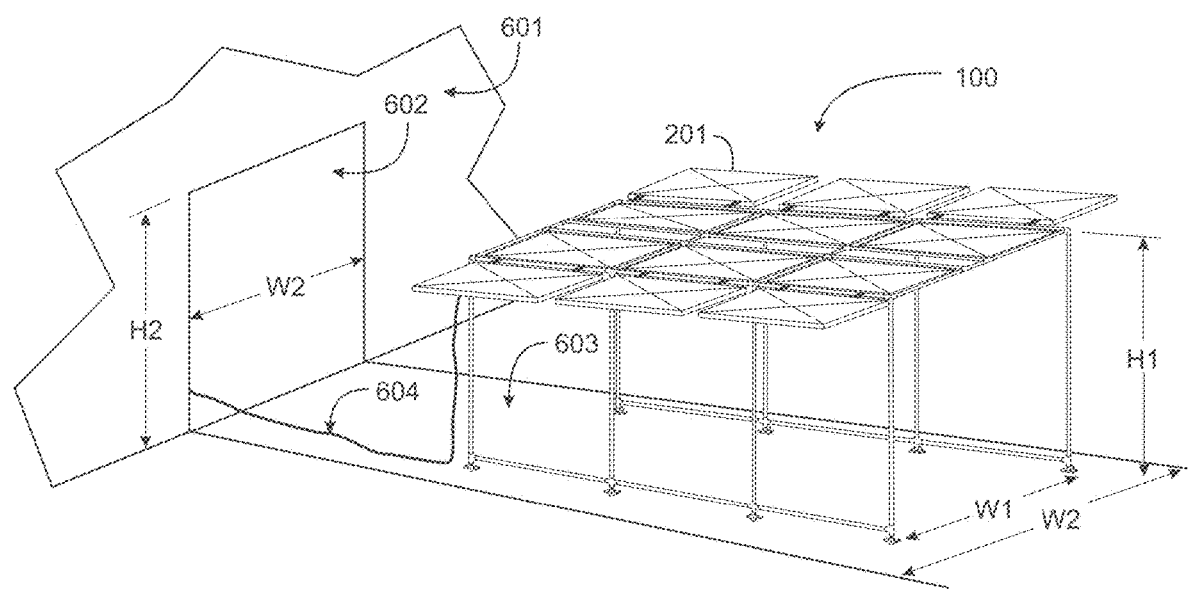
FIG. 15 illustrates the movable framework with mounted solar panels positioned in a driveway leading to a garage door.

FIG. 15 illustrates movable framework 100 with a full complement of mounted solar panels 201 positioned in a driveway or parking space 603 leading to a garage door 602 in a side of a home or business 601. It may be seen that the extra side panels to each side of the framework are deployed level with the solar panels in the top of the framework such that all twelve solar panels are parallel and horizontal. Width of the driveway is W2 which is greater than the width W1 of framework 100. The width of the garage door opening is also W2, the same as the width of the driveway in this example. The height of the framework H1 is less than the height w2 of the garage door. The deployment of the side panels provides maximum energy generation, which is routed to an inverter in the garage by a cable 604, but this makes the overall width greater than the width W2 of the garage door. In this configuration the moveable framework cannot be rolled into the garage.

Figure 16:
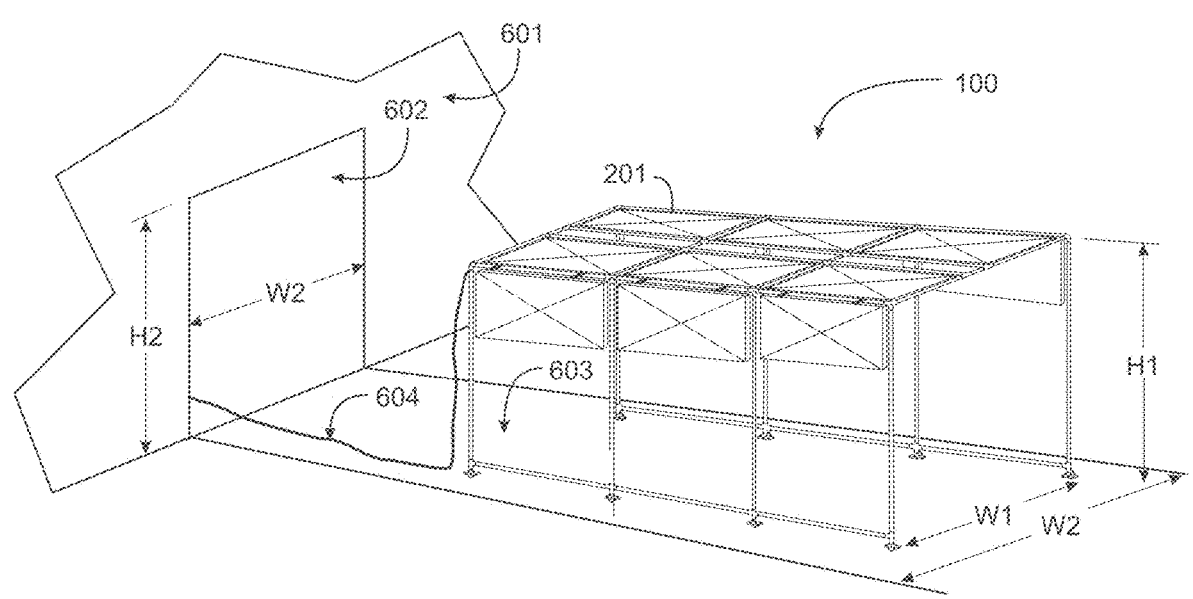
FIG. 16 is a perspective view of the framework in the driveway with outside panels lowered.
Figure 17:
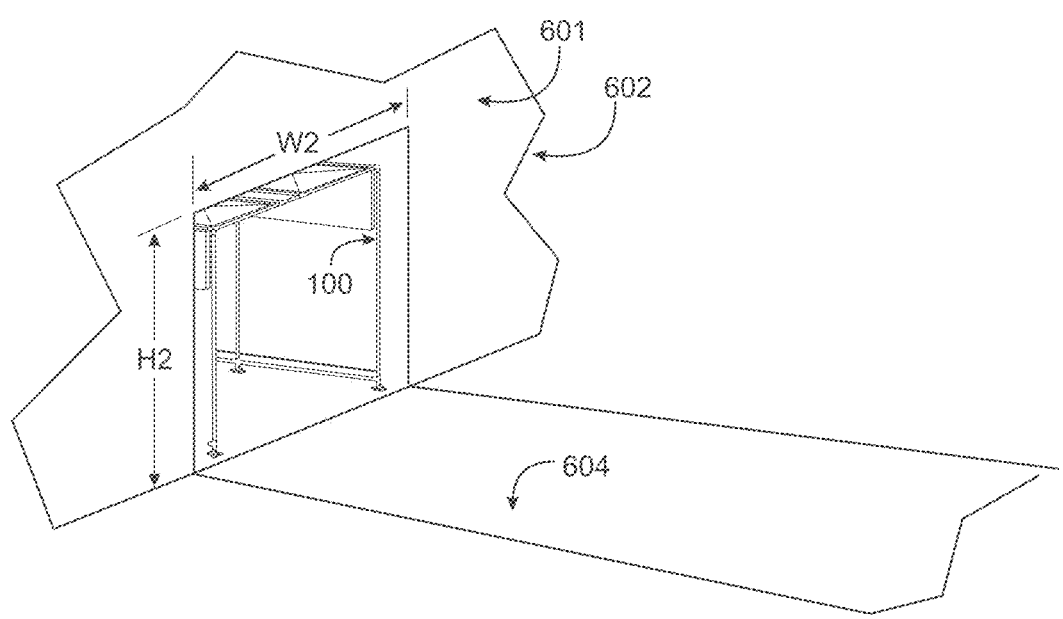
FIG. 17 is a perspective view of the driveway with the framework rolled into the garage.

FIG. 16 illustrates the circumstance of FIG. 15 except the side panels have been retracted to a vertical position, reducing the overall width of the framework with panels to W1. In this configuration the framework with panels may be rolled into the garage through the garage door. FIG. 17 illustrates the framework 100 with solar panels moved into the garage through the garage door.

In the examples shown and described, with a framework with solar panels stored in the garage, an automobile, a truck or motorcycles may still be parked in the garage beneath the framework, as the inside height and width of the framework is high and wide enough to clear most automobiles. A user may open the garage door and manually roll the framework on wheel assemblies 103 out of the garage through the garage door, trailing cable 604 until the framework is fully deployed in the driveway. The side panels may then be deployed level, and the system will generate electricity. At a time when a weather event, or for some other reason it is determined to store the framework in the garage the side panels may be lowered, the garage door opened, and the framework may be rolled back into the garage with enough space to also park the car underneath.

Figure 18:
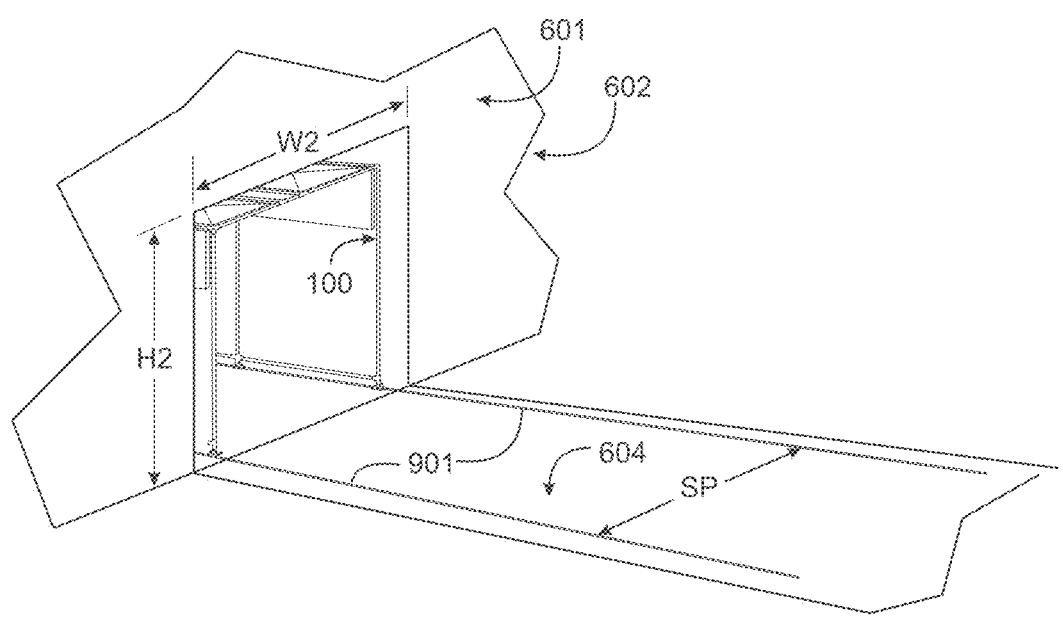
FIG. 18 is a perspective view of a driveway with tracks to guide the framework as the framework is moved.

Cable 604 in one embodiment ends in a standard 240 volt connector, which may be plugged into an inverter to connect into the house or business wiring, and the solar panel system will supplement electrical usage in the home or business as an electricity generating appliance. In one embodiment the inverter is a Solar Edge™ HD Wave inverter which accepts a 240V connector and also provides connectors for charging electric vehicles. The inverter in one embodiment is mounted just inside the garage door but may be positioned elsewhere as well. The entire system functions as an electricity generating, portable appliance in one unit. FIG. 18 illustrates an embodiment of the system wherein optional tracks 901 are provided on the driveway at a spacing SP to match the distance between wheels 103 on the movable framework. The optional tracks may be either cut into the driveway or strips of material may be laid onto and adhered to the surface of the driveway to form the tracks. The optional tracks guide the framework both going into and coming from the garage.

Figure 19:
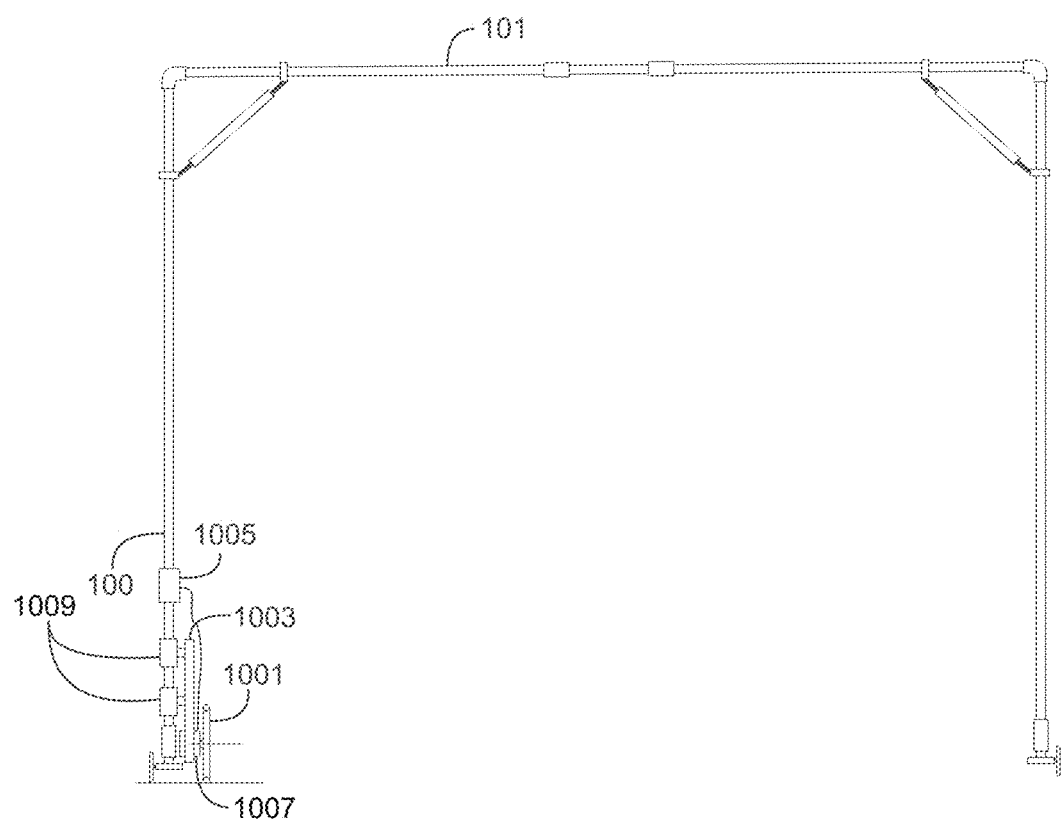
FIG. 19 is an end view of the framework in an embodiment employing a drive motor and wheel.

FIG. 19 illustrates an alternative embodiment wherein a single wheel 1001 driven by a DC motor 1007 mounted in a frame 1003 fastened to an upright of the framework by clamps 1009 is provided on one side at a lower level of the framework at the end of the framework that first enters and last leaves the garage. The motor may be driven in either direction and turned on and off to propel the framework from the garage and to bring it back into the garage. On-off and direction inputs may be provided on a small junction box 1005 fastened to an upright of the framework near the motor and wheel. In an alternative embodiment there may be circuitry in junction box 1003 with Bluetooth or other wireless communication capability, and an application may be provided on a smart phone with an interactive interface to operate the drive wheel to propel the framework into or out of the garage. This apparatus works best in an embodiment wherein tracks, as in FIG. 18, are provided to constrain the wheels 103 of the framework.

In one embodiment cable 604 that connects the solar panels of the apparatus of the invention to an inverter may be wound on a reel in the garage with spring constraint, such that the cable plays out as the framework is moved from the garage to a position in the driveway, and winds back on the reel as the framework re-enters the garage.

Figure 20A:
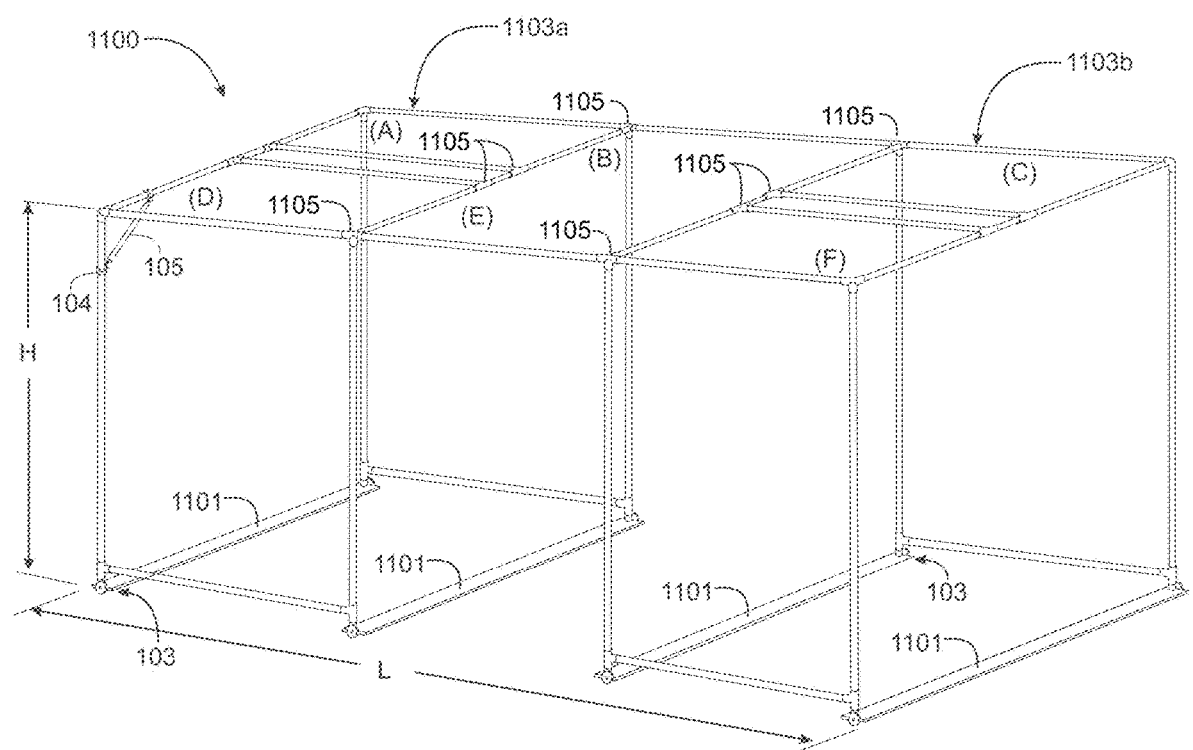
FIG. 20A is a perspective view of a solar carport structure in another embodiment of the invention.

FIG. 20A is a perspective view of a structure for a portable solar carport in another embodiment of the invention. In this embodiment two rectangular structures 1103*a* and 1103*b* that are mirror images are joined by tubes only at the upper level, the tubes engaged in fittings 1105 that are fittings that enable the tubes to be engaged and disengaged. The structures are joined side-to-side additionally by flat bars 1101.

In this embodiment wheel assemblies 103 are of a commercially available sort well-known in the art that may be deployed and retracted such that the structure may be slightly raised on caster wheels that allow universal horizontal movement and lowered to cause the structures to rest on the flat bars 1101.

With the structures 1103*a* and 1103*b* joined as shown in FIG. 20A solar panels may be mounted exactly as described above with reference to FIG. 11 and also referenced in other descriptions, and the joined structure may reside on a driveway providing electricity generation just as described herein in other embodiments.

Figure 20B:
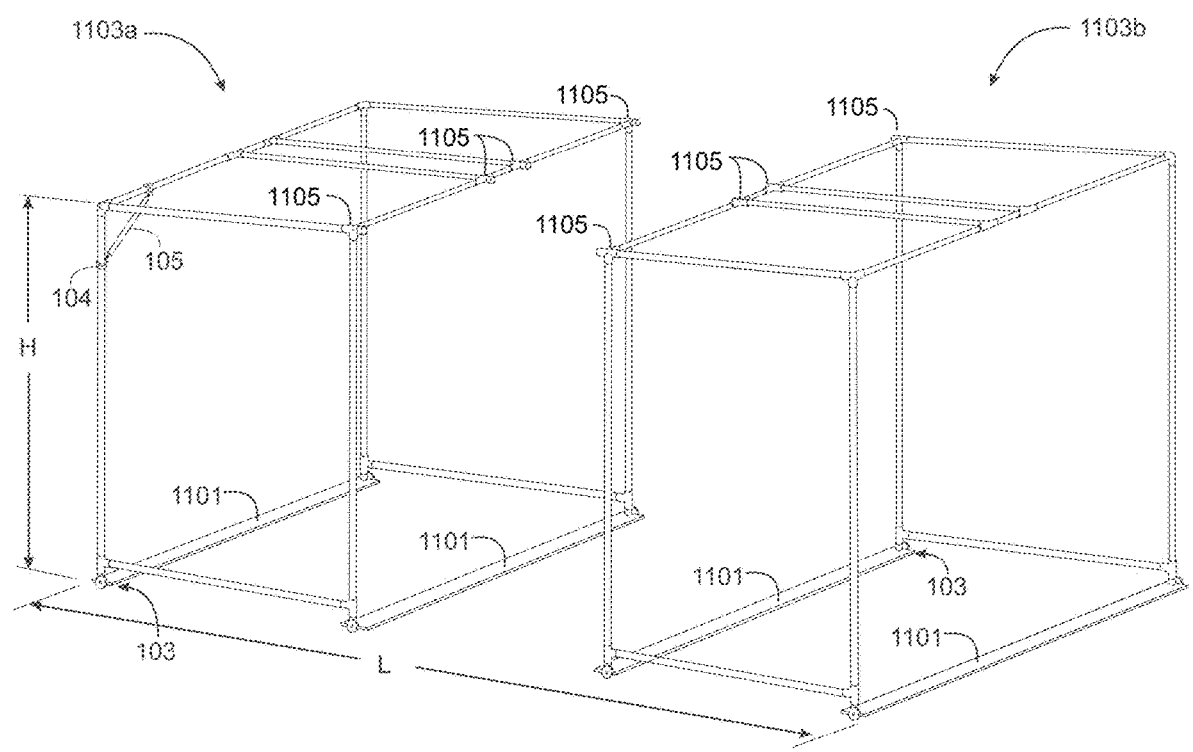
FIG. 20B is a perspective view of the structure of FIG. 11A with tubings removed to produce two separate portable units.

When a user has determined to store the portable solar carport in a garage or other storage area the user may disconnect the tubes joining structures 1103*a* and 1103*b* by releasing the tubes joined by fittings 1107 and removing the tubes. FIG. 20B illustrates the result, with structures 1103a and 1103b now separate structures, separately movable. The user may now deploy the caster wheel mentioned above to raise the structures separately on the caster wheels, and each structure may be separately rotated and moved into the garage separately. This innovation provides a means of moving and deploying the overall structure of the portable solar carport that is easier for the user to manually manipulate.

In one embodiment of the invention individual ones of the solar panels may be connected directly to a micro-inverter, converting the direct current (DC) produced to an alternating current (AC).

Having illustrated and described a number of examples of the invention it is again emphasized here that the framework is open both in the front and the rear with sufficient height and width that a user may park an automobile or other vehicle under the framework with the framework positioned in the driveway to present solar panels to sunlight. Moreover, the user may drive a vehicle under and through the framework and into the garage. The system of the invention presents no real impediment to the use of the garage or the driveway.

MEGA Version

In alternative embodiments of the invention a more robust and serviceable version of the solar carport appliance is provided with additional functionality over the embodiments described above. MEGA stands for Mobile Electricity Generating Appliance.

Figure 21:
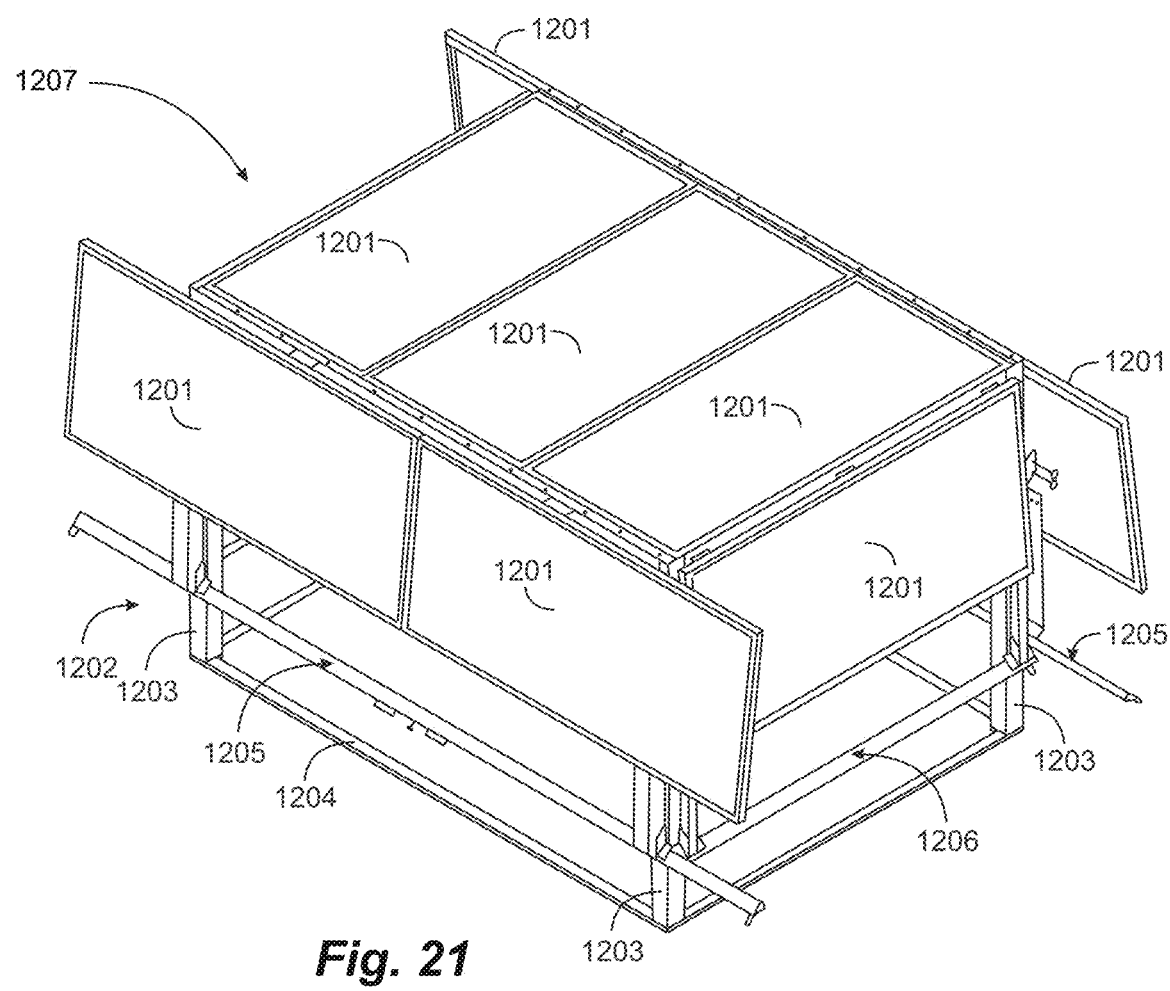
FIG. 21 is a perspective view of a MEGA carport in one embodiment of the invention.

FIG. 21 is a perspective view of a MEGA carport 1207 in one embodiment of the invention. Carport 1207 comprises nine (9) bifacial solar panels 1201 one of which is not seen in FIG. 21, being implemented on a far end of the carport not visible in the view of FIG. 21. In FIG. 21 panels 1201 are carried on a sturdy framework 1202 having four corner posts 1203 (three corner posts are visible in FIG. 21) that are made from 4"×4" aluminum square tubing stock. In one embodiment the wall thickness of the square tubing stock is ⅛ inch, but in some instances, for a more sturdy version, tubing with a wall thickness of 3/16 inch or even ¼ inch may be used. Two solar panels 1201 on each long side and one solar panel on each width end are hinged at an upper edge and folded down in a position suitable for moving the portable solar panel. Lengthwise and widthwise cross braces are implemented in framework 1202 but not seen under the folded down solar panels on the sides and ends of the carport.

A rectangular flat base 1204 with four sides each in one embodiment one-half the width of a post 1203 (2") lies flat on a support surface, such as a driveway, which support surface may be concrete or asphalt, and posts 1203 of framework 1202 are joined to this base at the four corners, such as by steel bolts.

Two lengthwise support structures 1205 are hinged to corner posts 1203 on each long side in a manner that the support structures may be deployed to support the two solar panels on each side of the carport when those panels are raised on their hinged edges to a horizontal plane with the solar panels on the top of the carport. Similarly, there are two support structures 1206, one on each end of the carport, hinged to the corner posts of the framework on each end, which may be deployed to support the single solar panels on each end of the carport when those panels are raised on their hinged edges to a horizontal plane with the solar panels on the top of the carport. When the four side and two end solar panels are raised and supported horizontally there are nine (9) solar panels in a horizontal plane displayed to catch maximum rays.

Figure 22:
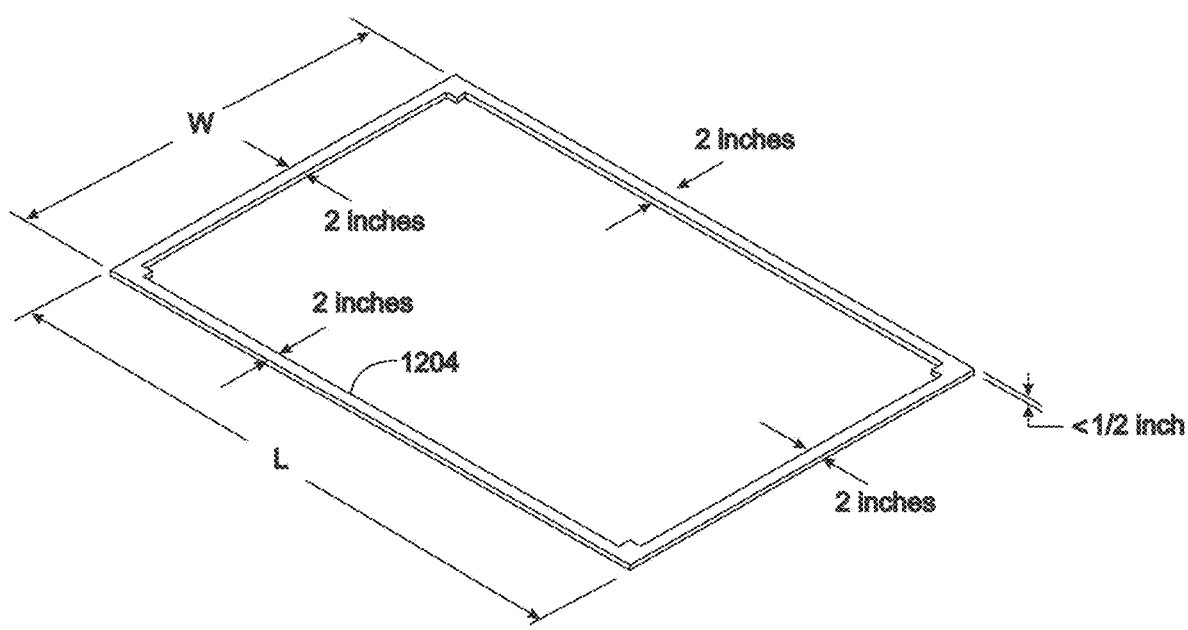
FIG. 22 illustrates a rectangular flat base of the carport of FIG. 12 in an embodiment of the invention.

FIG. 22 illustrates rectangular flat base 1204 in the same aspect as in FIG. 21. Base 1204 lies flat on the supporting surface, which may be a driveway surface, such that, with the framework 1202 engaged and the solar panels raised, a car, truck or other vehicle may be driven over the base under the carport through either the ends or the sides of the carport. Base 1204 has a length L and a width W which are also the width and length of the framework in a carport on the base. In one embodiment W is about 8 feet and length L is about 20 feet, but both of these dimensions may be different in other embodiments. A 4" by 4" region is implemented on each corner of base 1204 to mate with the 4"×4" bottom of the corner posts 1203. In an alternative embodiment the width of each span of the base may be 4" rather than two inches.

Base 1204, having a limited height, such as equal to or less than one-half inch, provides considerable structural support for the framework and presents very little impediment to a vehicle driven over a span of the base. The length and width of base 1204 may vary in different embodiments, but with framework posts 1203 at 4 inches square, the width of each span of base 1204 will be 4 inches.

Figure 23:
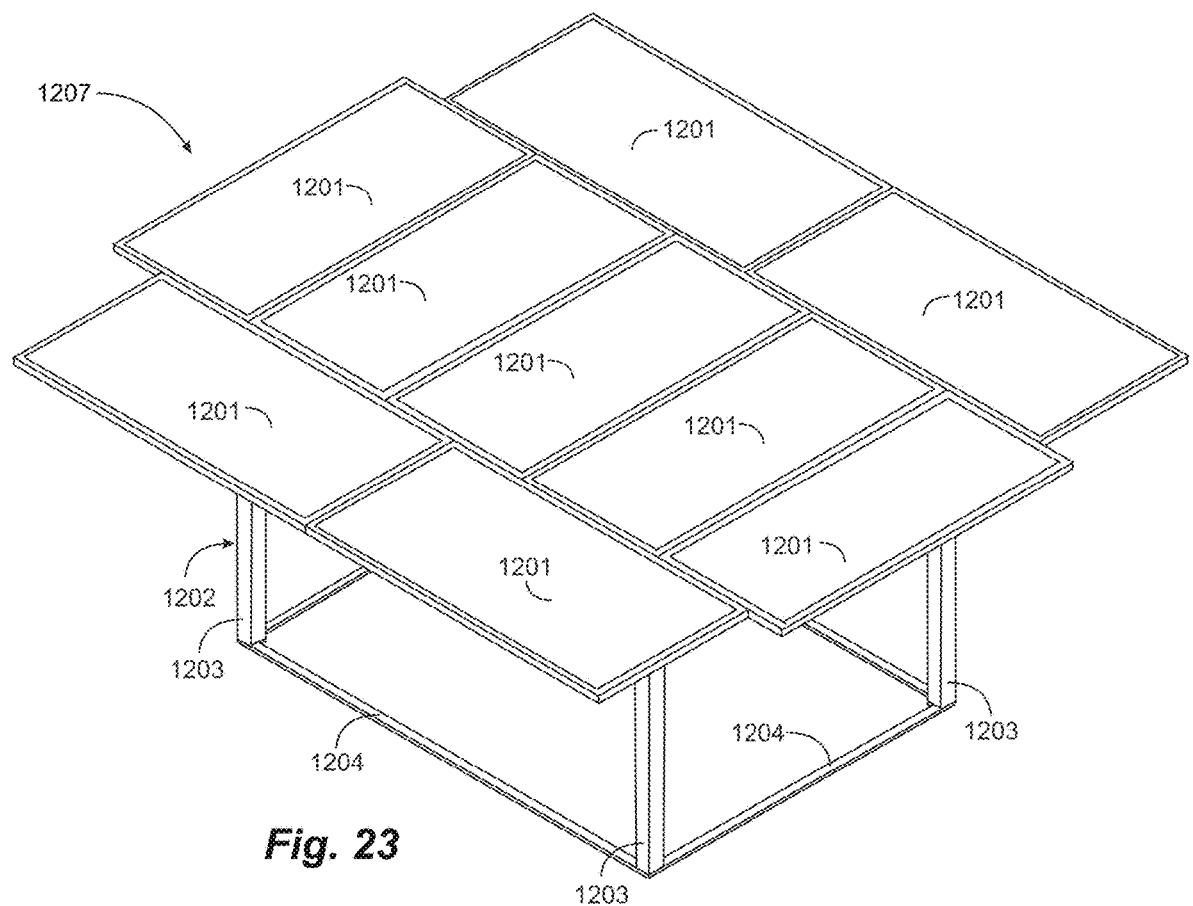
FIG. 23 is a perspective view of the carport of FIG. 12 with solar panels raised in an embodiment of the invention.

FIG. 23 illustrates the carport 1207 with the six hinged solar panels raised to the horizontal plane of the three solar panels that are arrayed across the top of the framework and are not hinged. The apparatus 1205 and 1206 that are hinged on the corner posts are not seen in FIG. 23 under the solar panels. FIG. 23 shows the carport in an arrangement for operation, with all of the solar panels in horizontal aspect and coplanar.

Figure 24:
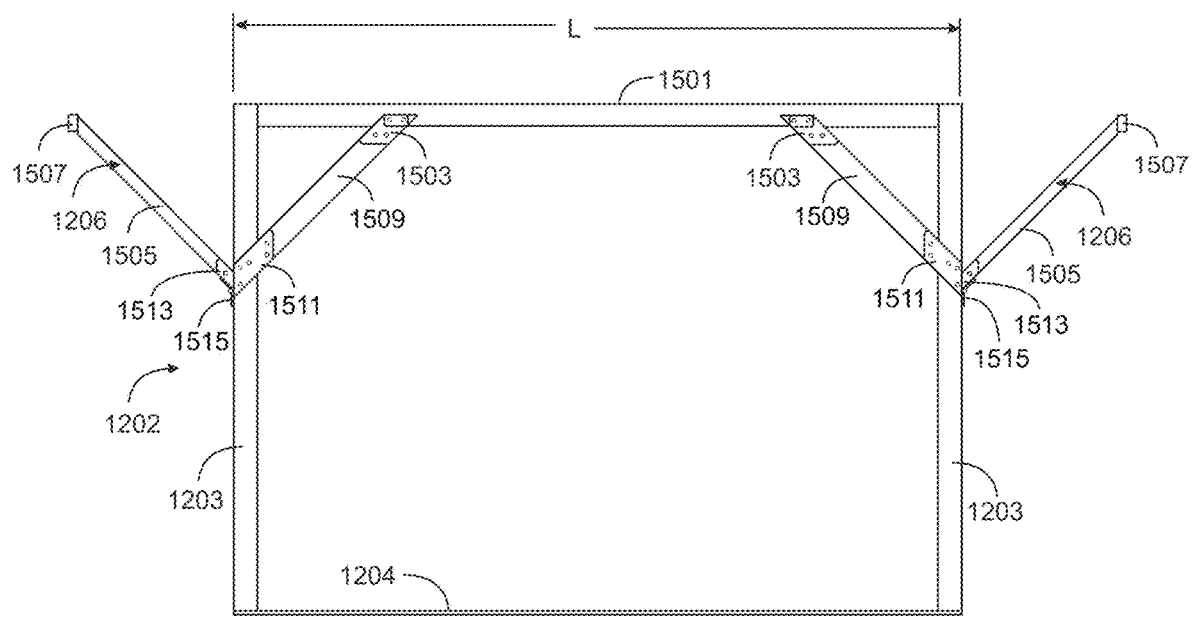
FIG. 24 is a side elevation view of a framework of the carport of FIG. 12 in an embodiment of the invention.

FIG. 24 is a side elevation view of framework 1202 with apparatus 1206 on hinges 1515 on each end raised in position to support the single hinged solar panels on each end of the carport in a horizontal aspect. Apparatus 1206 in FIG. 21 is shown as folded down against posts 1203, which allows the solar panels on the ends to fold down to a vertical aspect. Each apparatus 1206 comprises an arm 1505 made from square aluminum tubing, hinged in a bracket 1513 that is fastened to post 1203. A rail 1507 fastened in a horizontal aspect at ends of arms 1505 supports the end solar panels in the raised aspect.

A 4-inch L-shaped beam 1501 in this example spans between posts 1203. Beam 1501 is supported on each end to posts 1203 by a 4-inch square brace 1509 fastened between brackets 1503 and 1511, which brackets in this example fasten respectively to the beam and to the posts.

Figure 25:
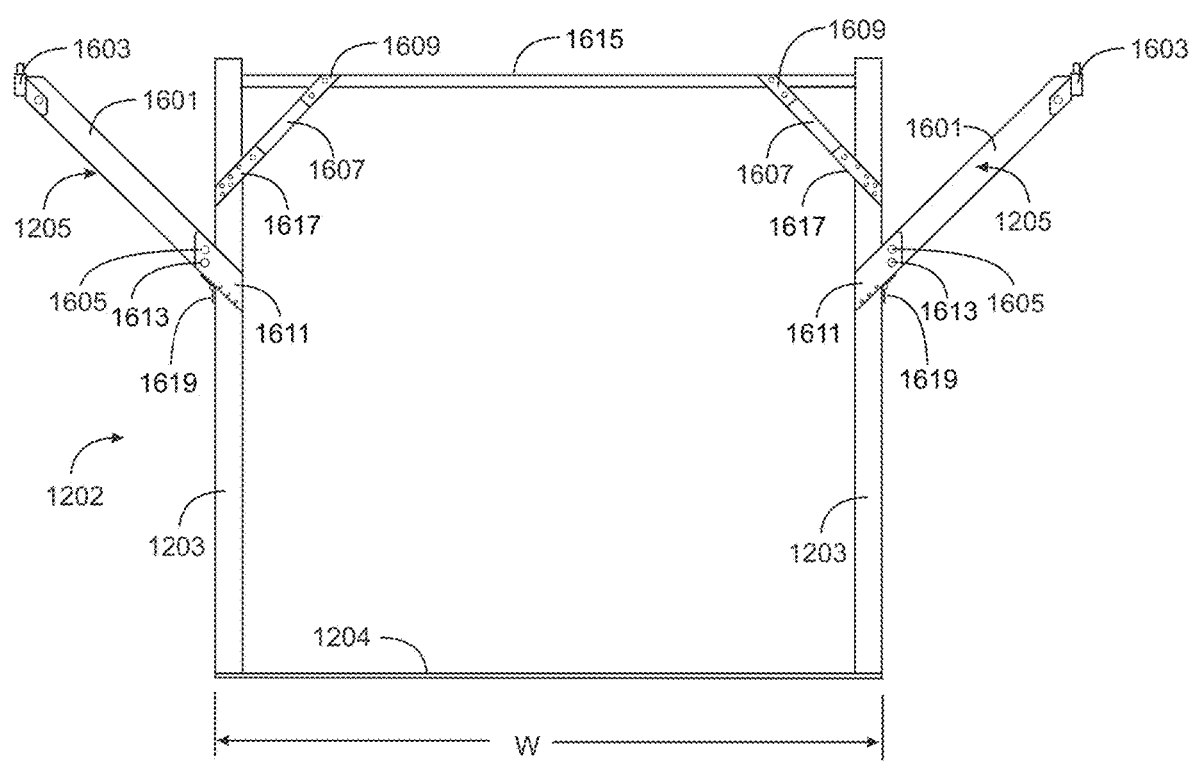
FIG. 25 is an end elevation view of a framework of the carport of FIG. 12 in an embodiment of the invention.

FIG. 25 is an end elevation view of framework 1202 with hinged apparatus 1205 on each side raised in position to support the two hinged solar panels on each side of the carport in a horizontal aspect. Apparatus 1205 in FIG. 21 is shown as folded down against posts 1203, which allows the solar panels on the sides to fold down to a vertical aspect. Each apparatus 1205 comprises an arm 1601 made from 4" square aluminum tubing in this example, hinged in a bracket 1611 that is fastened to post 1203. A rail 1603 fastened in a horizontal aspect at ends of arms 1601 supports the side solar panels in the raised position. Arm 1601 pivots on a hinge 1619, pins 1613 & 1605 are inserted in the raised position to support arm 1601.

Carport 1207 as described in the MEGA version is intended to be deployed on premises, such as on a driveway in front of a garage, on a semi-permanent basis. Earlier versions described above had deployable and retractable wheels such as wheel assemblies 103 described above. It has been determined that it may be better to have removable wheel assemblies, since the carport may need to be moved only occasionally, and the wheel assemblies may be best not exposed to the elements except when needed. Further, it has been determined there needs to be a means of anchoring the carport to the surface upon which it rests, as some driveways are not level, and wind may occasionally be a problem. In some regions tornadoes or hurricanes may be a problem.

Figure 26:
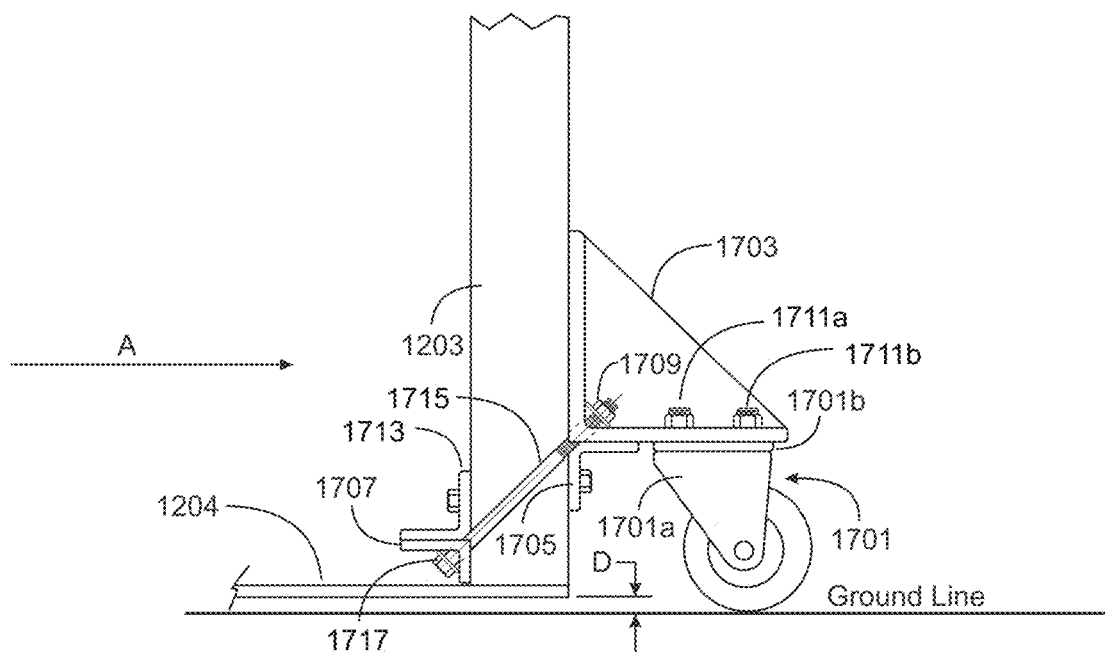
FIG. 26 illustrates a high-load wheel assembly mounted to a post in an embodiment of the invention.

FIG. 26 is an elevation view of one corner post 1203 of the MEGA version carport illustrating a removable, high-load wheel assembly 1701 having a wheel made in this example from a Ultra High Molecular weight (UHMW) polymer. Wheel assembly 1701 has an upper portion 1701b that bolts under a bracket 1703 by four nuts and bolts of which 1711a and 1711b may be seen in the figure, and a lower part 1701a that is free to rotate relative to part 1701b around a vertical axis. Bracket 1703 is about two inches wider than post 1203 in this example, about six inches, and extends one inch from each side of post 1203. Bracket 1703 is not bolted to post 1203, but rests on an L-bracket 1705 that is the width of the post, four inches, and is bolted to post 1203. A second L-bracket 1713 also of four-inch width is bolted to post 1203 on an opposite side from L-bracket 1705 at a predetermined lower position. A third L-bracket 1707 has a width of six inches, like bracket 1703, and two holes at an angle, passing through the bracket at the corner as shown, in the extended portions outside the post. Bracket 1703 has similar holes in the extended portions outside the post. Some embodiments use angles between and 80 degrees and preferably between 25 and 65 degrees. Two long steel bolts 1715 in this example pass through the angled holes in brackets 1703 and 1707 and are constrained at the top end by a nut and washer 1717 and 1709. Only one bolt and one nut and washer is seen in this view.

A person of skill in the art will understand that with nut 1709 loosened such that bracket 1703 is not urged against bracket 1705, the framework of the carport will rest on the supporting surface at the ground line. As the nuts are tightened, bracket 1703 is drawn against bracket 1705, and the framework is lifted from the ground line to a height "D" which is determined by the relative positions of brackets 1713 and 1705.

Figure 27:
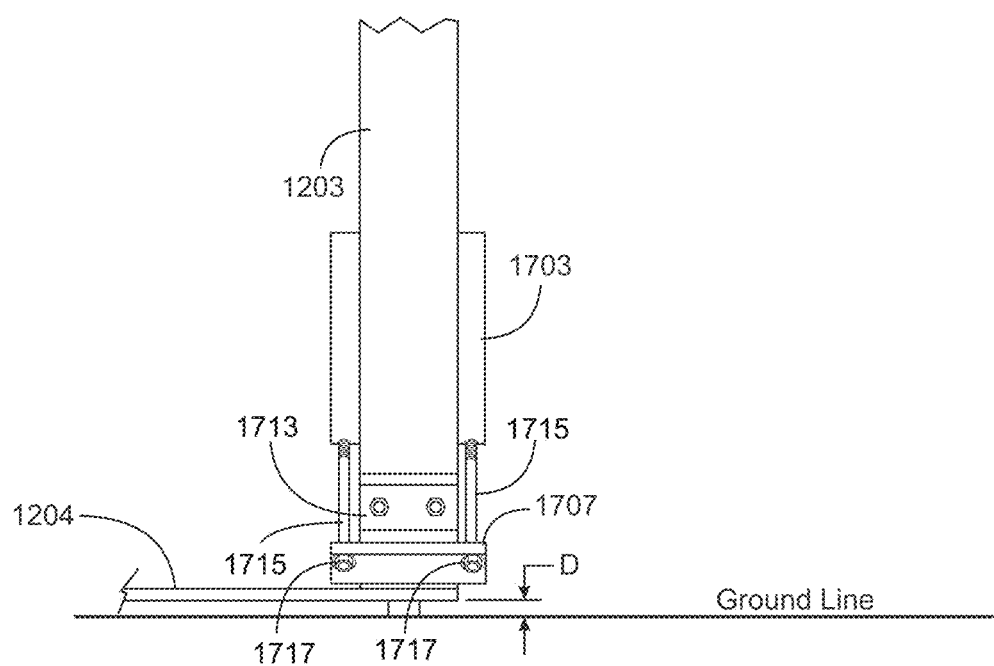
FIG. 27 illustrates the wheel assembly of FIG. 17 from a different viewpoint in an embodiment of the invention.

FIG. 27 is a view of the assembly of FIG. 26 in the direction of arrow A in FIGS. 26, to better illustrate the nature of the assembly. Bracket 1713 is seen bolted to post 1203 on the near side of the post, and bracket 1707 is seen with bolt 1715 passing through at an angle. Bracket 1703 may be seen on the far side of post 1203 with threaded rods 1715 passing through bracket 1703 at an angle. The threaded rods are secured to bracket 1703 by nut and washer sets 1709, not seen in FIG. 27 but shown in FIG. 26.

The apparatus illustrated in FIGS. 17 and 18 may be implemented at all four corners of the carport 1207, and once installed and secured the entire carport is raised on wheels and may be moved along the supporting surface either to store in a garage or other storage facility. The carport may be moved as well on the wheels to a different location or onto a conveyance vehicle to be carried away.

The inventor believes the apparatus shown in FIGS. 17 and 18 is capable of supporting the considerable weight of the MEGA version of the carport and facilitating the mobility of the carport. When the carport is moved or repositioned, and is in a position desired by the user, the wheel assemblies may be removed, placing the carport back on the supporting surface.

Once replaced on the supporting surface there may be occasion of expected high winds, even a tornado or a hurricane, that could move or damage the carport. To protect against such an occurrence, if it is neither desirable nor possible to move the framework inside a shelter, an anchoring system is provided to secure the carport by its framework to the supporting surface.

Figure 28:
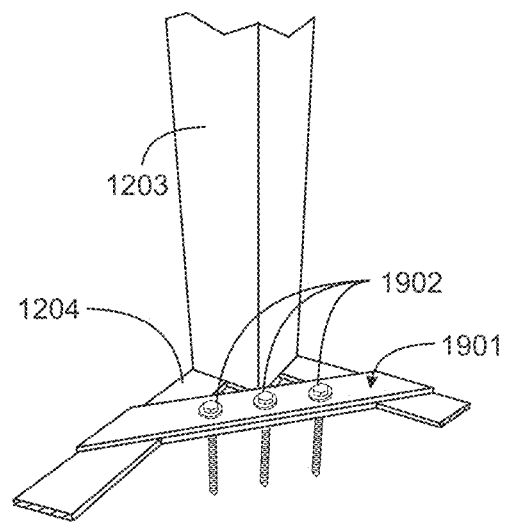
FIG. 28 illustrates an anchor system in an embodiment of the invention.

FIG. 28 illustrates one corner post 1203 of the MEGA version of the carport in one embodiment. A cross brace 1901 is placed at an angle across between spans of base 1204. Some embodiments use angles between 10 and 80 degrees and preferably between 25 and 65 degrees. There are three through holes in the cross brace and anchor bolts 1902 are used to anchor the carport to the supporting surface. One such cross brace with anchor bolts is used preferably at each corner post to very securely anchor the carport to the surface.

In one embodiment, once the carport is deployed on a driveway or other supporting surface, the anchoring cross braces are installed if not already in place. Locations for anchors in the supporting surface are marked through the three holes in each cross brace. The carport is moved aside a short distance, and holes are drilled in the surface and anchors are installed to accept the anchor bolts. Once the anchors are installed the carport may be positioned properly over the anchor points and the anchor bolts engaged to securely anchor the carport to the supporting surface.

It was stated above that an object of the present invention is to teach and claim a system comprising at least one structure as taught by FIGS. 10 through 28 and associated description, and interfacing electrical and electronic equipment, as taught by FIGS. 1A through 9 and associated description, enabling the structure comprising the PV array to power a nanogrid.

Figure 29A:
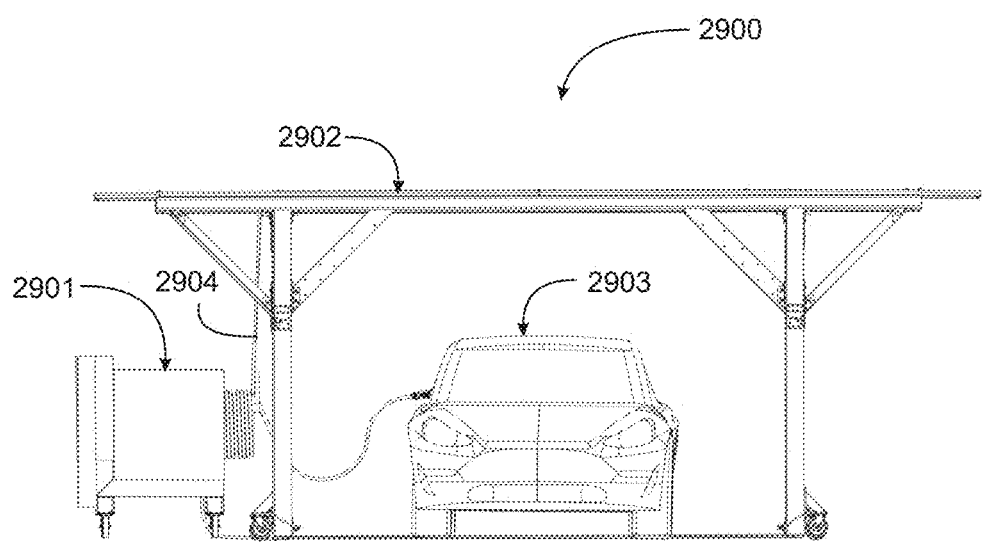
FIG. 29A is a side elevation view of a system according to an embodiment of the present invention.
Figure 29B:
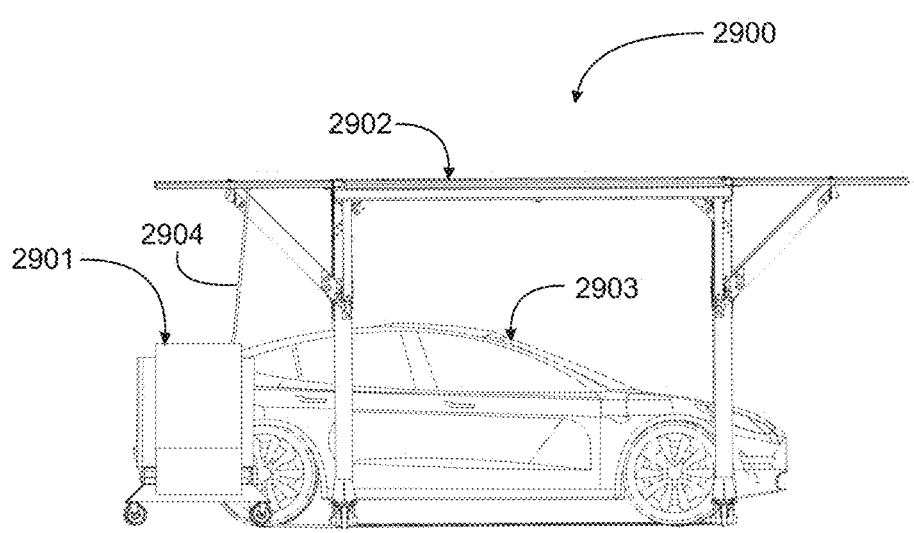
FIG. 29B is the system of FIG. 29A rotated 90 degrees.

FIG. 29A is a side elevation view of a system 2900 according to an embodiment of the present invention, comprising a MEGA platform 2902 with an array of PV panels, as described above with reference to FIG. 10 through 28, and a microgrid system controller 2901. Automobile 2903 is not a part of the system of the invention, and a variety of electric vehicles may utilize the carport aspects of the MEGA platform and be connected to the system controller for charging. FIG. 29B is system 2900 of FIG. 29A rotated 90 degrees. The PV panels of Mega platform 2902 are connected to the microgrid system controller by a conductor cable 2904. Microgrid system controller 2901 may incorporate an agent module, an inverter, a battery charger and a junction box for managed and user loads.

A distinction between a 'nanogrid' and 'microgrid' may be made by the scale of power or the physical extent of an islanded system. An alternate distinction may be made by number and diversity of power sources or the number and diversity of power loads. We herein use the term 'nanogrid' to refer to systems of all these possible semantic taxonomies without the intent of limitation.

As used herein, a nanogrid controller is a supervisory circuit that ensures an islanded PV power system maintains at least one voltage waveform within required tolerances despite one or more of a time-varying load and a time-varying power source. In some preferred embodiments the voltage waveform has a substantially constant voltage (direct current or DC) or a substantially sinusoidal or periodic time-varying voltage (alternating current or AC). In some embodiments, the voltage waveform may alter over the course of operation. Some such embodiments may comprise regulating a voltage or current to a load. In some embodiments the load may be electrochemical, e.g., a battery, electroplating, electrolytic, or other chemical process that directly consumes electricity, as known in the art. An example of a non-constant or non-sinusoidal waveform may be a battery charging voltage profile. A second example may be a driving voltage for a thermal-energy storage or pumping system.

Some embodiments of nanogrids in accordance with the present invention comprise at least one solar panel as known in the art. Some embodiments further comprise an inverter, an electronic device to produce a substantially periodic waveform of voltage, current, power, or a combination thereof. In some embodiments the nanogrid controller directly manages the output of at least one solar panel. In some embodiments, the nanogrid controller manages the output of an inverter that is fed by at least one solar panel.

In some embodiments the inverter produces an output only when it detects one or more prescribed voltage waveform envelopes over one or more validation time intervals, herein called a 'grid-tied inverter,' as known in the art. Some embodiments of nanogrid controllers according to the present invention comprise circuitry to produce a voltage waveform within the validation envelope. In some embodiments, the power for producing this waveform comes from one or more of: a battery, a solar cell, a solar panel, a solar panel that is also connected to the PV inverter, a solar array voltage that is also connected to an inverter, a voltage produced by an external circuit, a voltage produced by an external circuit connected to a solar panel, such as a power optimizer circuit, as known in the art, etc.

Some embodiments of nanogrid controllers according to the present invention comprise one or more of: a fast dump circuit, a fast isolator circuit as previously disclosed to maintain a voltage waveform signal at a grid tied inverter despite changes and transients in loads and source power. As previously disclosed, some embodiments of nanogrid controllers further comprise a synchronous condenser apparatus to further stabilize the nanogrid waveform. An element of the present invention may be the obviation of a synchronous condenser and attendant costs for a nanogrid having low surge-power requirements.

Some embodiments comprise a water heating load connected to a fast dump circuit. Some embodiments may further comprise a switched fan to maintain a water-temperature limit.

Some such embodiments may comprise battery or electric vehicle charging loads, resistance-heating loads, chemical conversion loads, or loads that comprise electronic circuitry to reduce surge power, such as a variable-frequency drive or brushless DC motor controller.

As used herein, a 'managed load' is a power load which the Agent controls completely and a 'user load' is a power load which the Agent is not completely controlling.

Some embodiments of Agents according to the present invention comprise connections for one or more of: a managed load, a user load.

Some embodiments of power sources according to the present invention comprise a plurality of solar panels disposed on a platform. Some embodiments of platforms comprise one or more of a fixed or detachable mobilizing element such as a wheel, a ball, a track, a walking mechanism, a lever, a skid, a hinge, a pivot.

Some embodiments of nanogrid systems according to the present invention comprise a plurality of solar panels disposed on fixed and hinged sections of a mobile platform; further comprising a one or more of: a plurality of micro-inverters, a string inverter, a plurality of DC power optimizers and inverter; further comprising an Agent system. Some embodiments further comprise a synchronous condenser. Some embodiments further comprise a Type I, Type II, Type III, or other AC-driven EV charging cable as known in the art. Some embodiments alternately further comprise an EV charger.

Some embodiments of nanogrid systems according to the present invention comprise a plurality of solar panels disposed on fixed and hinged sections of a mobile platform; further comprising an Agent system that establishes reserve power using an actively controlled load, stabilizes a DC voltage or a time-varying DC battery charging profile. Some embodiments further comprise one or more of a capacitor bank, a supercapacitor bank, a battery bank, a brushless DC motor-based flywheel generator. Some embodiments alternately further comprise a DC-fed EV charger. Some embodiments further comprise an inverter.

In some embodiments the agent controls battery charging directly from the solar-array DC output using the 'reserve capacity.' Battery charging does not load down the inverter. In some preferred embodiments, the Agent communicates with the inverter via a communications channel to tell it how much additional power can be drawn from the panels instantaneously by powering off the battery charging so the inverter can react to an instantaneous load increase without having to undergo a relatively slow hunt for a new power point of the array.

Some embodiments of platforms according to the present invention comprise at least one hinge or pivot that allows an angle of a solar panel to be adjusted. Some such adjustments may comprise changing an angle to increase or decrease power output from at least one solar panel. Some embodiments comprise changing an angle to reduce or increase the physical dimensions of the system, e.g., to allow it to fit within a structure, to allow it to fit within physical or legal constraints such as set-back requirements, etc., to expand to a fully deployed geometry.

Some embodiments of platforms comprise one or more articulated or telescoping sections to change one or more dimensions of the structure, e.g., to reduce the height of the platform to fit into a garage, to adjust an overall-tilt of a platform by changing the relative height of on side of the platform relative to the other, to stow or deploy layered sections of solar panels, etc.

Some embodiments of platforms may further comprise at least one actuatable structure that casts a shadow onto a solar panel to throttle solar power production.

A system controller in embodiments of the invention as described in embodiments above has surge protection provided in one embodiment by a brushless DC motor-based flywheel generator coupled to the regulated bus, providing surge capacity. In another, alternative embodiment surge protection is provided by super capacitor/battery banks as a surge power source.

Figure 30:
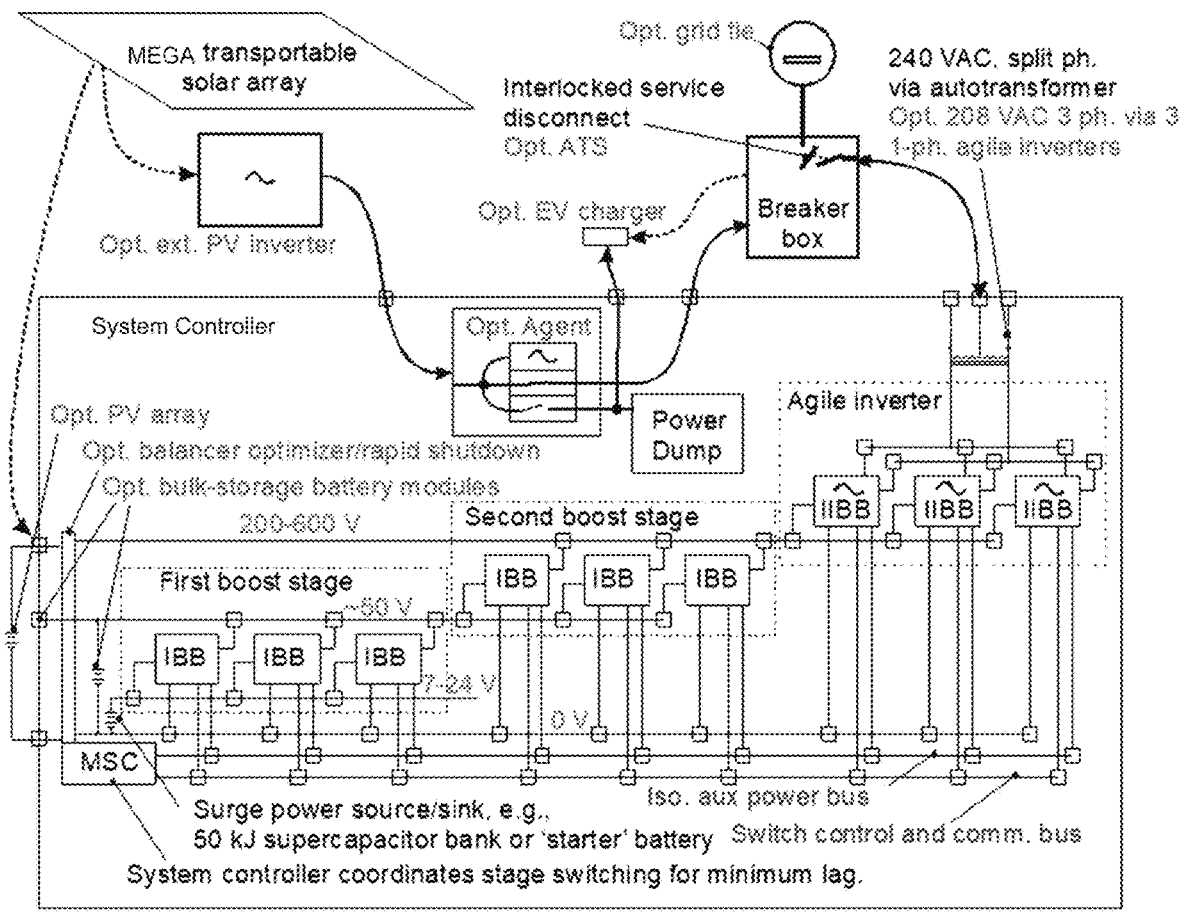
FIG. 30 is a diagram of an alternative system controller in an embodiment of the invention.

FIG. 30 is a diagram of the alternative system controller. Squares in FIG. 30 depict intermodular connections. Power sources are indicated using a battery symbol. Power from the PV panel array feeds an external PV inverter, whose output is connected to the system controller. The system controller illustrated comprises electronics to keep a non-islanding inverter fully productive during a power outage. It includes circuitry to feed a grid signal to the inverter, to isolate the inverter from transients that may trip it, to manage loads, water heater, etc. so the solar array may be operated at capacity.

FIG. 30 illustrates a cascade of two interleaved bi-directional boost (IBB) stages. 'Bidirectionality' meaning that the power can be efficiently directed in the forward or reverse direction. Reverse flow is used to charge storage devices and sink power or voltage transients on the AC line. Each IBB module in a stage internally has three interleaved converters, so the system shown has 9 evenly interleaved boost circuits.

A first boost stage converts power from a surge power source to a standard bus voltage of −50 V. This bus allows cost-effective integration with optional internal and external bulk storage batteries. Each first-stage converter has a maximum input current capacity of 600 A, a 0-to-full-power rise time<<1 ms, and a wide input voltage range up to −48 V to facilitate different surge power sources. The circuitry comprises one or more 'starter' batteries or a supercapacitor bank. The surge power source is a system consumable. Since batteries are limited to an of order 10k-50k, high-surge events and supercapacitors are limited by electrolyte loss. Nevertheless, these power sources may cost about $100 to replace and should last 5-10 years while protecting the rest of the system, including bulk storage batteries from life-time limiting surges.

A second boost stage converts the −50-V bus voltage to a 'optimum bus' voltage between 200 and 600 V. This optimum bus also may be fed by a PV string or other variable voltage power source. One embodiment may employ a balancer-based PV power optimizer and a rapid shutdown system to obviate an external PV inverter.

The optimum bus voltage feeds the interleaved inverter bi-boost (IIBB) modules of an agile inverter stage. Each IIBB stage in this example has two interleaved inverters and bi-directional boost circuits, each rated 30 A peak. The diagram shown thus comprises 6 evenly interleaved inverter circuits. An internal autotransformer converts to split phase for residential use. Two additional inverter modules may be used to produce three phase power.

In one embodiment of the indention the connection to the residence or business comprises a unidirectional or bidirectional electric vehicle charger connection.

Owing to modularity, variants of the system may be tailored to cost optimize for specific applications. For example, an EV charging system may need no appreciable surge capability and comprise only the Agent module Feeding DC string power into the controller obviates an external PV inverter and the Agent module, etc.

The system controller illustrated and described features urgently needed functionality to make homes resilient in an outage and builds it into the system.

Systems according to embodiments of the invention bring whole-house power and EV charging to residences and small-businesses, whether the grid is on or off. For a target installed price at parity with a no-storage rooftop installation. Such a system provides 10 kW of daytime surge backup power capacity during outages on top of 5 kW of PV capacity, expandable to 10 kW. Use of the integrated EV charger in parking lot installations may support daytime EV charging, reducing night-time loads.

The systems shown by FIG. 30 provide ample surge power capacity to 10 kW/15 kVA) allowing homes and small businesses to run all critical appliances, including air conditioners and refrigerators, from a nominally-sized PV system.

While various examples have been provided in the specification and drawings, it should be apparent to those skilled in the art that the scope of the disclosure is not limited to the specific embodiments described herein. For example, features of one or more embodiments may be combined with one or more features of other embodiments without departing from the scope of the disclosure. The specification and drawings are, accordingly, to be regarded in an illustrative rather than a restrictive sense. Thus, the scope of the disclosure should be determined not with reference to the above description, but with reference to the appended claims along with their full scope of equivalents.

A person of ordinary skill will understand that the embodiments described above are each and all exemplary and are not limiting to the scope of the invention, which is limited only by the claims. There are a variety of ways that different features of the invention may be implemented other than the specific ways disclosed in the examples illustrated and described. For example, there are many materials that may be used for the framework other than aluminum tubing. Material suggestions provided herein are exemplary only and not intended to be limiting. Thus disclosed, it will be obvious to a person skilled in the art to select a suitable material. Many sorts of solar panels may be employed. The scope is limited only by the claims.

The invention claimed is:

1. An electrical supply system, comprising:
a carport appliance, comprising:
   a rectangular framework having a length L, a width W, and a height H, comprising four corner posts of d"×d" square metal tubing with cross beams at the upper ends of the posts forming a rectangular top;
   a rectangular base plate of width W, length L and thickness T equal or less than 1" lying flat on a support surface with the corner posts of the rectangular framework joined securely to the baseplate at corners of the baseplate;
   a plurality of PV panels mounted to the top of the rectangular framework in a horizontal aspect in a pattern covering substantially all area of the top of the framework;
   a plurality of PV panels hinged along a long edge of each PV panel to a top edge of a first side of the framework, and a plurality of PV panels hinged along a long edge of each PV panel to a top edge of a second side of the framework;
   one PV panel of a length equal to width W of the rectangular framework, hinged along the length of the PV panel to a top edge of a first end of the framework, and one PV panel of a length equal to width W of the rectangular framework, hinged along the length of the PV panel to a top edge of a second end of the framework;
   support apparatus hinged to posts on each side of the framework, adapted in a raised position to support the plurality of PV panels hinged on each side of the framework with the PV panels rotated upward to a horizontal aspect;
   support apparatus hinged to posts on each end of the framework, adapted in a raised position to support the one PV panel hinged on each end of the framework with the PV panels rotated upward to a horizontal aspect; and
   circuitry and wiring connecting the PV panels to a cable ending in a connector compatible with a PV inverter; and
a system controller, comprising:
   a framework enclosing elements of the system controller, the framework mounted on a wheeled base;
   a PV inverter connected to the cable from the PV panels as input to the system controller;
   a regulated bus;
   apparatus coupled to the regulated bus adapted to provide surge protection; and
   circuitry and conductors adapted to connect an AC output of the system controller to an electrical grid.

2. The electrical supply system of claim 1 wherein the apparatus providing surge protection comprises a brushless DC motor-based flywheel generator coupled to the regulated bus.

3. The electrical supply system of claim 1 wherein the apparatus providing surge protection comprises a surge power source/sink comprising a supercapacitor bank or a starter battery.

4. The electrical supply system of claim 3 wherein the supercapacitor bank is 50 kiloJoule or higher.

5. The electrical supply system of claim 1 wherein the system controller further comprises:
   a battery and charge controller switchably coupled to the regulated bus;
   a variable-frequency drive (VFD) inverter coupled to the battery and charge controller;
   a resistive load switchably coupled to the regulated bus; and
   a plurality of actuatable switches, wherein the plurality of actuatable switches comprise:
      a first actuatable switch configured to selectively couple a photovoltaic (PV) inverter to the regulated bus or to an external electrical panel;
      a second actuatable switch configured to selectively couple the regulated bus to the external electrical panel;
      a third actuatable switch configured to selectively couple the regulated bus to the battery and charge controller;
      a fourth actuatable switch configured to selectively couple the VFD inverter to the regulated bus or to the generator;
      a fifth actuatable switch configured to selectively couple the generator to the external electrical panel; and
      a sixth actuatable switch configured to selectively couple the resistive load to the regulated bus.

6. The electrical supply system of claim 1 wherein the rectangular base plate has corner regions of d'×d" matching the bottom of each post, with lengthwise and widthwise spans of a span width equal to or less than d" forming edges of the baseplate.

7. The electrical supply system of claim 1 wherein the carport appliance has a minimum clearance of six feet to the rectangular top, the ends have a minimum width of six feet between posts and the sides have a minimum length between posts equal to or greater than six feet, such that vehicles may be driven over spans of the baseplate and through the length or the width of the carport or may be parked under the carport.

8. The electrical supply system of claim 1 wherein the carport appliance further four removable wheel assemblies joined one to each corner post at a lowermost portion of each post such that installing all four wheel assemblies raises the carport appliance a distance D, and enables the carport to be rolled on the wheels of the wheel assemblies.

9. The electrical supply system of claim 1 wherein the carport appliance further comprises an anchor plate fastened from span to span across each corner of the baseplate inside the post at each corner with a pattern of holes accommodating anchor bolts.

10. The electrical supply system of claim 9 further comprising anchors compatible with the anchor bolts, the anchors installed in the support surface in a pattern matching the pattern of the holes in all four anchor plates installed on the framework, enabling the carport appliance to be rolled over the pattern of anchors in the support surface, the wheel assemblies to be removed setting the carport down on the support surface, and the anchor bolts to be inserted through the holes in the anchor plates and engaged to the anchors, firmly anchoring the carport appliance to the support surface.

11. The electrical supply system of claim 1 wherein, in the carport appliance, the PV panels are bifacial panels in which both sides of the panels are active.

12. The electrical supply system of claim 1 wherein the PV inverter is a combination inverter/charger having cables and connectors for charging electric vehicles.

13. The electrical supply system of claim 1 wherein the electrical grid connected to the AC output of the system controller is wiring of a residence or a business, and the AC output is input to a junction breaker box distributing power in the residence of business.

14. The electrical supply system of claim 1 wherein the circuitry and conductors adapted to connect an AC output of the system controller to an electrical grid further comprise a unidirectional or bidirectional electric vehicle charger connection.

* * * * *